United States Patent [19]

Itabashi

[11] Patent Number: 5,015,050
[45] Date of Patent: May 14, 1991

[54] Fθ LENS SYSTEM IN OPTICAL SCANNER

[75] Inventor: Akihisa Itabashi, Mitaka, Japan

[73] Assignee: Ricoh Company, Ltd., Tokyo, Japan

[21] Appl. No.: 454,691

[22] Filed: Dec. 21, 1989

[30] Foreign Application Priority Data

Dec. 22, 1988 [JP] Japan .............................. 63-324383
Mar. 20, 1989 [JP] Japan .............................. 64-67924
Mar. 28, 1989 [JP] Japan .............................. 64-76355
May 31, 1989 [JP] Japan .............................. 64-137805
Jun. 19, 1989 [JP] Japan .............................. 64-156554
Aug. 24, 1989 [JP] Japan .............................. 64-218055
Nov. 15, 1989 [JP] Japan .............................. 64-297170

[51] Int. Cl.⁵ .......................... G02B 26/08; G02B 3/04
[52] U.S. Cl. ..................................... 350/6.8; 350/433;
350/434; 350/6.7
[58] Field of Search .................. 350/6.8, 6.9, 6.1–6.7,
350/6.91, 432–434; 356/359–360; 346/160

[56] References Cited

U.S. PATENT DOCUMENTS

| 4,447,112 | 5/1984 | Matsuoka et al. | 350/434 |
| 4,756,584 | 7/1988 | Takanashi | 350/434 |
| 4,836,630 | 6/1989 | Takanashi | 350/6.8 |
| 4,846,539 | 7/1989 | Takahashi et al. | 350/433 |
| 4,919,502 | 4/1990 | Yamakawa | 350/6.8 |

FOREIGN PATENT DOCUMENTS 59-147316 8/1984 Japan .
61-120112 6/1986 Japan .

Primary Examiner—Paul M. Dzierzynski
Assistant Examiner—James Phan
Attorney, Agent, or Firm—Oblon, Spivak, McClelland, Maier, & Neustadt

[57] ABSTRACT

In an fθ lens system in an optical scanner, a light beam from a light source is formed as a line image extending in a main scanning corresponding direction and is deflected at an equal angular velocity by a rotary polygon mirror having a reflecting face in the vicinity of an image forming position of the line image and is then formed by an image forming lens system in the shape of a spot on a scanned face to optically scan the scanned face. The fθ lens system focuses and forms the light beam deflected by the rotary polygon mirror as an image on the scanned face. The fθ lens system comprises a functional device having a function for connecting a reflecting position of the rotarty polygon mirror and the scanned face in an approximately conjugate relation in geometrical optics in a secondary scanning direction, and comprises an fθ function in a main scanning direction, and has two groups of first and second lenses sequentially arranged from the side of the rotary polygon mirror toward the scanned face side. The lenses have first to fourth lens faces provided from the side of the rotary polygon mirror and having shapes on a deflecting plane composed of a combination of an arc and a straight line from the first to fourth lens faces. The first and second lenses may have respective refracting powers on a plane parallel to the deflecting plane.

6 Claims, 48 Drawing Sheets

Fig. 1a(i)  Fig. 1a(ii)
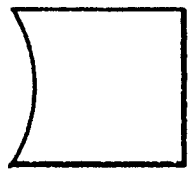 
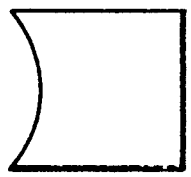 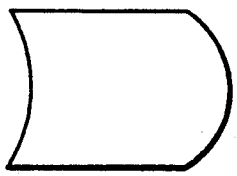
Fig. 1a(iii)  Fig. 1a(iv)
Fig. 1b(i)  Fig. 1b(ii)
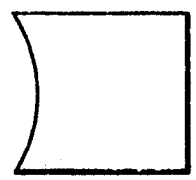 
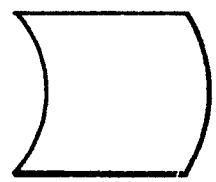 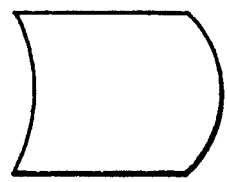
Fig. 1b(iii)  Fig. 1b(iv)

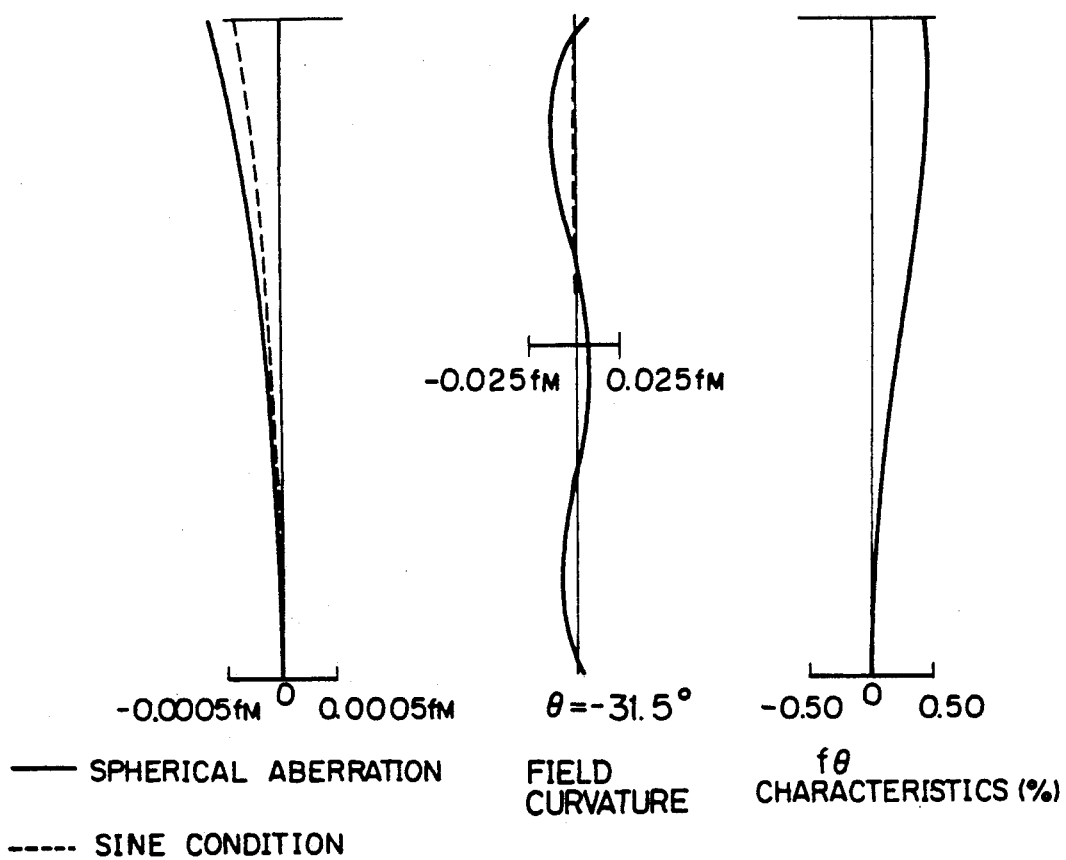

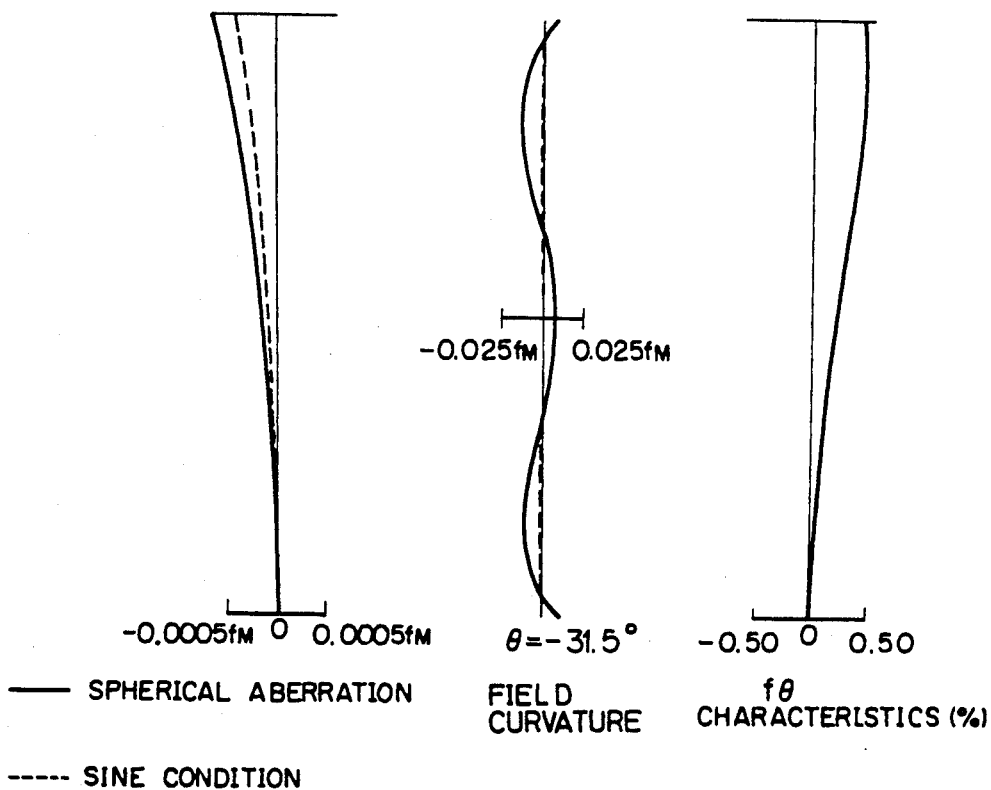

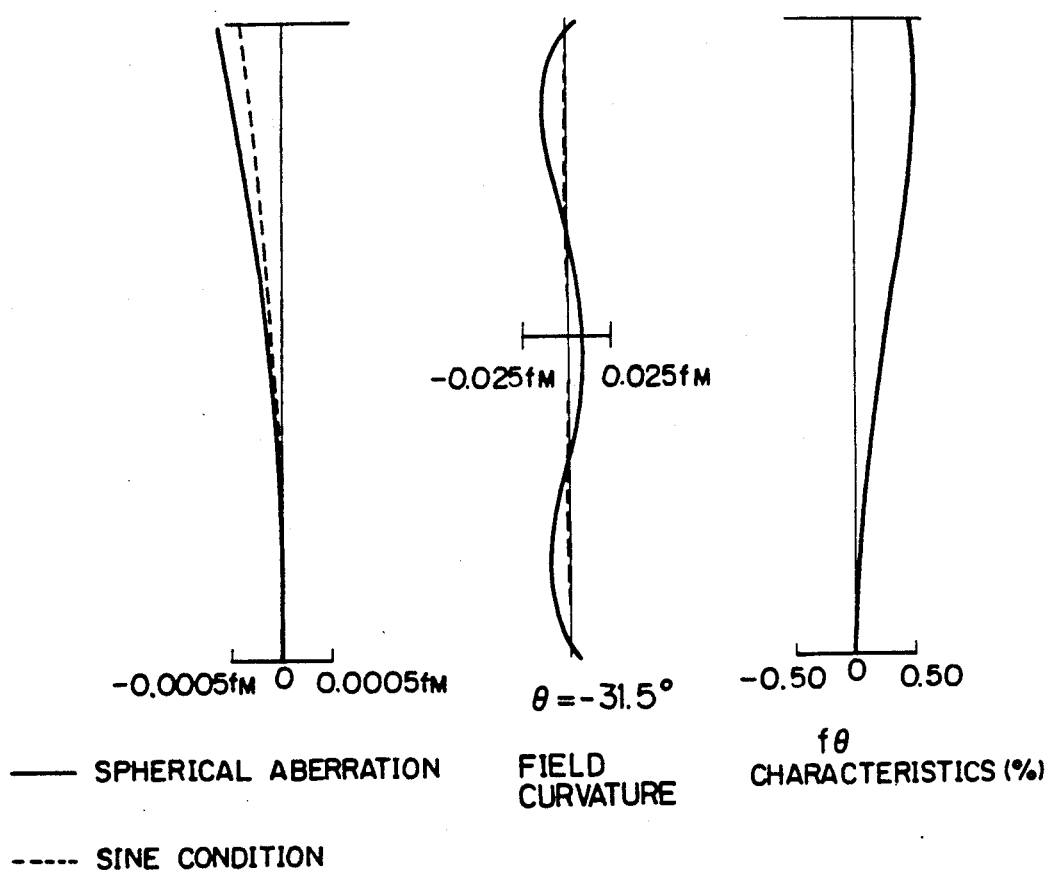

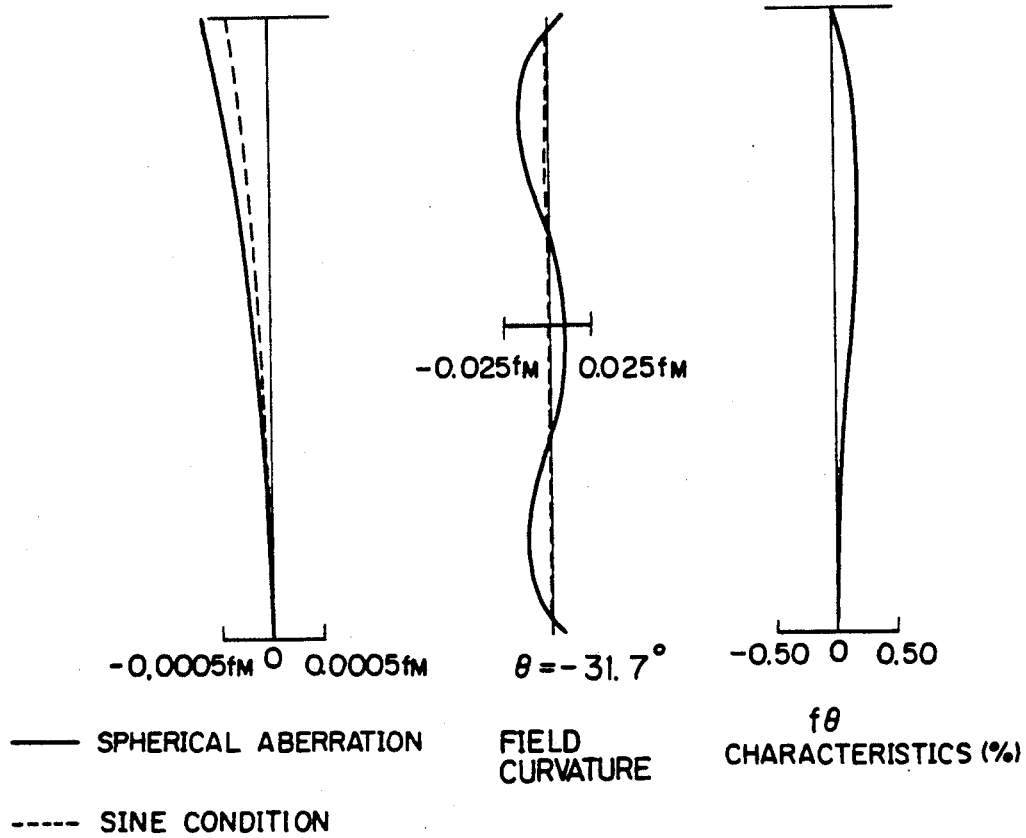

$F_{NO.}=54.7$

−0.0005fm  0  0.0005fm

—— SPHERICAL ABERRATION

---- SINE CONDITION $\theta = 31.7°$

−0.025fm  0.025fm $\theta = -31.7°$

FIELD CURVATURE $\theta = 31.7°$

−0.50  0  0.50

$f\theta$ CHARACTERISTICS(%)

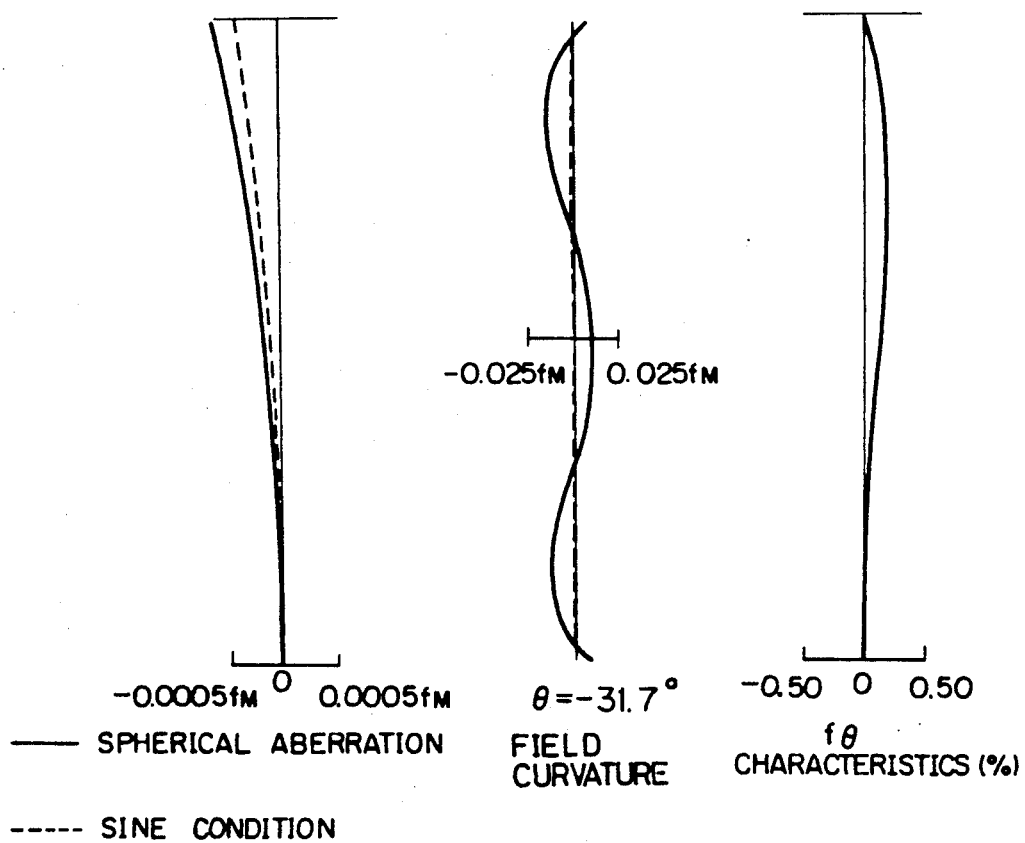

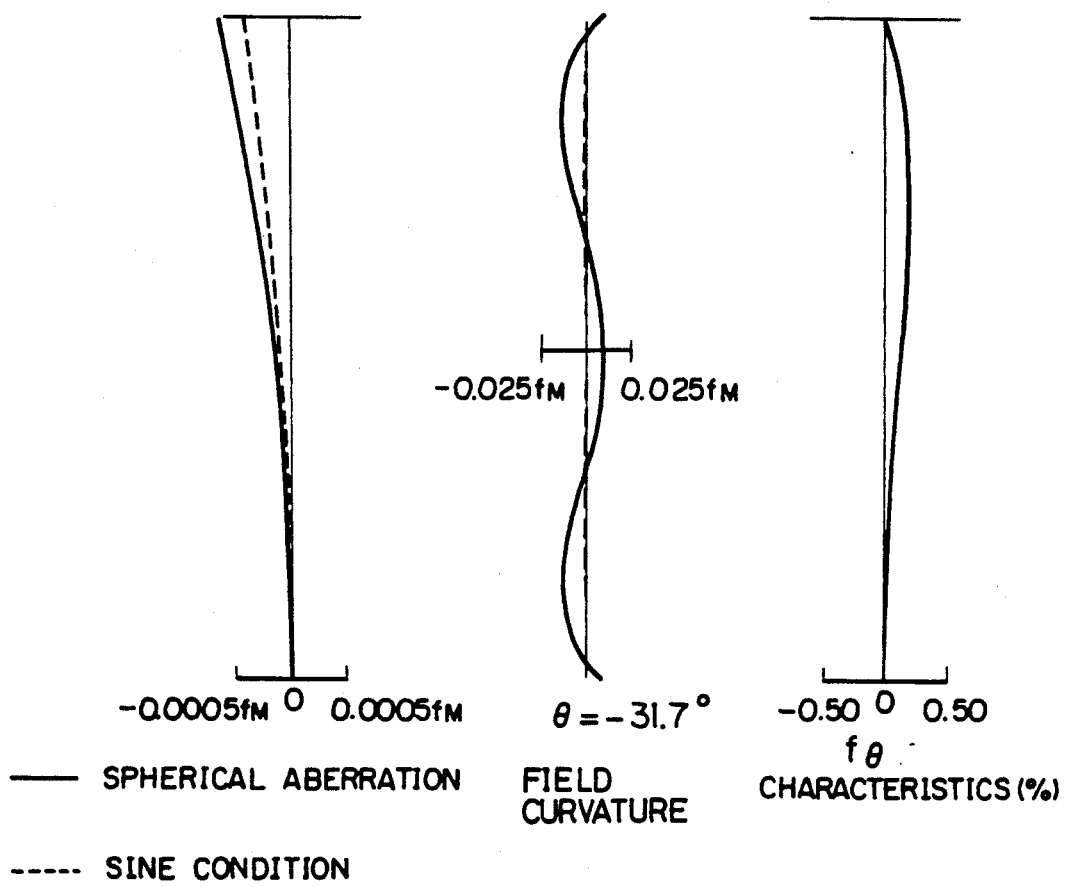

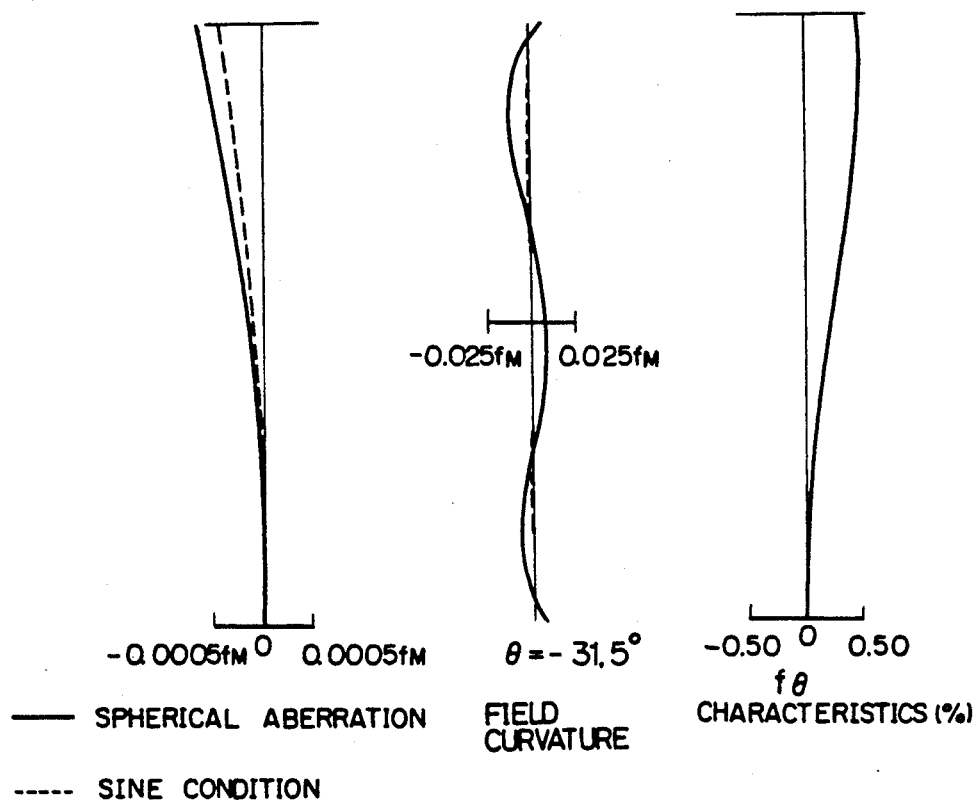

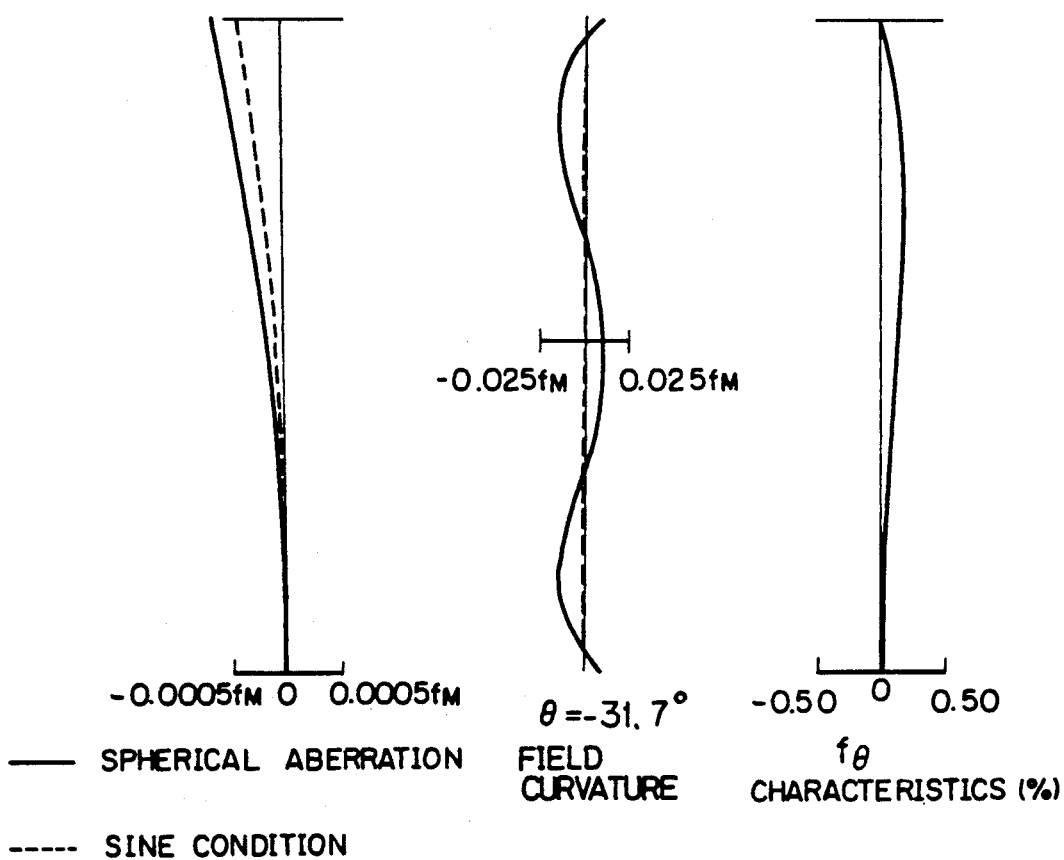

Fig. 20a
MAIN 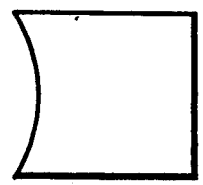 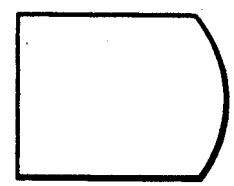
(凹) (凸)
SECONDARY 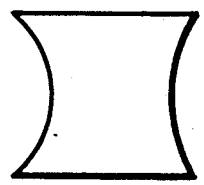 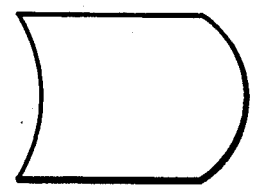
(凹) (凸)
Fig. 20b
MAIN 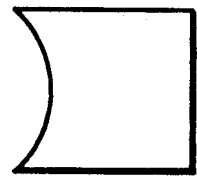 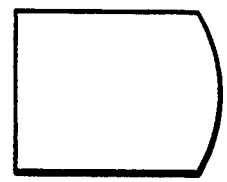
(凹) (凸)
SECONDARY 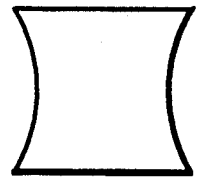 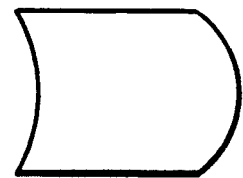
(凹) (凸)

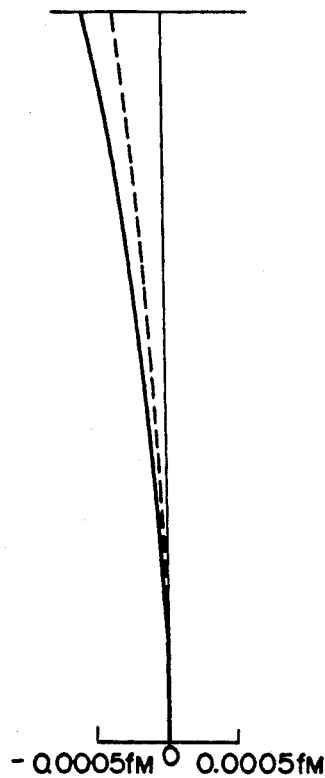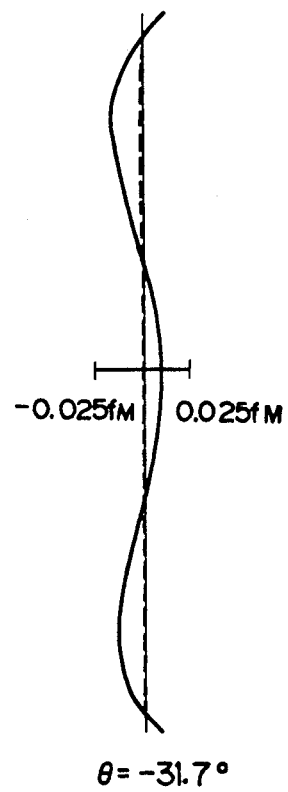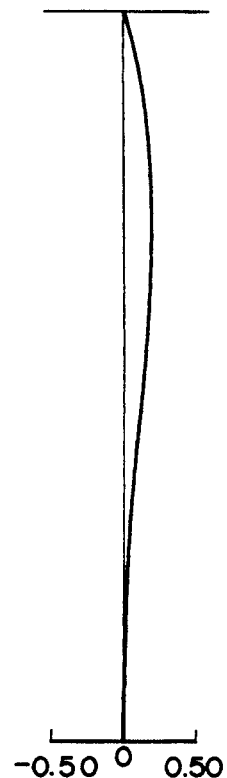

F<sub>NO.</sub>= 54.7

−0.0005fM 0 0.0005fM

—— SPHERICAL ABERRATION

---- SINE CONDITION

θ = 31.7°

−0.025fM   0.025fM

θ = −31.7°

FIELD CURVATURE

θ = 31.7°

−0.50  0  0.50 fθ CHARACTERISTICS(%)

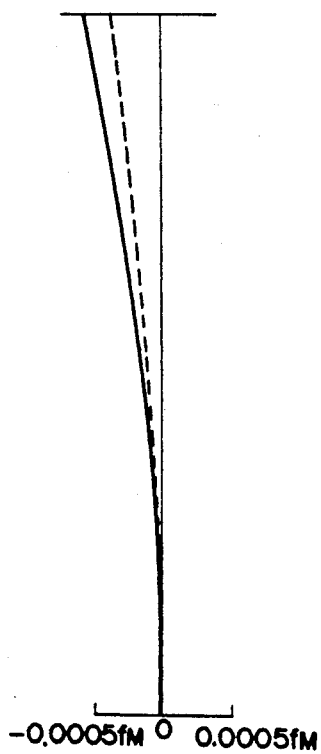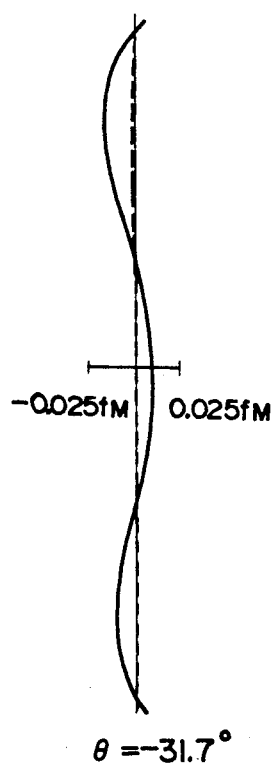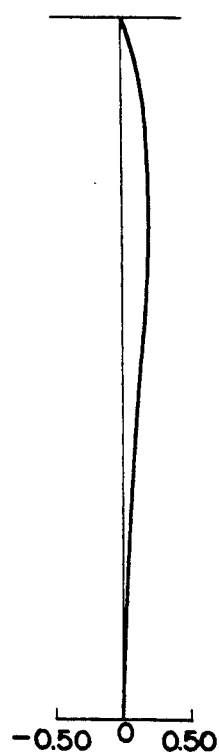
Fig.25a  FNO.=54.7
Fig.25b  θ=31.7°
Fig.25c  θ=31.7°
—— SPHERICAL ABERRATION
----  SINE CONDITION
FIELD CURVATURE
fθ CHARACTERISTICS(%)

F$_{NO.}$=54.7

−0.0005fM  0  0.0005fM

—— SPHERICAL ABERRATION

----- SINE CONDITION

θ = 31.5°

−0.025fM  0.025fM

θ = −31.5°

FIELD CURVATURE

θ = 31.5°

−0.50  0  0.50 fθ CHARACTERISTICS(%)

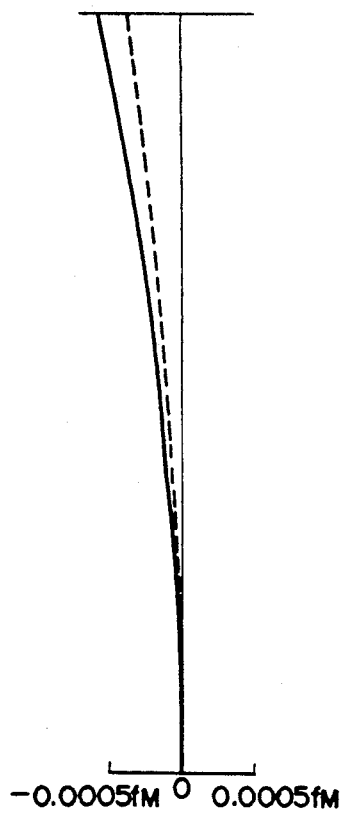
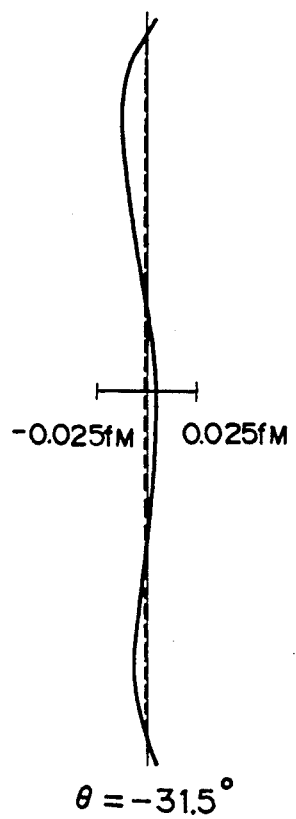
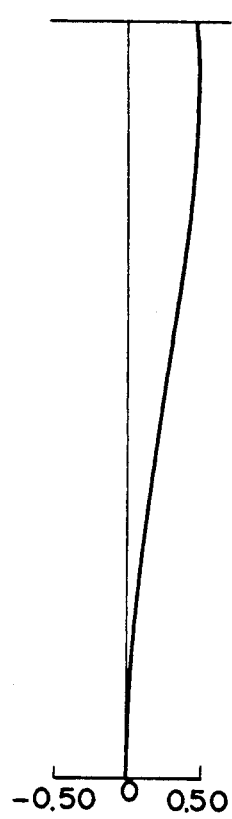
Fig. 27a — F_NO.=54.7; −0.0005fM 0 0.0005fM
— SPHERICAL ABERRATION
---- SINE CONDITON
Fig. 27b — θ = 31.5°; −0.025fM 0.025fM; θ = −31.5°
FIELD CURVATURE
Fig. 27c — θ = 31.5°; −0.50 0 0.50
fθ CHARACTERISTICS(%)

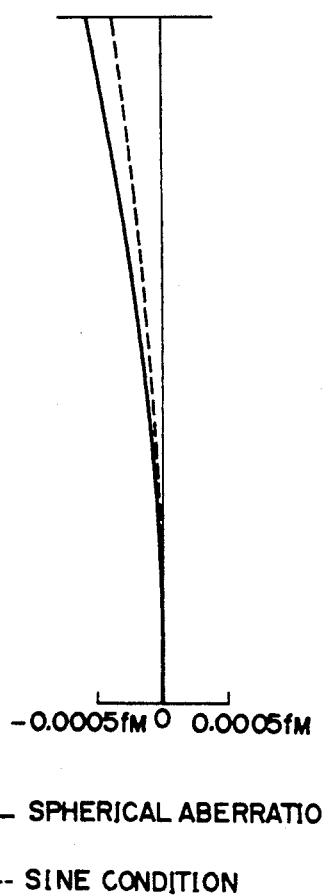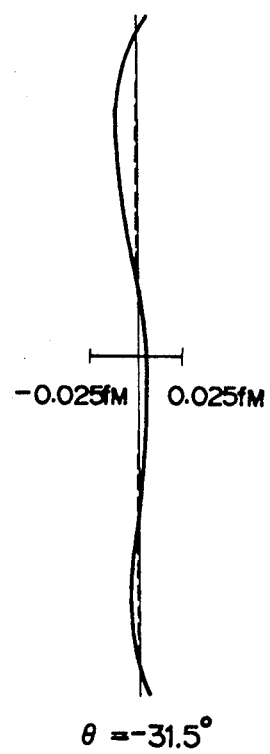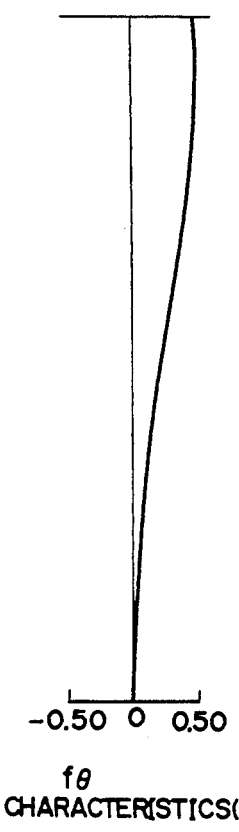

F$_{NO.}$=54.7

−0.0005fM  0  0.0005fM

— SPHERICAL ABERRATION
----- SINE CONDITION

θ = 31.5°

−0.025fM  0.025fM

θ = −31.5°

FIELD CURVATURE

θ = 31.5°

−0.50  0  0.50 fθ CHARACTERISTICS(%)

F_NO.=54.7

0.0005fM  0  0.0005fM

—— SPHERICAL ABERRATION

----- SINE CONDITION

θ = 31.5°

-0.025fM  0.025fM

θ = -31.5°

FIELD CURVATURE

θ = 31.5°

-0.50  0  0.50 fθ CHARACTERISTICS (%)

F_NO.= 54.7
-0.0005fM  0  0.0005fM
——— SPHERICAL ABERRATION
----- SINE CONDITION

θ = 31.5°
-0.025fM  0.025fM
θ = -31.5°
FIELD CURVATURE

θ = 31.5°
-0.50  0  0.50
fθ CHARACTERISTICS (%)

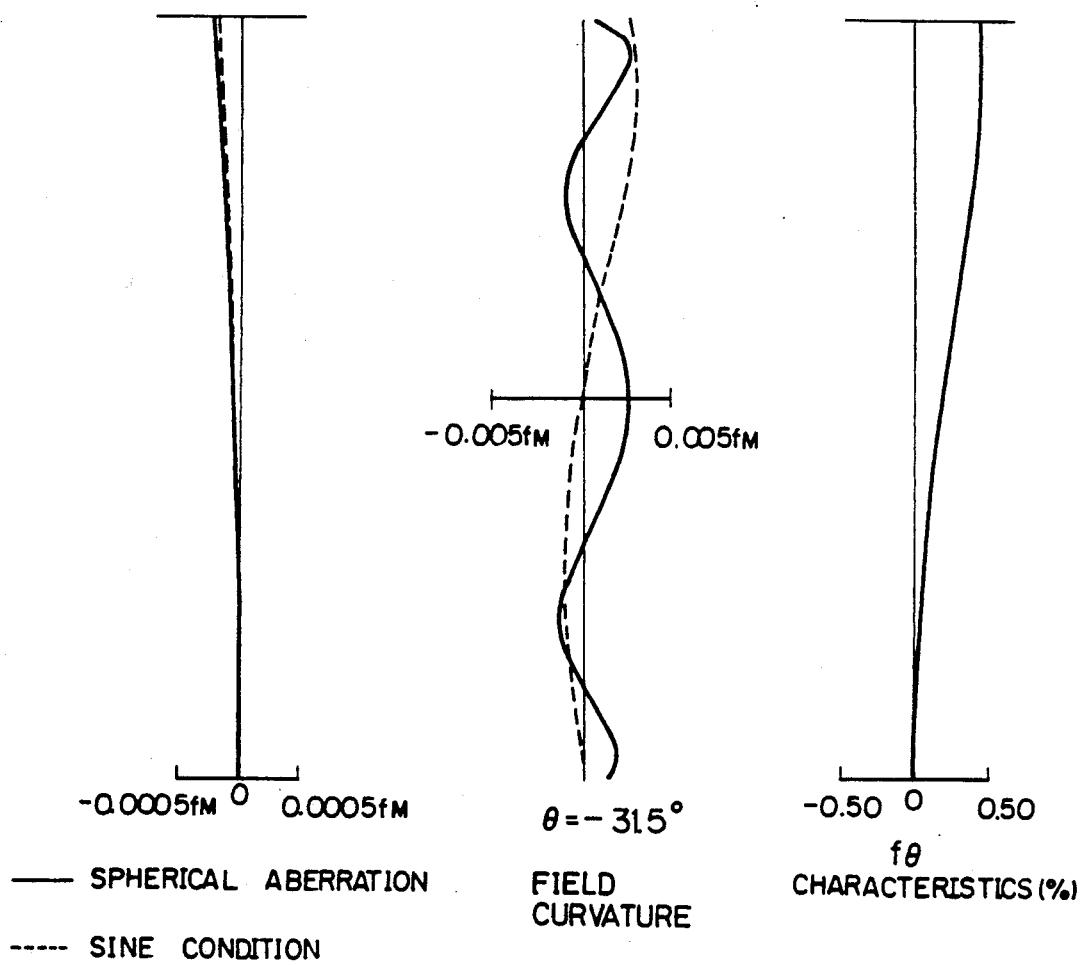

—— SPHERICAL ABERRATION
----  SINE CONDITION

FIELD CURVATURE fθ CHARACTERISTICS(%)

$F_{No.} = 54.7$

−0.0005fm   0   0.0005fm

— SPHERICAL ABERRATION
---- SINE CONDITION $\theta = 31.5°$

−0.005fm   0.005fm $\theta = -31.5°$

FIELD CURVATURE $\theta = 31.5°$

−0.50   0   0.50

$f\theta$ CHARACTERISTICS (%)

(凹)

(凸)

(凹)

(凸)

(凹)

(凸)

(凹)

(凸)

(凸)

(凸)

(凹)

(凸)

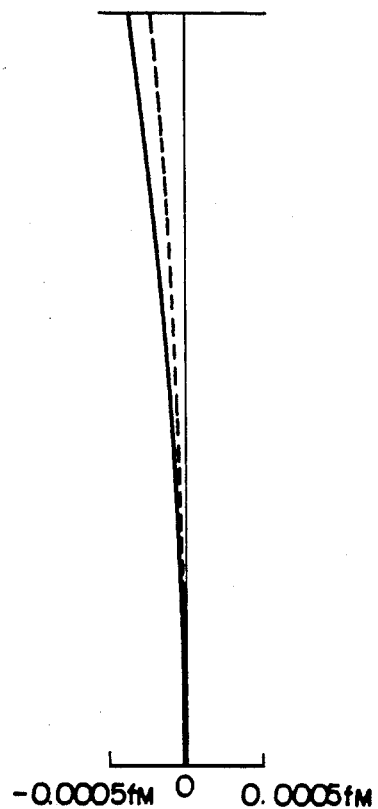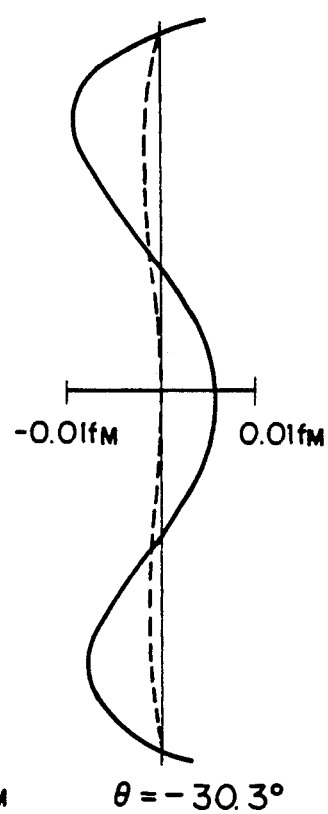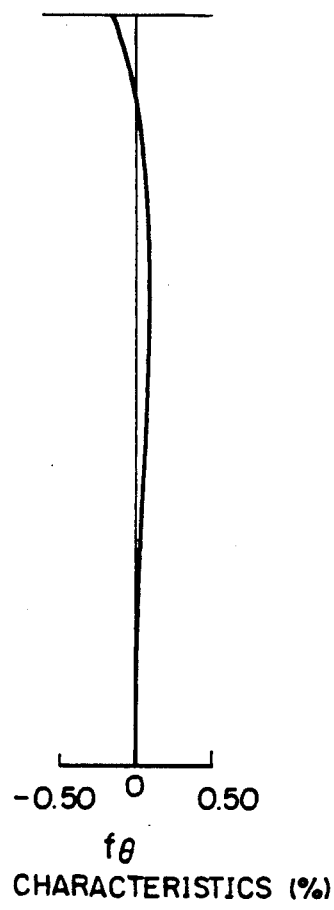

F_{NO}=54.7

-0.0005fm  0  0.0005fm

—— SPHERICAL ABERRATION
----- SINE CONDITION

θ = 30.3°

-0.01fm  0.01fm

θ = -30.3°

FIELD CURVATURE

θ = 30.3°

-0.50  0  0.50 fθ CHARACTERISTICS (%)

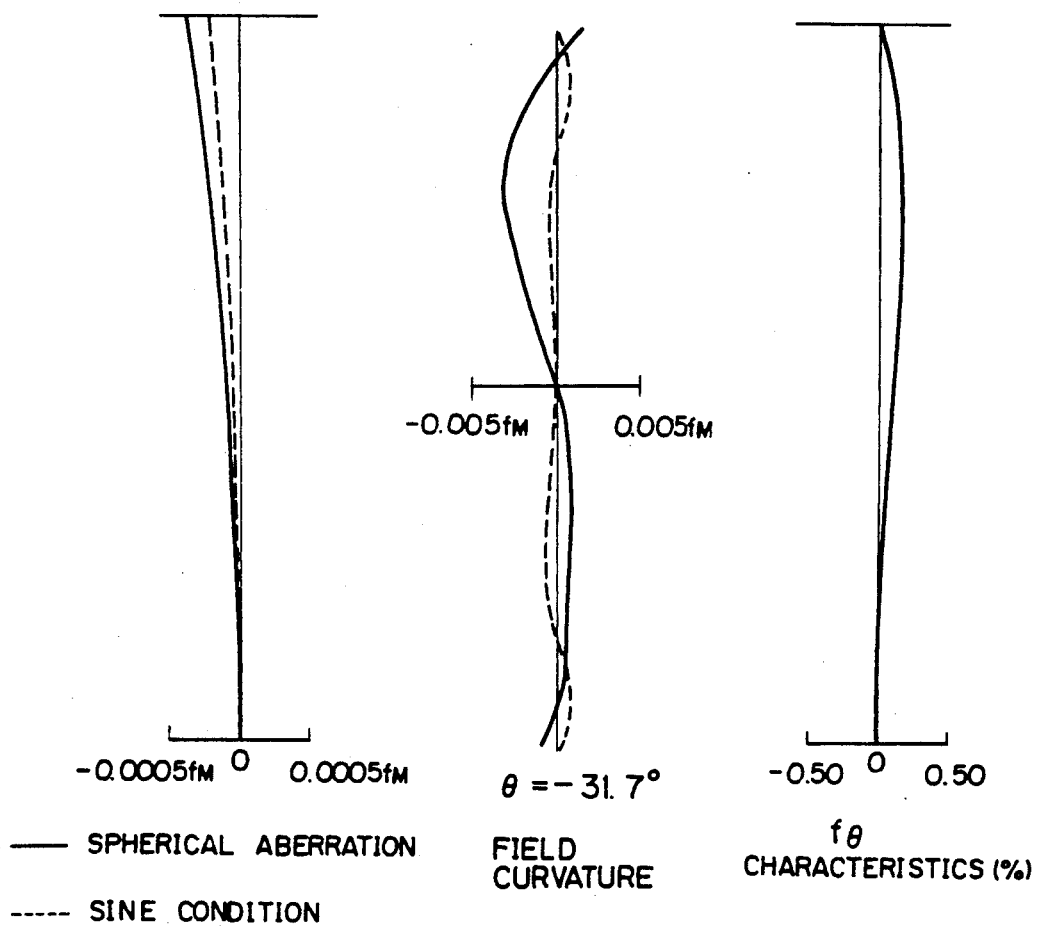

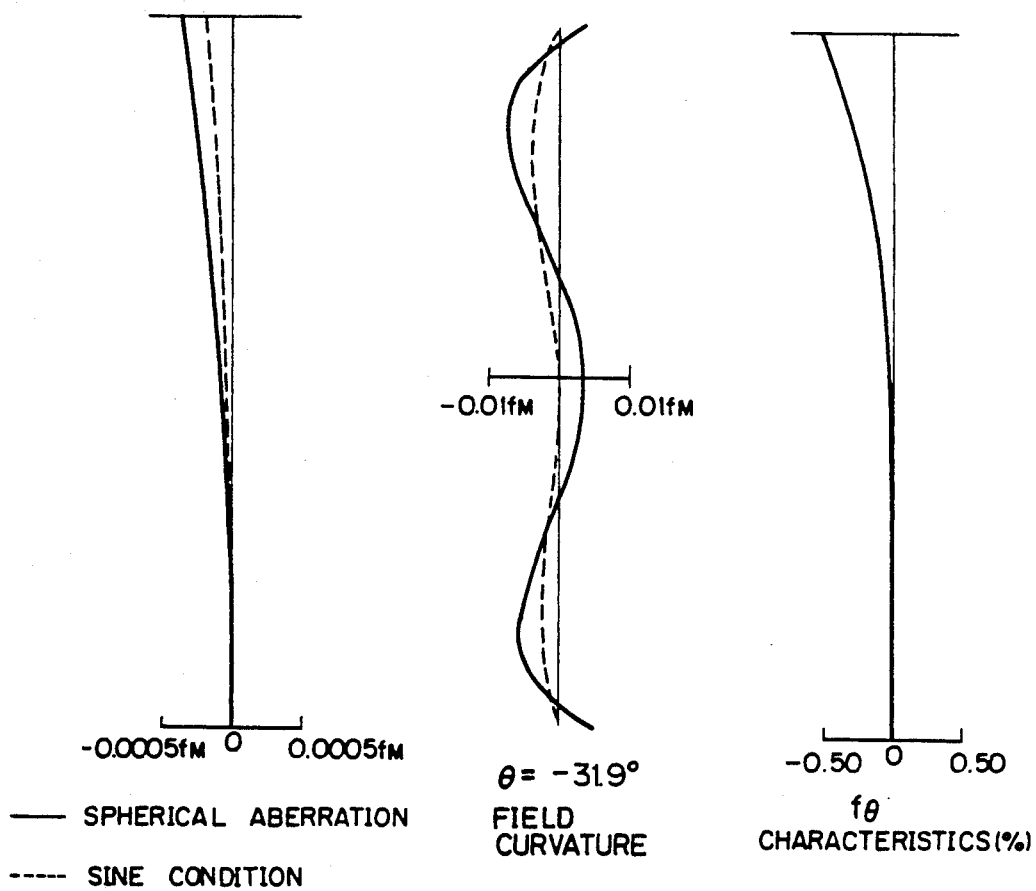

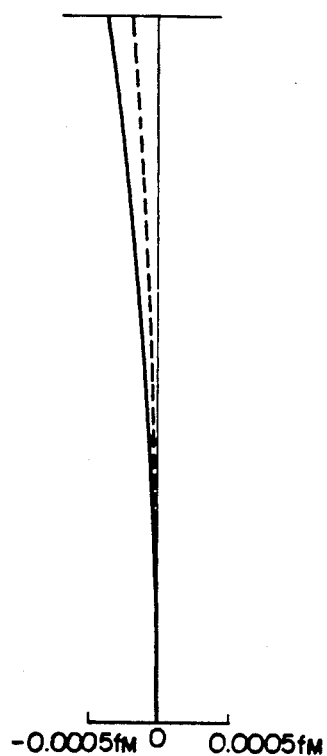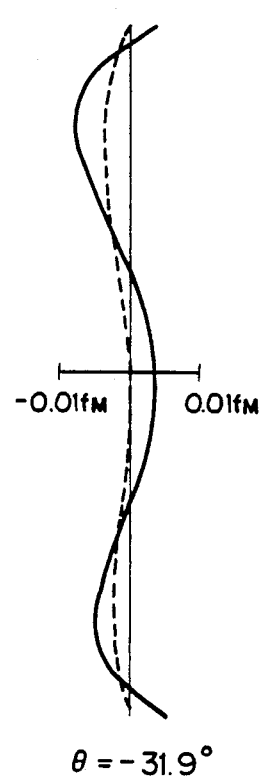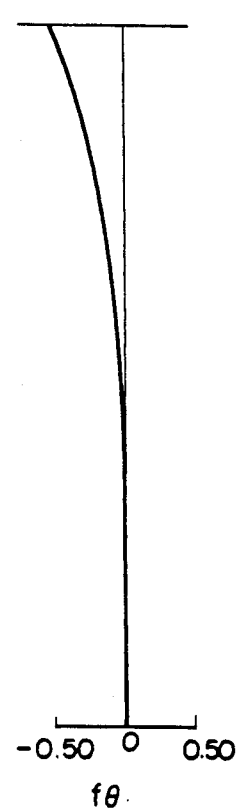
Fig. 42a — SPHERICAL ABERRATION / SINE CONDITION, $F_{NO.} = 54.7$
Fig. 42b — FIELD CURVATURE, $\theta = 31.9°$
Fig. 42c — $f\theta$ CHARACTERISTICS (%), $\theta = 31.9°$

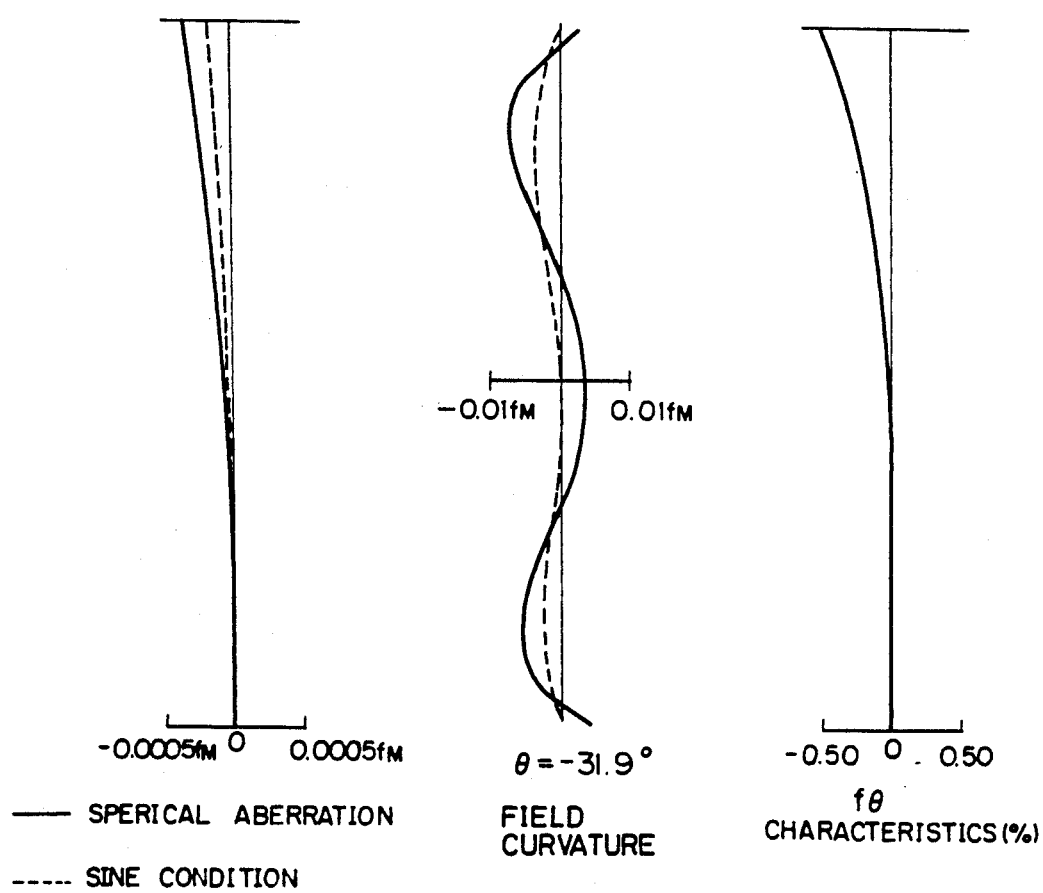

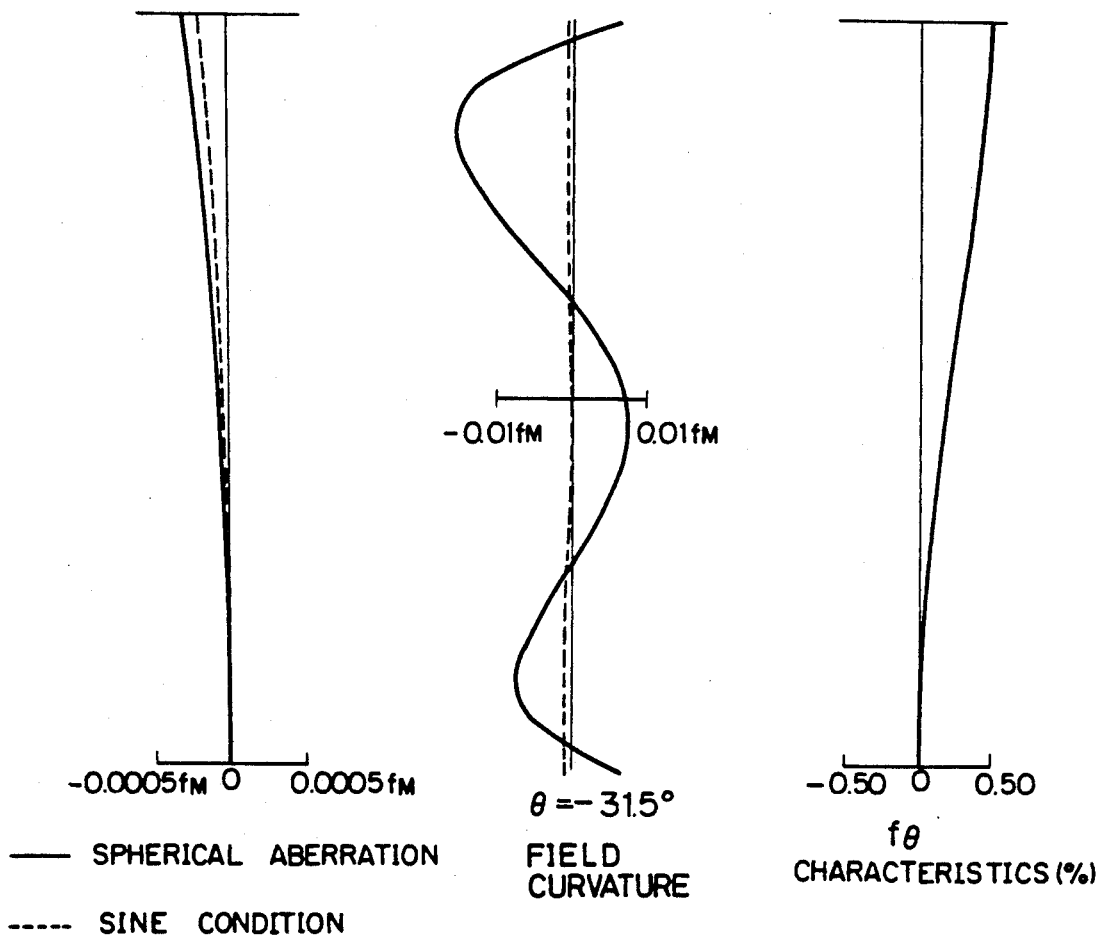

— SPHERICAL ABERRATION
---- SINE CONDITION

FIELD CURVATURE fθ CHARACTERISTICS (%)

Fig. 46a: FNo.=54.7; −0.0005fM to 0.0005fM; —— SPHERICAL ABERRATION; ----- SINE CONDITION

Fig. 46b: θ = 31.5°; −0.01fM to 0.01fM; θ = −31.5°; FIELD CURVATURE

Fig. 46c: θ = 31.5°; −0.50 to 0.50; fθ CHARACTERISTICS(%)

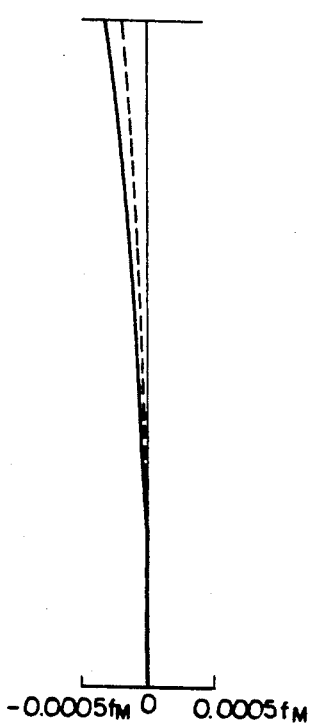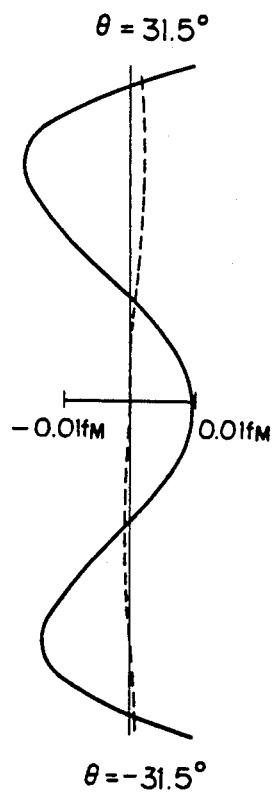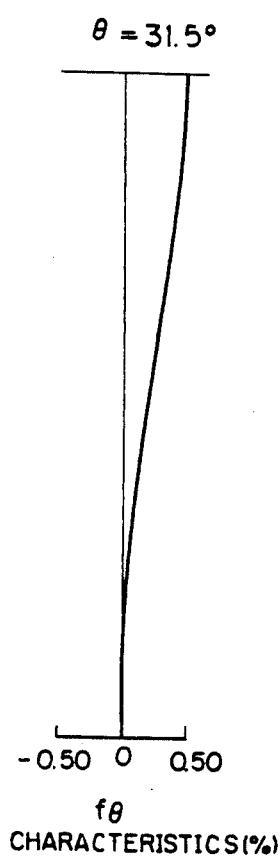

SPHERICAL ABERRATION
----- SINE CONDITION

FIELD CURVATURE fθ CHARACTERISTICS (%)

$F_{NO} = 54.7$

-0.0005f$_M$  0  0.0005f$_M$

—— SPHERICAL ABERRATION

----- SINE CONDITION $\theta = 31.5°$

-0.01f$_M$  0.01f$_M$ $\theta = -31.5°$

FIELD CURVATURE $\theta = 31.5°$

-0.50  0  0.50

$f\theta$ CHARACTERISTICS (%)

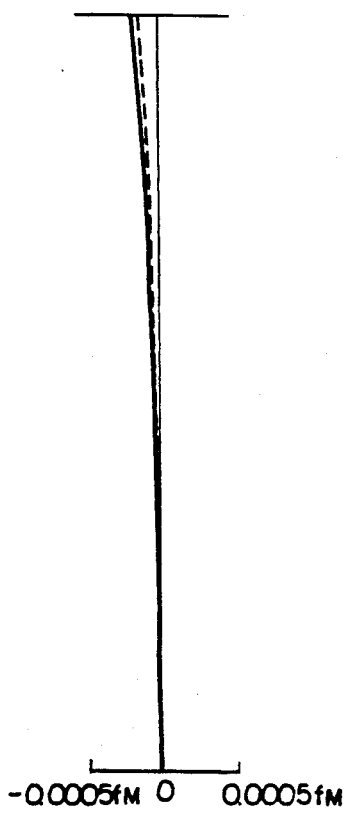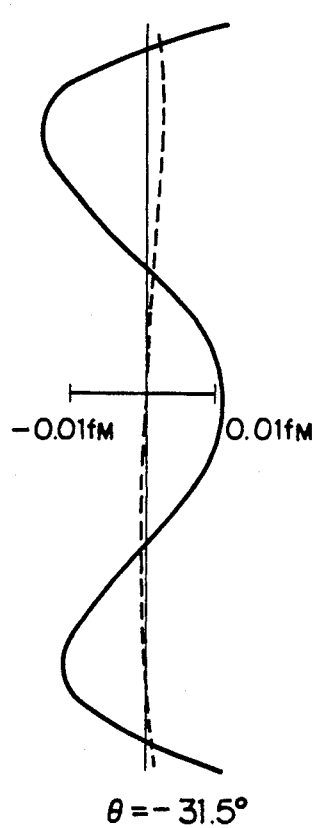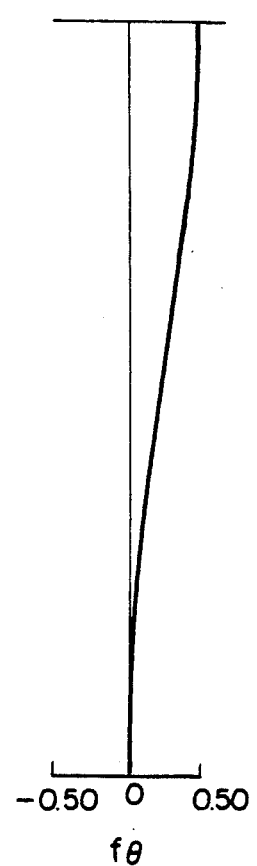
Fig. 50a — SPHERICAL ABERRATION / SINE CONDITION
Fig. 50b — FIELD CURVATURE
Fig. 50c — fθ CHARACTERISTICS (%)

$F_{NO} = 54.7$ $-0.0005f_M$  0  $0.0005f_M$

—— SPHERICAL ABERRATION

---- SINE CONDITION $\theta = 30.0°$ $-0.02f_M$  $0.02f_M$ $\theta = -30.0°$

FIELD CURVATURE $\theta = 30.0°$

-5.00  0  5.00

$f\theta$ CHARACTERISTICS(%)

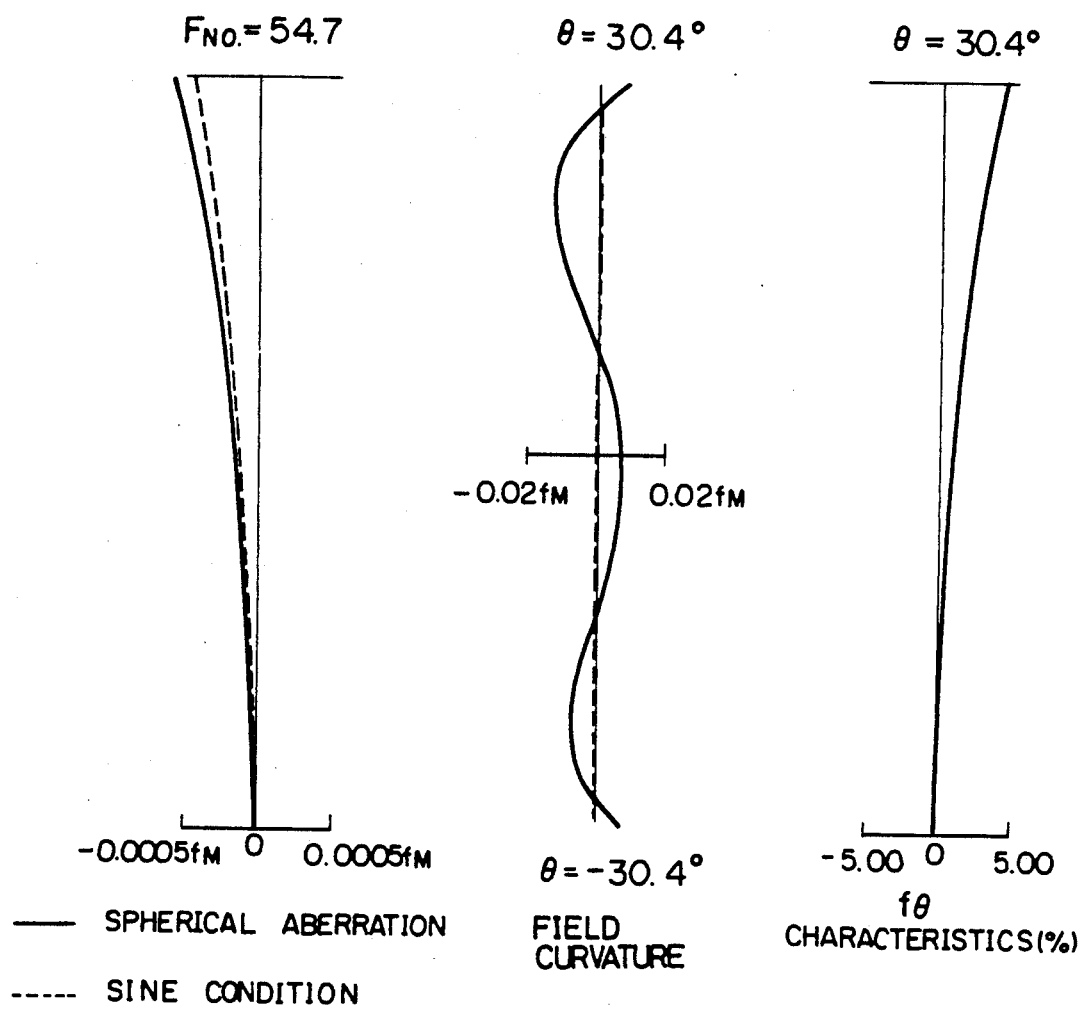

—— SPHERICAL ABERRATION
---- SINE CONDITION

FIELD CURVATURE fθ CHARACTERISTICS (%)

——— SPHERICAL ABERRATION
----- SINE CONDITION

FIELD CURVATURE fθ CHARACTERISTICS (%)

Fθ LENS SYSTEM IN OPTICAL SCANNER

BACKGROUND OF THE INVENTION

The present invention relates to an fθ lens system in an optical scanner using a rotary polygon mirror.

An optical scanner is known as a device for writing and reading information by scanning a light beam and is used in a laser printer, a facsimile, etc. In such an optical scanner, there is a device having an optically scanning system in which an approximately parallel light beam from a light source is focused and formed as a line image extending in a main scanning corresponding direction and this light beam is deflected at an equal angular velocity by a rotary polygon mirror having a reflecting face in the vincinity of an image forming position of the line image. In this system, the deflected light beam is further focused and formed on a scanned face in the shape of a spot by an image forming lens system to optically scan the scanned face.

In the optical scanner using the rotary polygon mirror, there is a problem about the inclination of the reflecting face. Further with respect to the deflected light beam, since the angular velocity of a deflector is constant, the scanned face is not scanned at a constant speed so that it is necessary to take measures for performing the scanning operation at the constant speed. An fθ lens system is a lens system for optically realizing the scanning operation of the scanned face at the constant speed. This lens system has an fθ function in which the height of an image formed by the incident light beam becomes fθ when an angle between the incident light beam and a lens optical axis is θ and the focal distance of the lens is f.

As a method for solving the problem of the reflecting face inclination, there is a known method in which a lens system disposed between the rotary polygon mirror and the scanned face is set to an anamorphic optical system, and a reflecting position of the rotary polygon mirror and the scanned face are connected to each other in a conjugate relation with respect to a secondary scanning direction.

Japanese Patent Application Laying Open (KOKAI) No. 59-147316 discloses an fθ lens system set as the anamorphic optical system to solve the problems about the scanning operation at a constant speed and the inclination of the reflecting face. This lens system has a large deflection angle, but it is not necessarily sufficient to correct a curve of an image face in the main and secondary scanning directions. Further, the diameter of an image forming spot on the scanned face is greatly varied depending on the scanning position so that it is difficult to realize the optically scanning operation of high density.

Further, when a normal f.tan θ lens is used, the scanned face is not scanned by the deflected light beam at a constant speed since the angular velocity of the rotary polygon mirror is constant. Japanese Patent Application Laying Open (KOKAI) No. 63-19617 discloses an fθ lens system set as the anamorphic optical system and using two lenses to solve the problems about the scanning operation at a constant speed and the inclination of the reflecting face. However, in this fθ lens system, it is not necessarily sufficient to correct a curvature of a field. Further, the diameter of an image forming spot on the scanned face is greatly varied depending on the scanning position so that it is difficult to realize the optically scanning operation of high density. Japanese Patent Application Laying Open (KOKAI) No. 61-120112 discloses an fθ lens system using a so-called saddle-type toric face and constructed by two lenses to preferably correct the field curvature. However, in this fθ lens system, a lot of aspherical faces are used and thereby the cost of the system is expensive. Further, the saddle-type toric face is used as a lens face of an elongated lens so that it is difficult to make the optical scanner compact.

Further, in this fθ lens system, the aspherical faces are used, it is difficult to process this lens system.

SUMMARY OF THE INVENTION

It is therefore an object of the present invention to provide a novel fθ lens system in an optical scanner for sufficiently correcting the curve of an image face in the main and secondary scanning directions and solving the problems about the inclination of a reflecting face in the rotary polygon mirror.

The above object of the present invention can be achieved by an fθ lens system in an optical scanner in which a light beam from a light source is formed as a line image extending in a main scanning corresponding direction and is deflected at an equal angular velocity by a rotary polygon mirror having a reflecting face in the vicinity of an image forming position of the line image and is then formed by an image forming lens system in the shape of a spot on a scanned face to optically scan the scanned face, the fθ lens system focusing and forming the light beam deflected by the rotary polygon mirror as an image on the scanned face, the fθ lens system comprising functional means having a function for connecting a reflecting position of the rotary polygon mirror and the scanned face in an approximately conjugate relation in geometrical optics with respect to a secondary scanning direction, the functional means having an fθ function with respect to a main scanning direction; and two groups of first and second lenses sequentially arranged from the side of the rotary polygon mirror toward the scanned face side; the lenses having first to fourth lens faces provided from the side of the rotary polygon mirror and having shapes on a deflecting plane sequentially composed of an arc, a straight line, a straight line and an arc from the first to fourth lens faces, the first and second lenses respectively having negative and positive refracting powers on a plane parallel to the deflecting plane.

The present invention also reside in an fθ lens system in an optical scanner in which an approximately parallel light beam from a light source is formed as a line image extending in a main scanning corresponding direction and is deflected at an equal angular velocity by a rotary polygon mirror having a reflecting face in the vicinity of an image forming position of the line image and is then formed by an image forming lens system in the shape of a spot on a scanned face to optically scan the scanned face at an approximately equal speed, the fθ lens system focusing and forming the light beam deflected by the rotary polygon mirror as an image on the scanned face, the fθ lens system comprising functional means having a function for connecting a reflecting position of the rotary polygon mirror and the scanned face in an approximately conjugate relation in geometrical optics with respect to a secondary scanning direction, the functional means having an fθ function with respect to a main scanning direction; and two groups of first and second lenses sequentially arranged from the side of the rotary polygon mirror toward the scanned face side; the lenses having first to fourth lens faces provided from the side of the rotary polygon mirror and having shapes on a deflecting plane sequentially composed of an arc, an arc, a straight line and an arc from the first to fourth lens faces.

The present invention also resides in an $f\theta$ lens system in an optical scanner in which an approximately parallel light beam from a light source is formed as a line image extending in a main scanning corresponding direction and is deflected at an equal angular velocity by a rotary polygon mirror having a reflecting face in the vicinity of an image forming position of the line image and is then formed by an image forming lens system in the shape of a spot on a scanned face to optically scan the scanned face at an approximately equal speed, the $f\theta$ lens system focusing and forming the light beam deflected by the rotary polygon mirror as an image on the scanned face, the $f\theta$ lens system comprising functional means having a function for connecting a reflecting position of the rotary polygon mirror and the scanned face in an approximately conjugate relation in geometrical optics with respect to a secondary scanning direction, the functional means having an $f\theta$ function with respect to a main scanning direction; and two groups of first and second lenses sequentially arranged from the side of the rotary polygon mirror toward the scanned face side; the lenses having first to fourth lens faces provided from the side of the rotary polygon mirror and having shapes on a deflecting plane sequentially composed of a straight line, an arc, a straight line and an arc from the first to fourth lens faces, the first and second lenses respectively having negative and positive refracting powers on a plane parallel to the deflecting plane.

The present invention also resides in an $f\theta$ lens system in an optical scanner in which an approximately parallel light beam from a light source is formed as a line image extending in a main scanning corresponding direction and is deflected at an equal angular velocity by a rotary polygon mirror having a reflecting face in the vicinity of an image forming position of the line image and is then formed by an image forming lens system in the shape of a spot on a scanned face to optically scan the scanned face at an approximately equal speed, the $f\theta$ lens system focusing and forming the light beam deflected by the rotary polygon mirror as an image on the scanned face, the $f\theta$ lens system comprising functional means having a function for connecting a reflecting position of the rotary polygon mirror and the scanned face in an approximately conjugate relation in geometrical optics with respect to a secondary scanning direction, the functional means having an $f\theta$ function with respect to a main scanning direction; and two groups of first and second lenses sequentially arranged from the side of the rotary polygon mirror toward the scanned face side; the lenses having first to fourth lens faces provided from the side of the rotary polygon mirror and having shapes on a deflecting plane sequentially composed of a straight line, an arc, an arc and an arc from the first to fourth lens faces, the first and second lenses respectively having a positive refracting power on a plane parallel to the deflecting plane.

Further objects and advantages of the present invention will be apparent from the following description of the preferred embodiments of the present invention as illustrated in the accompanying drawings.

BRIEF DESCRIPTION OF THE DRAWINGS

FIGS. 1a and 1b are views for explaining lens shapes of an $f\theta$ lens system in the present invention;

FIGS. 11 to 19 are aberration diagrams, diagrams showing curves of image faces and graphs of $f\theta$ characteristics described with respect to respective embodiments of the present invention;

FIGS. 20a and 20b are views for explaining lens shapes of the $f\theta$ lens system in another embodiment of the present invention;

FIGS. 23 to 31 are aberration diagrams, diagrams showing curvatures of fields and graphs of $f\theta$ characteristics described with respect to respective embodiments of the present invention;

FIGS. 33 to 35 are aberration diagrams, diagrams showing curves of image faces and graphs of $f\theta$ characteristics described with respect to respective embodiments of the present invention;

FIGS. 37 to 39 are aberration diagrams, diagrams showing curvatures of fields and graphs of $f\theta$ characteristics described with respect to respective embodiments of the present invention;

FIGS. 41 to 50 are aberration diagrams, diagrams showing curvatures of fields and graphs of $f\theta$ characteristics described with respect to respective embodiments of the present invention;

FIGS. 52 to 55 are aberration diagrams, diagrams showing curvatures of fields and graphs of $f\theta$ characteristics described with respect to respective embodiments of the present invention.

DESCRIPTION OF THE PREFERRED EMBODIMENTS

Figure 2:
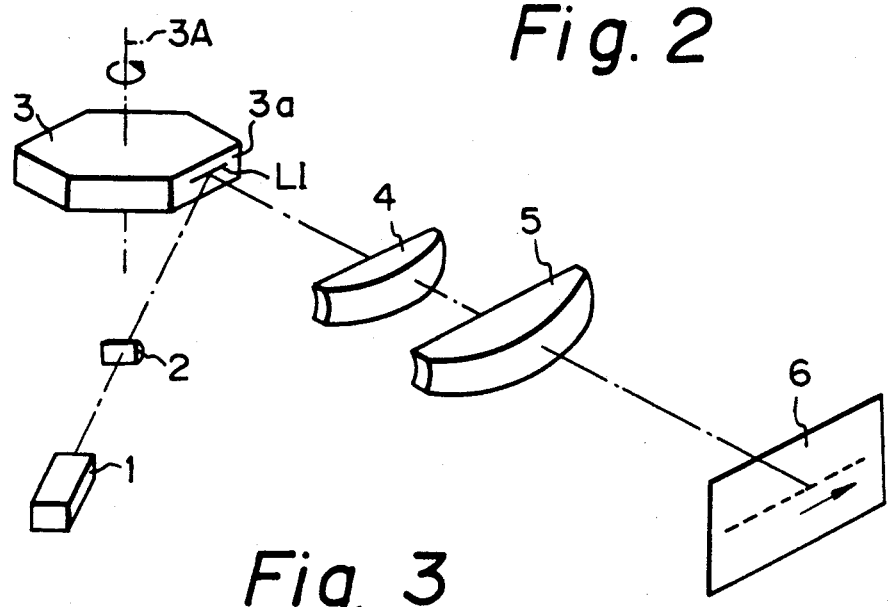
FIGS. 2 to 8 are views for explaining an optical scanner.

The preferred embodiments of an $f\theta$ lens system in an optical scanner of the present invention will now be described in detail with reference to the accompanying drawings.

With respect to the $f\theta$ lens system of the present invention, in an optical scanner, a light beam from a light source is focused and formed as a line image and this light beam is deflected at an equal angular velocity by a rotary polygon mirror having a reflecting face in the vicinity of an image forming position of the line image. This deflected light beam is focused and formed in the shape of a spot on a scanned face by an image forming lens system to optically scan the scanned face. The above $f\theta$ lens system is a lens system for focusing and forming the light beam deflected by the rotary polygon mirror as an image on the scanned face in the optical scanner. The above fθ lens system has a function for connecting a reflecting position of the rotary polygon mirror and the scanned face in a conjugate relation with respect to a secondary scanning direction, and an fθ function.

This fθ lens system is constructed by two groups of first and second lenses sequentially arranged from the side of the rotary polygon mirror toward the scanned face side. Further, in this fθ lens system, when the respective lens faces are set from first to fourth faces arranged from the side of the above rotary polygon mirror, these lens faces on a deflecting plane sequentially have the shapes of an arc, a straight line, a straight line and an arc from the first face toward the fourth face. The first and second lenses respectively have negative and positive refracting powers on a plane parallel to the deflecting plane.

The first lens face is constructed by a concave barrel type toric face having a radius of curvature on the deflecting perpendicular plane reduced as this face is separated from the optical axis. The second lens face is constructed by a convex cylindrical face or planar face having a refracting power on only the deflecting perpendicular plane. The third lens face is constructed by a concave cylindrical face having a refracting power on only the deflecting perpendicular plane. The fourth lens face is constructed by a convex toric face having a large curvature on the deflecting perpendicular plane.

When a combined focal distance on the deflecting perpendicular plane in the fθ lens system is set to $f_S$ and a radius of curvature of the above third face on the deflecting perpendicular plane is set to $r'_3$, the following condition with respect to the $r'_3$ and the $f_S$ is satisfied.

$$1.6 \leq |r'_3/f_S| \leq 3.1 \qquad (I)$$

The respective lens faces of the fθ lens system in the present invention will next be described with reference to FIGS. 1a and 1b. In each of these FIGS. 1a and 1b, the left-hand side is the side of the rotary polygon mirror and the right-hand side is the side of the scanned face. Accordingly, with respect to the lenses, the first lens is located on the left-hand side and the second lens is located on the right-hand side. The first to fourth lens faces are sequentially represented from the left toward the right. The upper views of the respective FIGS. 1a and 1b show lens shapes of the fθ lens system on the deflecting plane and the lower views thereof show lens shapes on the deflecting perpendicular plane.

Here, "the deflecting plane" is a plane formed by moving the light beam on an optical axis ideally deflected by the rotary polygon mirror. "The deflecting perpendicular plane" is a plane passing through an optical axis of the fθ lens system and perpendicular to the above deflecting plane. The deflecting plane corresponds to an ideal main scanning direction with respect to an intersection line thereof crossing the scanned face. Therefore, the upper views of the respective FIGS. 1a and 1b are shown as "main". Similarly, the deflecting perpendicular plane corresponds to the secondary scanning direction and therefore the lower views of the respective FIGS. 1a and 1b are shown as "secondary".

The difference in shape between the fθ lens systems shown in FIGS. 1a and 1b resides in the second face shape. Namely, the second lens face in FIG. 1a is a planar face, and the second lens face in FIG. 1b is a convex cylindrical face having a refracting power on only the deflecting perpendicular plane.

As shown in the respective upper views of FIGS. 1a and 1b, the first to fourth lens face shapes on the deflecting plane are sequentially constructed by an arc, a straight line, a straight line and an arc. The refracting power on the plane parallel to the deflecting plane is negative with respect to the first lens and is positive with respect to the second lens.

The respective views of the FIGS. 1a and 1b also show whether the lens function on the above deflecting plane and the deflecting perpendicular plane is convex or concave.

The above-mentioned condition (I) will next be described in detail.

It is possible to preferably correct the field curvature in the main and secondary scanning directions by the construction of the above-mentioned lens faces in the fθ lens system.

However, it is necessary to further satisfy the above condition (I) so as to correct the image face curve in the secondary scanning direction.

Namely, in the case in which the reflecting face inclination is corrected by the above-mentioned lens face construction, when an absolute value in the following condition, $$1.6 \leq |r'_3/f_S| \leq 3.1 \qquad (I)$$

exceeds a lower limit, the image forming position in the secondary scanning direction is greatly shifted from the scanned face in the direction opposite to the rotary polygon. When this absolute value exceeds an upper limit, the image forming position in the secondary scanning direction is greatly shifted from the scanned face toward the rotary polygon. Accordingly, in a case in which the condition (I) is not satisfied, the field curvature in the secondary scanning direction becomes excessively large.

Figure 3:
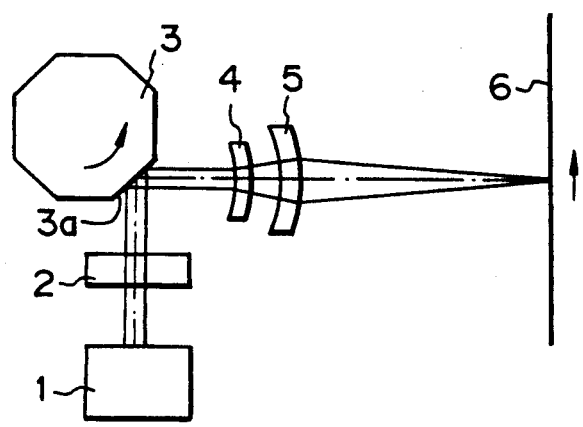

FIG. 2 schematically shows one example of an optical scanner using the fθ lens system. FIG. 3 shows a state of an optical arrangement of FIG. 2 seen from the secondary scanning direction, i.e., the situation of the optical arrangement on the deflecting plane.

A parallel light beam is emitted from a light source device 1 composed of a light source or the light source and a condenser, and is focused and formed by a cylindrical lens 2 constructing a line image forming optical system as a line image LI approximately parallel to a deflecting plane in the vicinity of a reflecting face 3a of a rotary polygon mirror 3. The longitudinal direction of this line image is a main scanning corresponding direction.

The light beam reflected by the rotary polygon mirror 3 is focused and formed by the fθ lens system in the shape of a spot on the scanned face 6. The scanned face 6 is scanned at an equal speed in accordance with the rotation at an equal speed in an arrow direction of the rotary polygon mirror 3.

Figure 4:
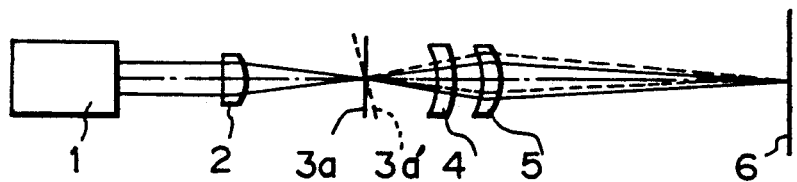

The fθ lens system is constructed by a first lens 4 and a second lens 5 respectively disposed on the sides of the rotary polygon mirror 3 and the scanned face 6. As shown in FIGS. 2 and 3, on the deflecting plane, the fθ lens system having the lenses 4 and 5 connects the infinity on the light source side to the position of the scanned face 6 in a conjugate relation in geometrical optics. In contrast to this, on the deflecting perpendicular plane, i.e., with respect to the secondary scanning direction, the fθ lens system connects a reflecting position of the rotary polygon mirror 3 to the scanned face 6 in an approximately conjugate relation in geometrical optics. Accordingly, as shown in FIG. 4, even when the reflecting face 3a is inclined as shown by reference numeral 3a', the image forming position on the scanned face 6 provided by the fθ lens system does not almost move in the secondary scanning direction (in the vertical direction in FIG. 4), thereby correcting the inclination of the reflecting face.

Figure 5:
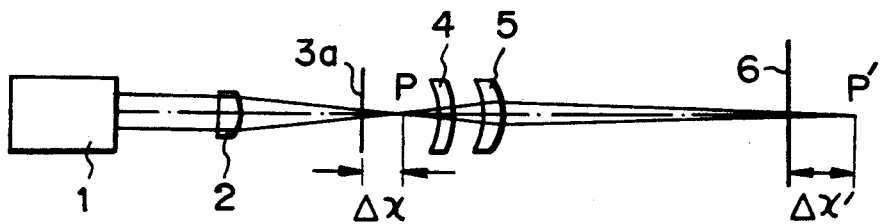

When the rotary polygon mirror 3 is rotated, the reflecting face 3a is rotated around a shaft 3A. Therefore, as shown in FIG. 5, a position shift $\Delta X$ is caused between the image forming position P of the linear image and the reflecting face 3a by the rotation of the reflecting face. Thus, a position P' of a conjugate image of the linear image provided by the fθ lens system is shifted by $\Delta X'$ from the scanned face 6.

As is well known, this shift amount $\Delta X'$ is provided by $\Delta X' = \beta^2 \Delta X$ when a lateral magnification of the fθ lens system in the secondary scanning direction is $\beta$.

Figure 6:
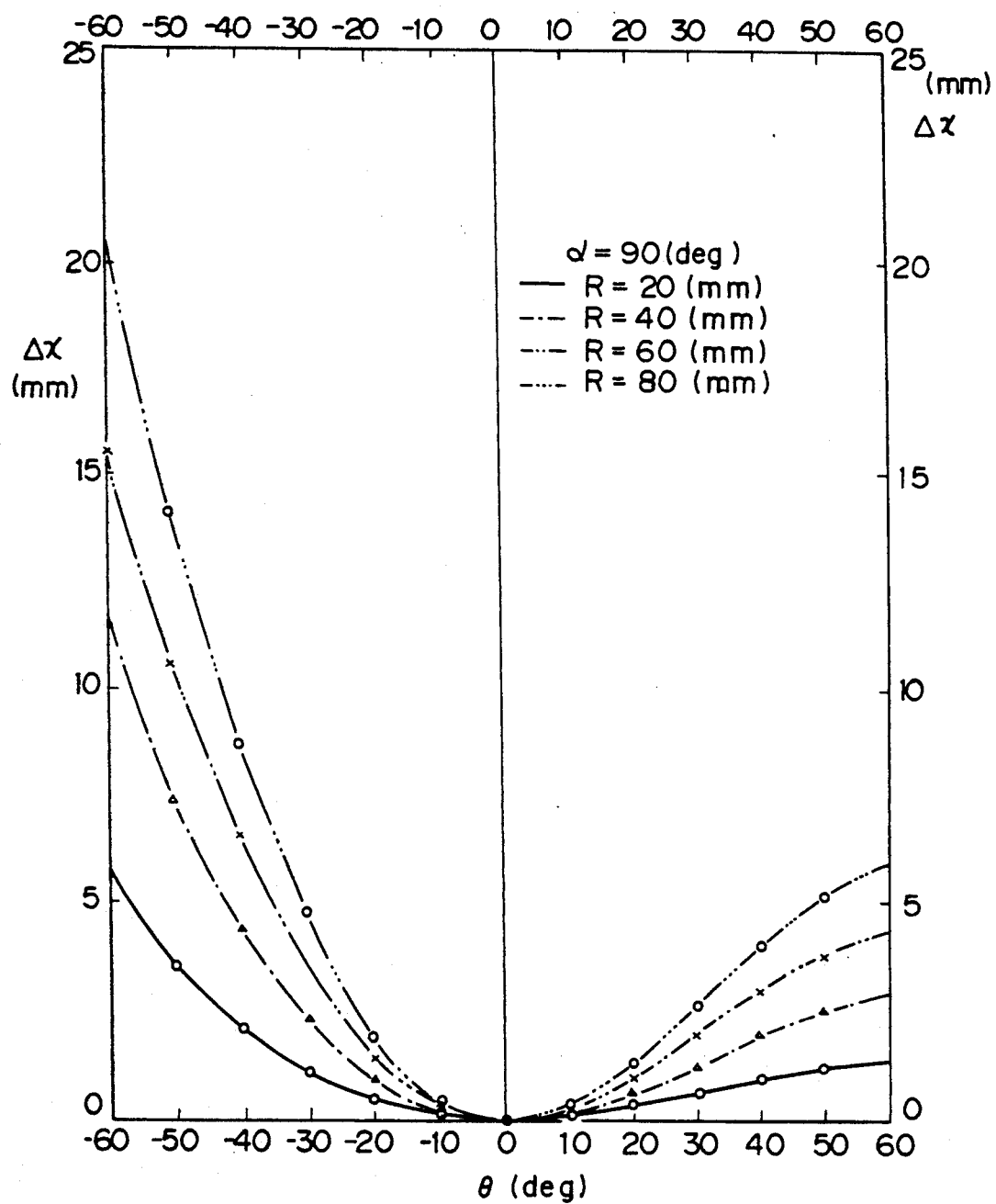
Figure 7:
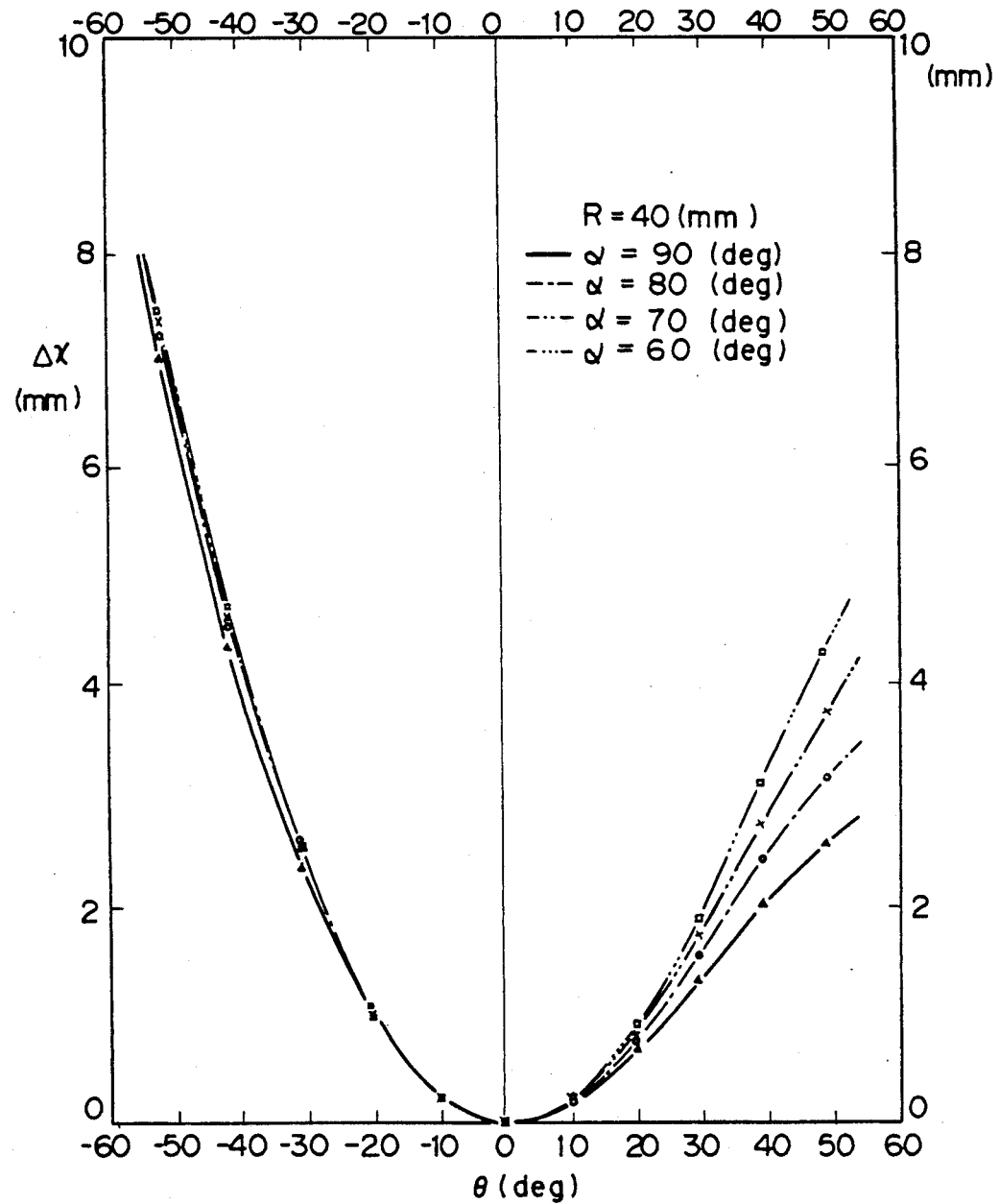

When an angle between a lens optical axis of the fθ lens system and a main deflected light beam is set to $\theta$ on the deflecting plane, the relation between the $\theta$ and the above $\Delta X$ is shown in FIGS. 6 and 7. FIG. 6 shows this relation when an intrinsic incident angle $\alpha$ (see FIG. 8) is 90 degrees and a radius R of an inscribed circle of the rotary polygon mirror 3 is a parameter. FIG. 7 shows the above relation when the radius R of this inscribed circle is set to 40 mm and the intrinsic incident angle $\alpha$ is a parameter.

As can be seen from FIGS. 6 and 7, the $\Delta X$ increases as the radius R of the inscribed circle increases and the intrinsic incident angle $\alpha$ decreases.

The relative shift in position between the position of the linear image and the reflecting face by the rotation of the reflecting face is caused two-dimensionally on the deflecting plane and moves asymmetrically with respect to the lens optical axis.

Accordingly, in the optical scanner as shown in FIG. 2, it is necessary to preferably correct the curvature of a field in the main and secondary scanning directions of the fθ lens system. Further, the fθ characteristics must be preferably corrected with respect to the main scanning direction.

Figure 8:
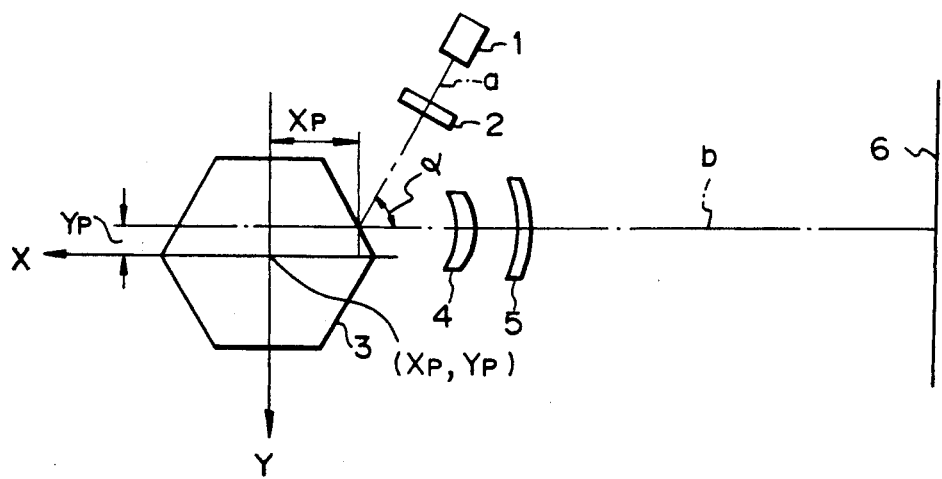

With respect to the above-mentioned incident angle $\alpha$, in FIG. 8, reference numeral a designates a light beam on the optical axis incident onto the rotary polygon mirror, and reference numeral b designates an optical axis of the fθ lens system. The X and Y axes are determined as shown in FIG. 8 with an intersection point of the main light beam a and the optical axis b of the fθ lens system as an origin. The position coordinates on a rotary axis of the rotary polygon mirror 3 are respectively set to $X_p$ and $Y_p$.

The incident angle $\alpha$ is defined as the intersection angle of the main light beam a and the optical axis b of the fθ lens system as shown in FIG. 8.

As is well known, to reduce the change in position shift amount $\Delta X$ between the above position of the line image and the reflecting face as much as possible, it is enough to set the following conditions with respect to the $X_p$ and the $Y_p$, $$0 < X_p < R' \cos(\alpha/2)$$

$$0 < Y_p < R' \sin(\alpha/2)$$

when the radius of a circumscribed circle of the rotary polygon mirror is set to $R'$.

Further, to locate the incident light beam a on the optical axis outside an effective region such that a return light from the scanned face 6 is not incident again as a ghost light to a main scanning region on the scanned face, it is enough to set the following condition, $$\theta < \alpha < (4\pi/N) - \theta$$

with respect to the above angle $\alpha$ where the number of faces of the rotary polygon mirror 3 is N.

Figure 9:
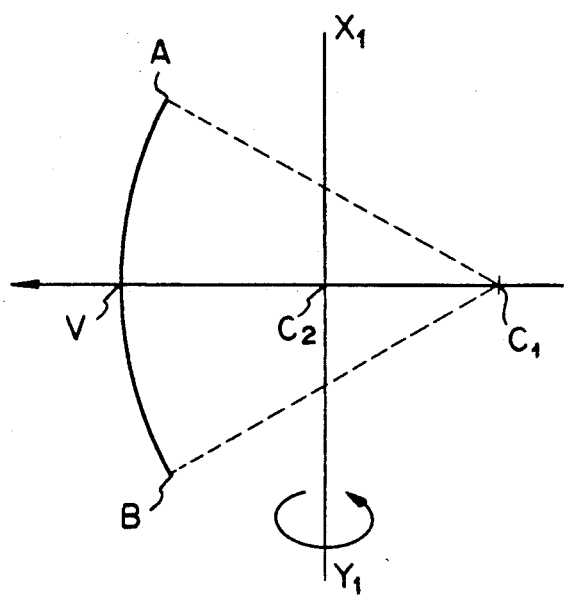
FIGS. 9 and 10 are views for explaining a barrel type toric face.
Figure 10:
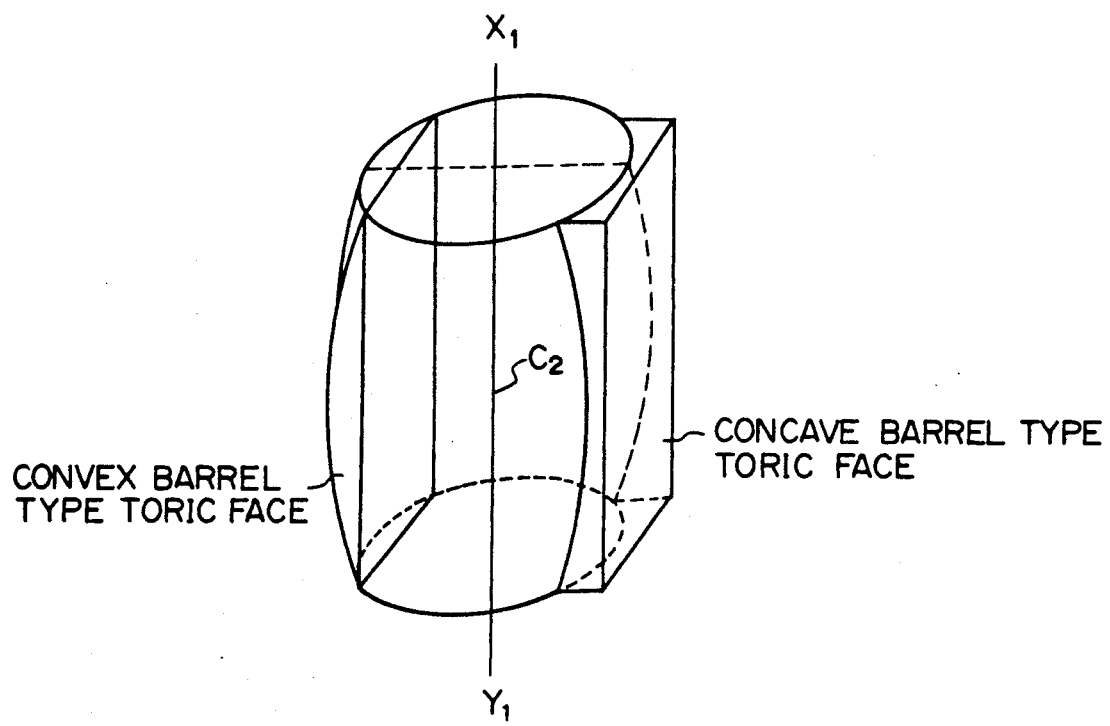

A barrel type toric face constituting one of the features of the present invention will next be described. In FIG. 9, a curve passing through points A, V and B constitutes an arc around a central position $C_1$. When this arc is rotated around a straight line $X_1$—$Y_1$ as an axis, a curve of a beer barrel type is obtained as shown in FIG. 10. This curve constitutes a barrel type toric face. When this barrel type toric face is used as a lens face, it is possible to use this lens face as a convex face and a concave face. In the present invention, the concave barrel type toric face is used as the first lens face as mentioned above.

The radius of curvature of the barrel type toric face on a plane perpendicular to the $X_1$—$Y_1$ axis is reduced as this toric face is separated from a point $C_2$. This radius of curvature is equal to the distance between the $X_1$—$Y_1$ axis and the toric face.

Accordingly, in the present invention, the direction of the $X_1$—$Y_1$ axis is constructed to be parallel to the main scanning direction on the deflecting plane.

The concrete embodiments 1 to 9 of the present invention will next be described in detail in the following description.

In the respective embodiments, reference numeral $f_M$ shows a combined focal distance with respect to the main scanning direction of the fθ lens system, i.e., the combined focal distance on a plane parallel to the deflecting plane. This value $f_M$ is normalized to 100. Reference numeral $f_S$ shows a combined focal distance on the deflecting perpendicular plane, i.e., the combined focal distance with respect to the secondary scanning direction. Reference numerals $2\theta$, $\alpha$ and $\beta$ respectively designate a deflection angle (unit: degree), the above-mentioned intrinsic incident angle (unit: degree) and a lateral magnification on the deflecting perpendicular plane.

Reference numeral $r_{iX}$ designates a radius of curvature of an i-th lens face on the deflecting plane counted from the side of the rotary polygon mirror, i.e., the radius of curvature of lens face shapes represented in the respective upper views shown as "main" in FIGS. 1a and 1b. Reference numeral $r_{iY}$ designates a radius of curvature of the i-th lens face on the deflecting perpendicular plane, i.e., the radius of curvature of lens face shapes represented in the respective lower views shown as "secondary" in FIGS. 1a and 1b. In particular, an $r_{1Y}$ is provided to explain this radius as an $r'_1$ in the condition (I). Accordingly, with respect to the first lens face, an $r_{1X}$ designates a distance between points V and $C_1$ in FIG. 9, and the $r_{1Y}$ designates a distance between the points V and $C_2$. Reference numeral $d_i$ designates a distance between the i-th lens faces. Reference numeral $d_0$ designates a distance from the reflecting face of the rotary polygon mirror to the first lens face. Reference numeral $n_j$ designates a refractive index of a j-th lens.

Further, reference numeral K designates a parameter of the above condition (I).

EMBODIMENT 1

$f_M = 100, f_s = 16.59, \beta = -2.009, \alpha = 54, 2\theta = 63.1$
$K = 3.073, d_0 = 7.816$

| i | $r_{ix}$ | $r_{iy}$ | $d_i$ | j | $n_i$ |
|---|---|---|---|---|---|
| 1 | −112.654 | −3.607 | 5.531 | 1 | 1.71221 |
| 2 | ∞ | ∞ | 10.943 | | |
| 3 | ∞ | −50.986 | 6.373 | 2 | 1.67500 |
| 4 | −46.055 | −10.39 | | | |

FIGS. 11a, 11b and 11c respectively show an aberration diagram, a diagram showing a field curvature and an fθ characteristic graph with respect to the embodiment 1. The image face curve is shown in relation to the rotation of the rotary polygon mirror and a broken line shows the field curvature in the main scanning direction and a solid line shows the image face curve in the secondary scanning direction. The fθ characteristics are defined by $(h-f_M\theta)100/f_M\theta$ when the height of an ideal image is $f_M\theta$ and the height of the real image is h.

EMBODIMENT 2

$f_M = 100, f_s = 21.695, \beta = -3.963, \alpha = 54, 2\theta = 63.1$
$K = 1.868, d_0 = 7.816$

| i | $r_{ix}$ | $r_{iy}$ | $d_i$ | j | $n_i$ |
|---|---|---|---|---|---|
| 1 | −112.654 | −96.199 | 5.531 | 1 | 1.71221 |
| 2 | ∞ | ∞ | 10.943 | | |
| 3 | ∞ | −40.524 | 6.373 | 2 | 1.67500 |
| 4 | −46.055 | −11.295 | | | |

FIGS. 12a, 12b and 12c respectively show an aberration diagram, a diagram of a field curvature and an fθ characteristic graph with respect to the embodiment 2.

EMBODIMENT 3

$f_M = 100, f_s = 21.634, \beta = -3.565, \alpha = 54, 2\theta = 63.1$
$K = 2.023, d_0 = 7.816$

| i | $r_{ix}$ | $r_{iy}$ | $d_i$ | j | $n_i$ |
|---|---|---|---|---|---|
| 1 | −112.654 | −24.05 | 5.531 | 1 | 1.71221 |
| 2 | ∞ | ∞ | 10.943 | | |
| 3 | ∞ | −43.771 | 6.373 | 2 | 1.67500 |
| 4 | −46.055 | −11.159 | | | |

FIGS. 13a, 13b and 13c respectively show an aberration diagram, a diagram of a field curvature and an fθ characteristic graph with respect to the embodiment 3.

EMBODIMENT 4

$f_M = 100, f_s = 20.345, \beta = -3.682, \alpha = 54, 2\theta = 63.4$
$K = 1.814, d_0 = 5.411$

| i | $r_{ix}$ | $r_{iy}$ | $d_i$ | j | $n_i$ |
|---|---|---|---|---|---|
| 1 | −113.348 | −18.037 | 4.209 | 1 | 1.71221 |
| 2 | ∞ | ∞ | 13.468 | | |
| 3 | ∞ | −36.916 | 6.012 | 2 | 1.67500 |
| 4 | −46.536 | −10.702 | | | |

FIGS. 14a, 14b and 14c respectively show an aberration diagram, a diagram of a field curvature and an fθ characteristic graph with respect to the embodiment 4.

EMBODIMENT 5

$f_M = 100, f_s = 17.419, \beta = -2.788, \alpha = 54, 2\theta = 63.4$
$K = 2.209, d_0 = 5.411$

| i | $r_{ix}$ | $r_{iy}$ | $d_i$ | j | $n_i$ |
|---|---|---|---|---|---|
| 1 | −113.348 | −5.531 | 4.209 | 1 | 1.71221 |
| 2 | ∞ | ∞ | 13.468 | | |
| 3 | ∞ | −38.48 | 6.012 | 2 | 1.67500 |
| 4 | −46.536 | −10.434 | | | |

Figure 15A:
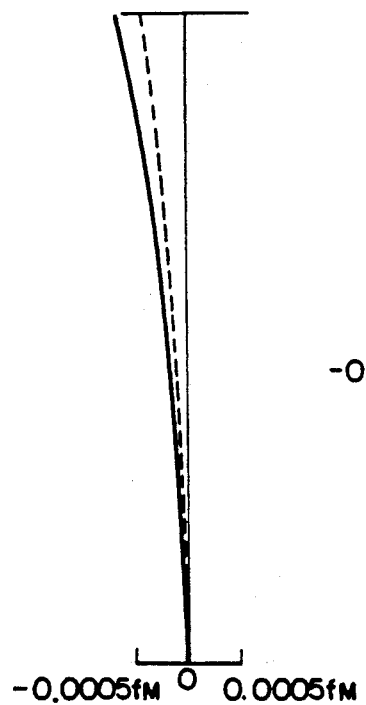
Figure 15B:
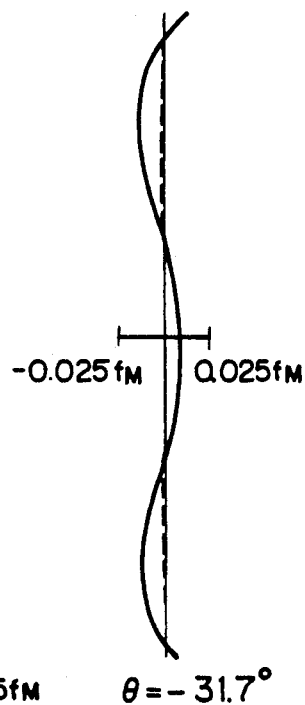
Figure 15C:
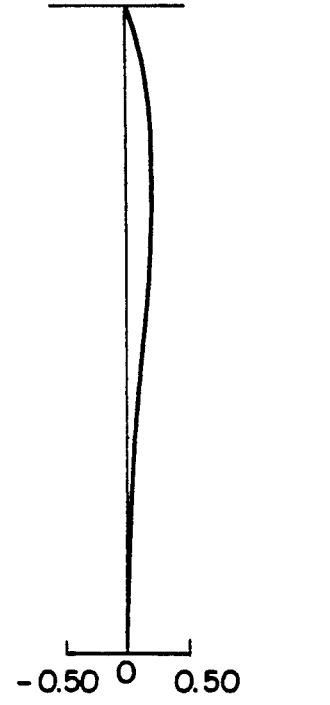

FIGS. 15a, 15b and 15c respectively show an aberration diagram, a diagram of a field curvature and an fθ characteristic graph with respect to the embodiment 5.

EMBODIMENT 6

$f_M = 100, f_s = 20.967, \beta = -4.088, \alpha = 54, 2\theta = 63.4$
$K = 1.703, d_0 = 5.411$

| i | $r_{ix}$ | $r_{iy}$ | $d_i$ | j | $n_i$ |
|---|---|---|---|---|---|
| 1 | −113.348 | −60.125 | 4.209 | 1 | 1.71221 |
| 2 | ∞ | ∞ | 13.468 | | |
| 3 | ∞ | −35.714 | 6.012 | 2 | 1.67500 |
| 4 | −46.536 | −10.798 | | | |

FIGS. 16a, 16b and 16c respectively show an aberration diagram, a diagram of a field curvature and an fθ characteristic graph with respect to the embodiment 6.

EMBODIMENT 7

$f_M = 100, f_s = 21.051, \beta = -4.175, \alpha = 54, 2\theta = 63.4$
$K = 1.679, d_0 = 5.411$

| i | $r_{ix}$ | $r_{iy}$ | $d_i$ | j | $n_i$ |
|---|---|---|---|---|---|
| 1 | −113.348 | −108.224 | 4.209 | 1 | 1.71221 |
| 2 | ∞ | ∞ | 13.468 | | |
| 3 | ∞ | −35.353 | 6.012 | 2 | 1.67500 |
| 4 | −46.536 | −10.811 | | | |

FIGS. 17a, 17b and 17c respectively show an aberration diagram, a diagram of a field curvature and an fθ characteristic graph with respect to the embodiment 7.

In these embodiments 1 to 7, the respective lens face shapes on a deflecting plane and a plane perpendicular to this deflecting plane are shown in FIG. 1a.

EMBODIMENT 8

$f_M = 100, f_s = 19.704, \beta = -2.71, \alpha = 54, 2\theta = 63.1$
$K = 2.374, d_0 = 7.816$

| i | $r_{ix}$ | $r_{iy}$ | $d_i$ | j | $n_i$ |
|---|---|---|---|---|---|
| 1 | −112.654 | −6.012 | 5.531 | 1 | 1.71221 |
| 2 | ∞ | −51.707 | 10.943 | | |
| 3 | ∞ | −46.777 | 6.373 | 2 | 1.67500 |
| 4 | −46.055 | −10.841 | | | |

FIGS. 18a, 18b and 18c respectively show an aberration diagram, a diagram of a field curvature and an fθ characteristic graph with respect to the embodiment 8.

EMBODIMENT 9

$f_M = 100, f_s = 18.803, \beta = -3.691, \alpha = 54, 2\theta = 63.4$
$K = 1.746, d_0 = 5.411$

| i | $r_{ix}$ | $r_{iy}$ | $d_i$ | j | $n_i$ |
|---|---|---|---|---|---|
| 1 | −113.348 | −5.531 | 4.209 | 1 | 1.71221 |
| 2 | ∞ | −12.025 | 13.468 | | |
| 3 | ∞ | −44.853 | 6.012 | 2 | 1.67500 |

-continued

| | $f_M = 100, f_s = 18.803, \beta = -3.691, \alpha = 54, 2\theta = 63.4$ $K = 1.746, d_0 = 5.411$ | | | | |
|---|---|---|---|---|---|
| i | $r_{ix}$ | $r_{iy}$ | $d_i$ | j | $n_i$ |
| 4 | −46.536 | −10.841 | | | |

FIGS. 19a, 19b and 19c respectively show an aberration diagram, a diagram of a field curvature and an fθ characteristic graph with respect to the embodiment 9.

In these embodiments 8 and 9, the respective lens face shapes on a deflecting plane and a plane perpendicular to this deflecting plane are shown in FIG. 1b.

In the respective embodiments of the present invention mentioned above, the aberration is preferably provided and the curvature of a field is particularly corrected very preferably in the main and secondary scanning directions. Further, the fθ characteristics are also preferable in these embodiments.

As mentioned above, the present invention can provide a novel fθ lens system in an optical scanner. Since this fθ lens system is constructed as above, it is possible to preferably correct the inclination of a reflecting face in the rotary polygon mirror and the curvature of a field in the main and secondary scanning directions, thereby performing an optically scanning operation of high density.

Another embodiment of the present invention will next be described.

In the fθ lens system of the present invention, in an optical scanner, an approximately parallel light beam from a light source is focused and formed as a linear image extending in a main scanning corresponding direction and this light beam is deflected at an equal angular velocity by a rotary polygon mirror having a reflecting face in the vicinity of an image forming position of the linear image. This deflected light beam is focused and formed as an image in the shape of a spot on a scanned face by an image forming lens system to optically scan the scanned face at an approximately equal speed. The above fθ lens system is a lens system for focusing and forming the light beam deflected by the rotary polygon mirror as an image on the scanned face in the optical scanner. The above fθ lens system has a function for connecting a reflecting position of the rotary polygon mirror and the scanned face in an approximately conjugate relation in geometrical optics with respect to a secondary scanning direction, and an fθ function with respect to the main scanning direction.

This fθ lens system is constructed by two groups of first and second lenses sequentially arranged from the side of the rotary polygon mirror toward the scanned face side. Further in this fθ lens system, when the respective lens faces are set from first to fourth faces arranged from the side of the above rotary polygon mirror, these lens faces on a deflecting plane sequentially have the shapes of an arc, a straight line, a straight line and an arc from the first face toward the fourth face. The first and second lenses respectively have negative and positive refracting powers on a plane parallel to the deflecting plane.

The first lens face is constructed by a concave barrel type toric face having an absolute value of a radius of curvature on the deflecting perpendicular plane reduced as this face is separated from an optical axis. The second lens face is constructed by a concave cylindrical face having a refracting power on only the deflecting perpendicular plane. The third lens face is constructed by a concave cylindrical face having a refracting power on only the deflecting perpendicular plane. The fourth lens face is constructed by a convex toric face having a large curvature on the deflecting perpendicular plane.

When a combined focal distance on the deflecting perpendicular plane is set to $f_S$ and the radii of curvature of the above first to fourth faces on the deflecting perpendicular plane are respectively set to $r'_1$ to $r'_4$, the following condition with respect to these values is satisfied.

$$2.0 < |[\{(1/r'_1)-(1/r'_2)\}-\{(1/r'_3)-(1/r'_4)\}] \cdot f_S| < 9.8 \quad \text{(II)}$$

The respective lens faces of the fθ lens system in the present invention will next be described with reference to FIGS. 20a and 20b. In this embodiment, "the deflecting plane" is a plane formed by moving the light beam on an optical axis ideally deflected by the rotary polygon mirror. "The deflecting perpendicular plane" is a plane parallel to an optical axis of the fθ lens system and perpendicular to the above deflecting plane.

In each of these FIGS. 20a and 20b, the left-hand side is the side of the rotary polygon mirror and the right-hand side is the side of the scanned face. Accordingly, with respect to the lenses, the first lens is located on the left-hand side and the second lens is located on the right-hand side. The first to fourth lens faces are sequentially represented from the left toward the right. The upper views of the respective FIGS. 20a and 20b show lens shapes of the fθ lens system on the deflecting plane and the lower views thereof show lens shapes on the deflecting perpendicular plane.

In these FIGS. 20a and 20b, the meanings of "main", "secondary", "convex" and "concave" are similar to those in the above-mentioned embodiments of the present invention.

As shown in the respective upper views of FIGS. 20a and 20b, the first to fourth lens face shapes on the deflecting plane are sequentially constructed by an arc, a straight line, a straight line and an arc. The refracting power on the plane parallel to the deflecting plane is negative with respect to the first lens and is positive with respect to the second lens.

The above-mentioned condition (II) will next be described in detail.

It is possible to preferably correct the image face curve in the main and secondary scanning directions by the construction of the above-mentioned lens faces in the fθ lens system.

However, it is necessary to further satisfy the above condition (II) so as to correct the image face curve in the secondary scanning direction.

Namely, in the case in which the reflecting face inclination is corrected by the above-mentioned lens face construction, when an absolute value in the following condition, $$2.0 < |[\{(1/r'_1)-(1/r'_2)\}-\{(1/r'_3)-(1/r'_4)\}] \cdot f_S| < 9.8 \quad \text{(II)}$$

exceeds a lower limit, the image forming position in the secondary scanning direction is excessively shifted from the scanned face in the direction opposite to the rotary polygon. When this absolute value exceeds an upper limit, the image forming position in the secondary scanning direction is excessively shifted from the scanned face toward the rotary polygon. Accordingly, a performance for forming the image is reduced and the diameter of a light spot in the secondary scanning direction is greatly varied so that it is difficult to preferably realize an optically scanning operation.

Figure 21:
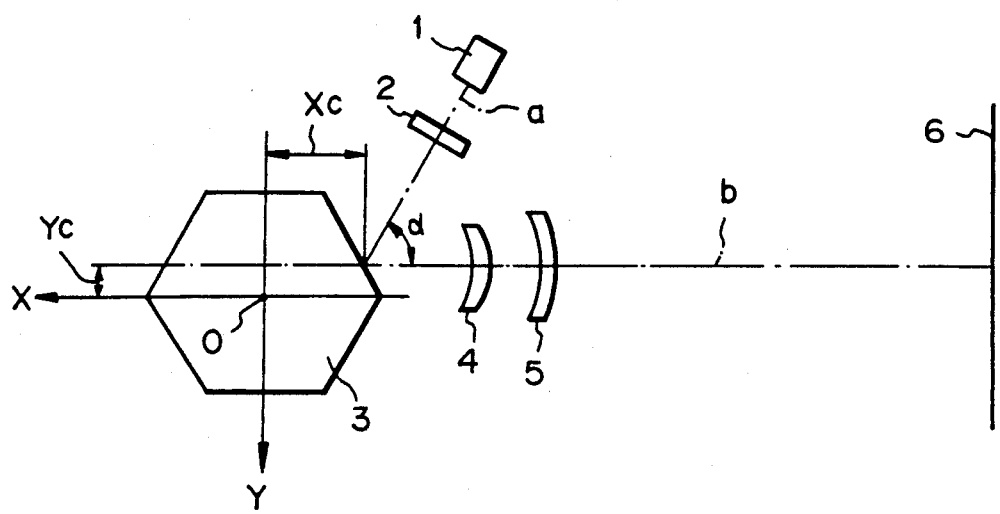
FIG. 21 is a view for explaining an optical scanner.

In this embodiment of the present invention, with respect to the above-mentioned intrinsic incident angle α, in FIG. 21, reference numeral a designates a main light beam incident onto the rotary polygon mirror, and reference numeral b designates an optical axis of the fθ lens system. The intrinsic incident angle α is defined as an intersection angle between the main light beam a and the optical axis b as shown in this figure. The position of a rotary axis of the rotary polygon mirror 3 is set as an origin and the X and Y axes are determined as shown in FIG. 21. The position coordinates of an intersection point of the main light beam a and the optical axis b are set to $X_c$ and $Y_c$.

As is well known, to reduce the change in position shift amount ΔX between the above position of the linear image and the reflecting face as much as possible, it is enough to set the following conditions with respect to the $X_c$ and $Y_c$, $$0 < X_c < R \cos(\alpha/2)$$

$$0 < Y_c < R \sin(\alpha/2)$$

when the radius of a circumscribed circle of the rotary polygon mirror is set to R.

Further, to locate the main incident light beam a on the optical axis outside an effective region for the main scanning such that a return light from the scanned face 6 is not incident again as a ghost light to a main scanning region on the scanned face, it is enough to set the following condition, $$\theta < \alpha < (4\pi/N) - \theta$$

with respect to the above angle α where the number of faces of the rotary polygon mirror 3 is N and the deflection angle is θ.

A barrel type toric face constituting one of the features of the present invention will next be described.

As is well known, the toric face is a face provided by rotating an arc around a straight line which is located on a flat plane including this arc and does not pass through the center of curvature of the arc.

Figure 22:
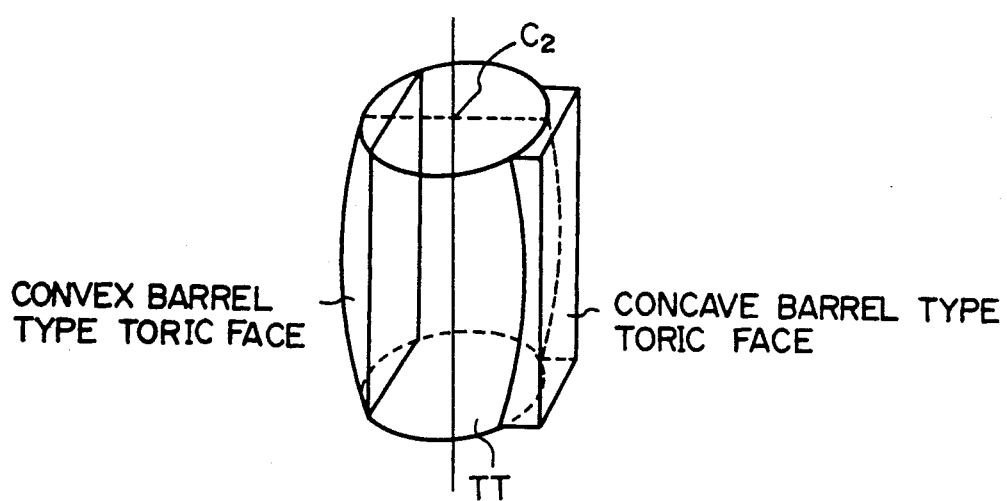
FIG. 22 is a view for explaining a barrel type toric face.

A curve passing through points A, V and B is similar to that shown in FIG. 9 and constitutes an arc around a position $C_1$ as a center of curvature. When this arc is rotated around a straight line $X_1$—$Y_1$ as an axis located on the same plane as that of the arc, a barrel type curve TT is obtained as shown in FIG. 22. This curve TT constitutes a barrel type toric face. When this barrel type toric face TT is used as a lens face, it is possible to use this face TT as a convex lens face and a concave lens face. In this embodiment, the concave barrel type toric face is used as the first lens face. On the convex toric face of the fourth lens face, the arc is located on a plane including the optical axis and parallel to the secondary scanning direction. The rotary axis is parallel to the secondary scanning direction on this parallel plane and is located on the side opposite to the arc with respect to the center of curvature of the arc.

The radius of curvature of the barrel type toric face on a plane perpendicular to the $X_1$—$Y_1$ axis is reduced as this toric face is axially separated from a point $C_2$. This radius of curvature is equal to the distance between the $X_1$—$Y_1$ axis and the arc A, V and B.

In this embodiment, on the concave barrel type toric face of the first lens face, the direction of the $X_1$—$Y_1$ axis is constructed to be parallel to the main scanning direction on the deflecting plane.

The concrete embodiments 10 to 18 of the present invention will next be described in detail in the following description.

In the respective embodiments, reference numeral $f_M$ shows a combined focal distance with respect to the main scanning direction of the fθ lens system, i.e., the combined focal distance on a plane parallel to the deflecting plane. This value $f_M$ is normalized to 100. Reference numeral $f_S$ shows a combined focal distance on the deflecting perpendicular plane, i.e., the combined focal distance with respect to the secondary scanning direction. Reference numerals 2θ, α and β respectively designate a deflection angle (unit: degree), the above-mentioned intrinsic incident angle (unit: degree) and a lateral magnification on the deflecting perpendicular plane.

Reference numeral $r_{iX}$ designates a radius of curvature of an i-th lens face on the deflecting plane counted from the side of the rotary polygon mirror, i.e., the radius of curvature of lens face shapes represented in the respective upper views shown as "main" in FIGS. 20a and 20b. Reference numeral $r_{iY}$ designates a radius of curvature of the i-th lens face on the deflecting perpendicular plane, i.e., the radius of curvature of lens face shapes represented in the respective lower views shown as "secondary" in FIGS. 20a and 20b. In the condition (II), $r_{1Y}$, $r_{2Y}$, $r_{3Y}$ and $r_{4Y}$ are explained as $r'_1$, $r'_2$, $r'_3$ and $r'_4$. Accordingly, with respect to the first lens face, an $r_{1X}$ designates a distance between points V and $C_1$ in FIG. 9, and the $r_{1Y}$ designates a distance between the points V and $C_2$. Reference numeral $d_i$ designates a distance between the i-th lens faces. Reference numeral $d_0$ designates a distance from the reflecting face of the rotary polygon mirror to the first lens face. Reference numeral $n_j$ designates a refractive index of a j-th lens.

Further, reference numeral K represents a value $|[\{(1/r'_1)-(1/r'_2)\}-\{(1/r'_3)-(1/r'_4)\}]\cdot f_S|$ in the above condition (II).

EMBODIMENT 10

| $f_M = 100$, $f_s = 20.938$, $\beta = -3.757$, $\alpha = 54$, $2\theta = 63.4$ | | | | |
|---|---|---|---|---|
| $K = 2.27$, $d_0 = 5.411$ | | | | |
| i | $r_{ix}$ | $r_{iy}$ | $d_i$ | j | $n_i$ |
| 1 | −113.349 | −48.100 | 4.209 | 1 | 1.71221 |
| 2 | ∞ | 48.100 | 13.468 | | |
| 3 | ∞ | −37.277 | 6.012 | 2 | 1.67500 |
| 4 | −46.536 | −10.670 | | | |

FIGS. 23a, 23b and 23c respectively show an aberration diagram, a diagram showing a field curvature and an fθ characteristic graph with respect to the embodiment 10. The field curvature is shown in relation to the rotation of the rotary polygon mirror and a broken line shows the field curvature in the main scanning direction and a solid line shows the image face curve in the secondary scanning direction. The fθ characteristics are defined by $(h - f_M\theta)100/(f_M\theta)$ when the height of an ideal image is $f_M\theta$ and the height of the real image is h.

EMBODIMENT 11

$f_M = 100$, $f_s = 17.314$, $\beta = -2.700$, $\alpha = 54$, $2\theta = 63.4$
$K = 4.47$, $d_0 = 5.411$

| i | $r_{ix}$ | $r_{iy}$ | $d_i$ | j | $n_i$ |
|---|---|---|---|---|---|
| 1 | −113.349 | −6.012 | 4.209 | 1 | 1.71221 |
| 2 | ∞ | 48.100 | 13.468 | | |
| 3 | ∞ | −39.081 | 6.012 | 2 | 1.67500 |
| 4 | −46.536 | −10.364 | | | |

Figure 24A:
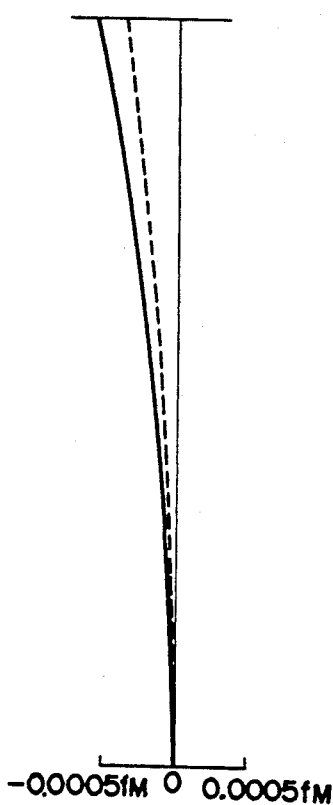
Figure 24B:
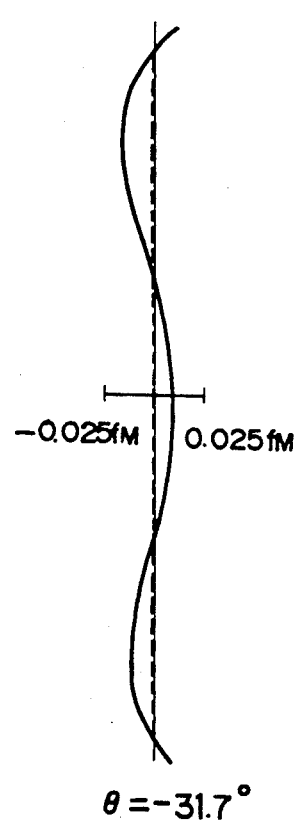
Figure 24C:
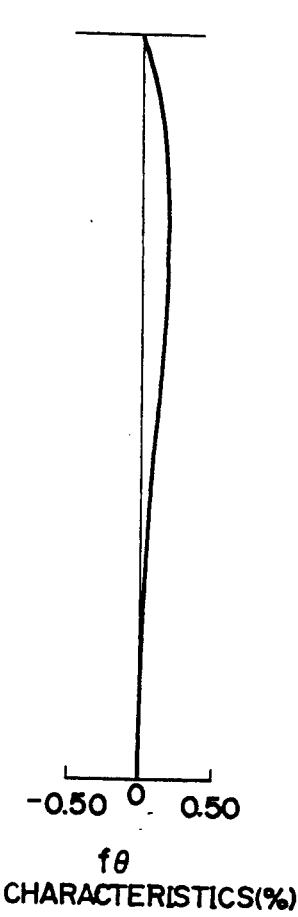

FIGS. 24a, 24b and 24c respectively show an aberration diagram, a diagram of a field curvature and an fθ characteristic graph with respect to the embodiment 11.

EMBODIMENT 12

$f_M = 100$, $f_s = 19.113$, $\beta = -2.589$, $\alpha = 54$, $2\theta = 63.4$
$K = 4.77$, $d_0 = 5.411$

| i | $r_{ix}$ | $r_{iy}$ | $d_i$ | j | $n_i$ |
|---|---|---|---|---|---|
| 1 | −113.349 | −120.249 | 4.209 | 1 | 1.71221 |
| 2 | ∞ | 6.012 | 13.468 | | |
| 3 | ∞ | −40.283 | 6.012 | 2 | 1.67500 |
| 4 | −46.536 | −10.036 | | | |

FIGS. 25a, 25b and 25c respectively show an aberration diagram, a diagram of a field curvature and an fθ characteristic graph with respect to the embodiment 12.

EMBODIMENT 13

$f_M = 100$, $f_s = 17.280$, $\beta = -1.972$, $\alpha = 54$, $2\theta = 63.1$
$K = 5.72$, $d_0 = 7.816$

| i | $r_{ix}$ | $r_{iy}$ | $d_i$ | j | $n_i$ |
|---|---|---|---|---|---|
| 1 | −112.654 | −6.012 | 5.531 | 1 | 1.71221 |
| 2 | ∞ | 12.025 | 10.943 | | |
| 3 | ∞ | −56.156 | 6.373 | 2 | 1.67500 |
| 4 | −46.055 | −10.087 | | | |

Figure 26A:
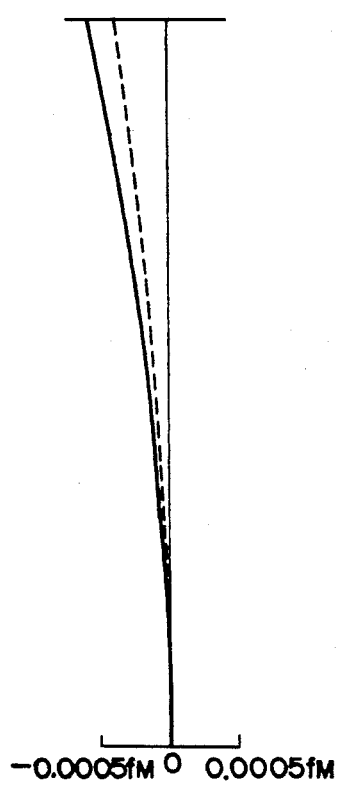
Figure 26B:
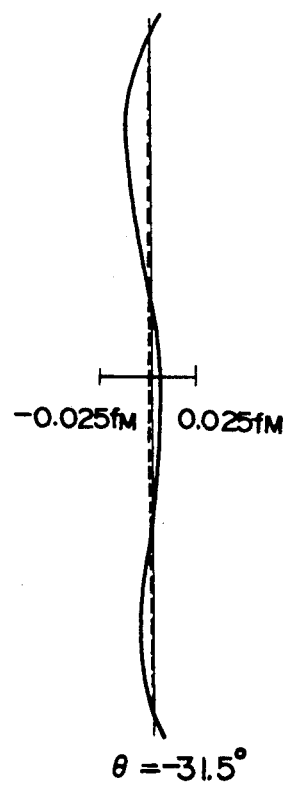
Figure 26C:
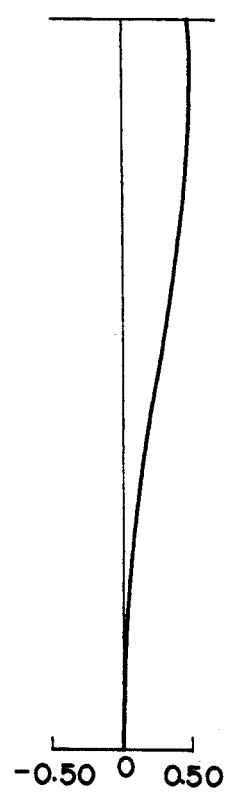

FIGS. 26a, 26b and 26c respectively show an aberration diagram, a diagram of a field curvature and an fθ characteristic graph with respect to the embodiment 13.

EMBODIMENT 14

$f_M = 100$, $f_s = 20.452$, $\beta = -2.258$, $\alpha = 54$, $2\theta = 63.1$
$K = 5.53$, $d_0 = 7.816$

| i | $r_{iX}$ | $r_{iY}$ | $d_i$ | j | $n_i$ |
|---|---|---|---|---|---|
| 1 | −112.654 | −48.100 | 5.531 | 1 | 1.71221 |
| 2 | ∞ | 6.012 | 10.943 | | |
| 3 | ∞ | −58.201 | 6.373 | 2 | 1.67500 |
| 4 | −46.055 | −9.957 | | | |

FIGS. 27a, 27b and 27c respectively show an aberration diagram, a diagram of a field curvature and an fθ characteristic graph with respect to the embodiment 14.

EMBODIMENT 15

$f_M = 100$, $f_s = 18.502$, $\beta = -1.824$, $\alpha = 54$, $2\theta = 63.1$
$K = 6.91$, $d_0 = 7.816$

| i | $r_{iX}$ | $r_{iY}$ | $d_i$ | j | $n_i$ |
|---|---|---|---|---|---|
| 1 | −112.654 | −120.249 | 5.531 | 1 | 1.71221 |
| 2 | ∞ | 3.607 | 10.943 | | |
| 3 | ∞ | −57.118 | 6.373 | 2 | 1.67500 |
| 4 | −46.055 | −9.498 | | | |

FIGS. 28a, 28b and 28c respectively show an aberration diagram, a diagram of a field curvature and an fθ characteristic graph with respect to the embodiment 15.

EMBODIMENT 16

$f_M = 100$, $f_s = 13.341$, $\beta = -1.210$, $\alpha = 54$, $2\theta = 63.0$
$K = 7.34$, $d_0 = 9.019$

| i | $r_{iX}$ | $r_{iY}$ | $d_i$ | j | $n_i$ |
|---|---|---|---|---|---|
| 1 | −109.496 | −6.012 | 6.133 | 1 | 1.71221 |
| 2 | ∞ | 3.487 | 9.740 | | |
| 3 | ∞ | −78.162 | 6.373 | 2 | 1.67500 |
| 4 | −45.454 | −9.084 | | | |

Figure 29A:
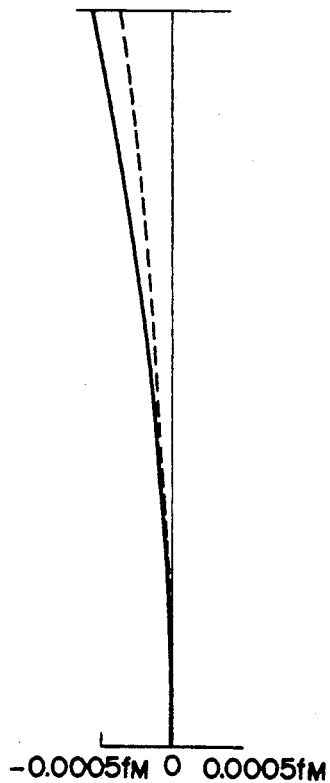
Figure 29B:
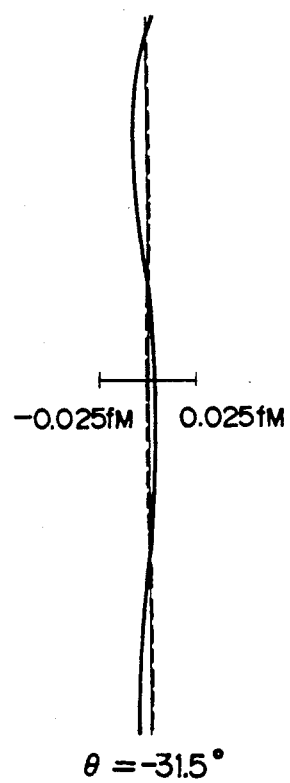
Figure 29C:
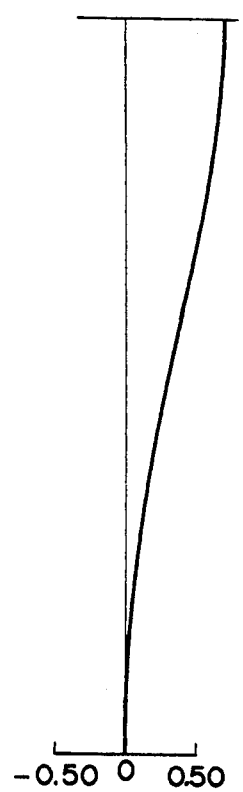

FIGS. 29a, 29b and 29c respectively show an aberration diagram, a diagram of a field curvature and an fθ characteristic graph with respect to the embodiment 16.

EMBODIMENT 17

$f_M = 100$, $f_s = 17.411$, $\beta = -1.507$, $\alpha = 54$, $2\theta = 63.0$
$K = 8.09$, $d_0 = 9.019$

| i | $r_{iX}$ | $r_{iY}$ | $d_i$ | j | $n_i$ |
|---|---|---|---|---|---|
| 1 | −109.496 | −48.100 | 6.133 | 1 | 1.71221 |
| 2 | ∞ | 2.886 | 9.740 | | |
| 3 | ∞ | −79.605 | 6.373 | 2 | 1.67500 |
| 4 | −45.454 | −9.082 | | | |

Figure 30A:
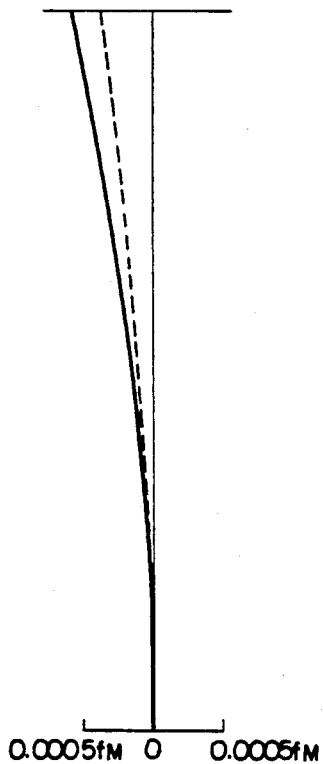
Figure 30B:
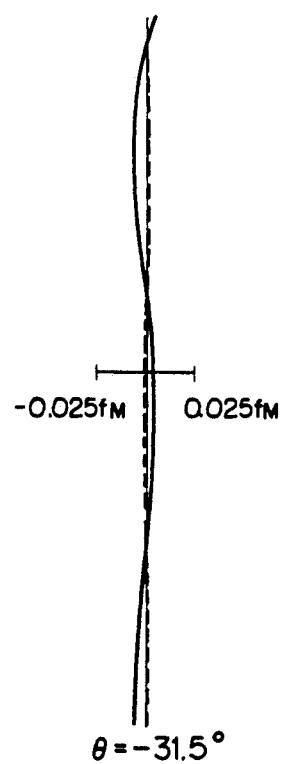
Figure 30C:
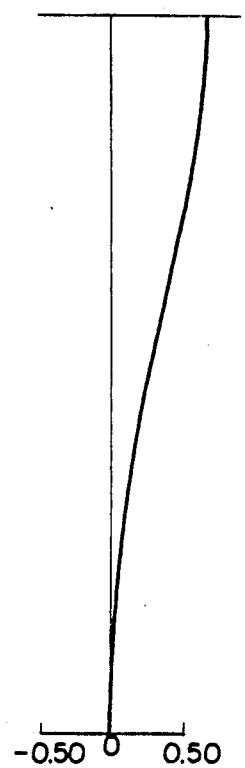

FIGS. 30a, 30b and 30c respectively show an aberration diagram, a diagram of a field curvature and an fθ characteristic graph with respect to the embodiment 17.

EMBODIMENT 18

$f_M = 100$, $f_s = 17.712$, $\beta = -1.519$, $\alpha = 54$, $2\theta = 63.0$
$K = 9.61$, $d_0 = 9.019$

| i | $r_{iX}$ | $r_{iY}$ | $d_i$ | j | $n_i$ |
|---|---|---|---|---|---|
| 1 | −109.496 | −120.249 | 6.133 | 1 | 1.71221 |
| 2 | ∞ | 2.766 | 9.740 | | |
| 3 | ∞ | −79.485 | 6.373 | 2 | 1.67500 |
| 4 | −45.454 | −9.058 | | | |

Figure 31A:
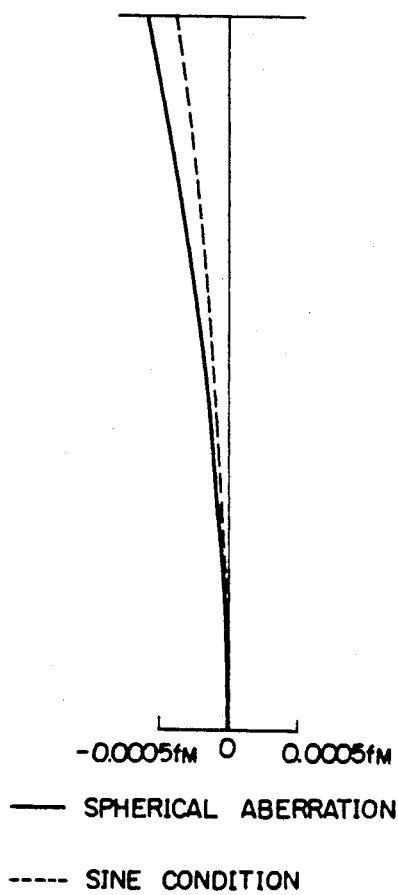
Figure 31B:
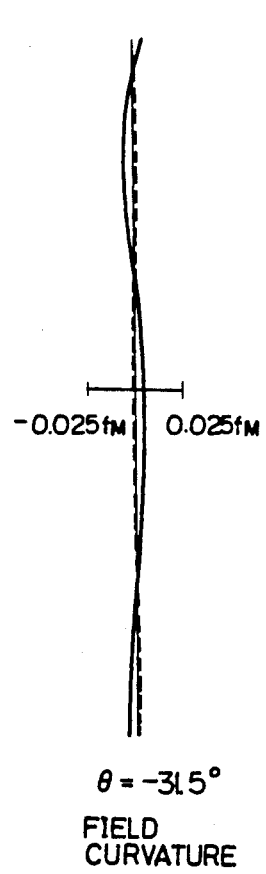
Figure 31C:
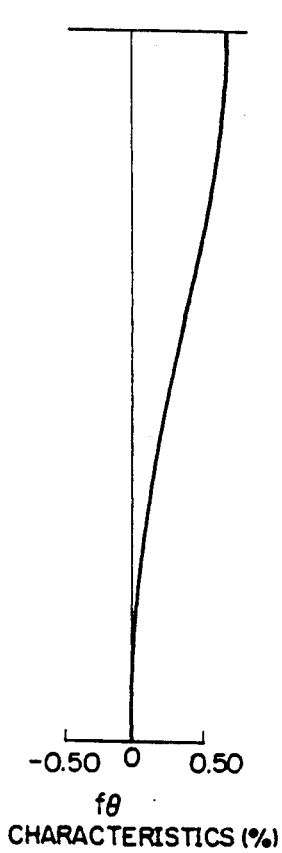

FIGS. 31a, 31b and 31c respectively show an aberration diagram, a diagram of a field curvature and an fθ characteristic graph with respect to the embodiment 18.

In the respective embodiments 10 to 18 of the present invention, the aberration is preferably provided and the curvature of a field is particularly corrected very preferably in the main and secondary scanning directions. Further, the fθ characteristics are also preferable in these embodiments. The lens shapes in FIG. 20a are used in the embodiments 10, 11, 13, 14, 16 and 17, and the lens shapes in FIG. 20b are used in the embodiments 12, 15 and 18.

As mentioned above, effects similar to those in the embodiments 1 to 9 can be obtained in the embodiments 10 to 18.

Another embodiment of the present invention will be described.

An fθ lens system in this embodiment is constructed by two groups of first and second lenses sequentially arranged from the side of the rotary polygon mirror toward the scanned face side. Further, in this fθ lens system, when the respective lens faces are set from first to fourth faces arranged from the side of the above rotary polygon mirror, these lens faces on a deflecting plane sequentially have the shapes of an arc, an arc, a straight line, and an arc from the first face toward the fourth face.

The first lens face is constructed by a spherical face. The second lens face is constructed by a covex barrel type toric face having an absolute value of a radius of curvature on the deflecting perpendicular plane reduced as this face is separated from the optical axis. The third lens face is constructed by a concave cylindrical face having a refracting power on only the deflecting perpendicular plane. The fourth lens face is constructed by a convex toric face having a large curvature on the deflecting perpendicular plane.

When a combined focal distance on the deflecting perpendicular plane is set to $f_S$ and the radii of curvature of the above second and fourth faces on the deflecting perpendicular plane including the optical axis are respectively set to $r'_2$ and $r'_4$, the following conditions with respect to these values are satisfied.

$$0.3 < |r'_2/r'_4| < 1.0 \qquad \text{(III)}$$

$$0.03 < |r'_2/f_S| < 0.54 \qquad \text{(IV)}$$

The respective lens faces of the $f\theta$ lens system of the present invention will next be described with reference to FIGS. 32a and 32b. In this embodiment, "the deflecting plane" is a plane formed by moving the light beam on an optical axis ideally deflected by the rotary polygon mirror. "The deflecting perpendicular plane" is a plane parallel to an optical axis of the $f\theta$ lens system and perpendicular to the above deflecting plane.

Figure 32A:
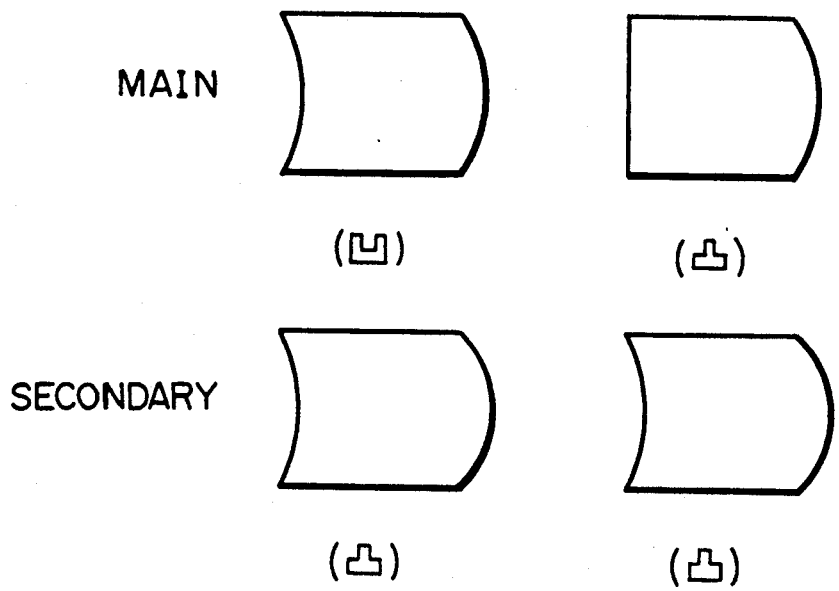
FIGS. 32a and 32b are views for explaining lens shapes of the $f\theta$ lens system in another embodiment of the present invention.
Figure 32B:
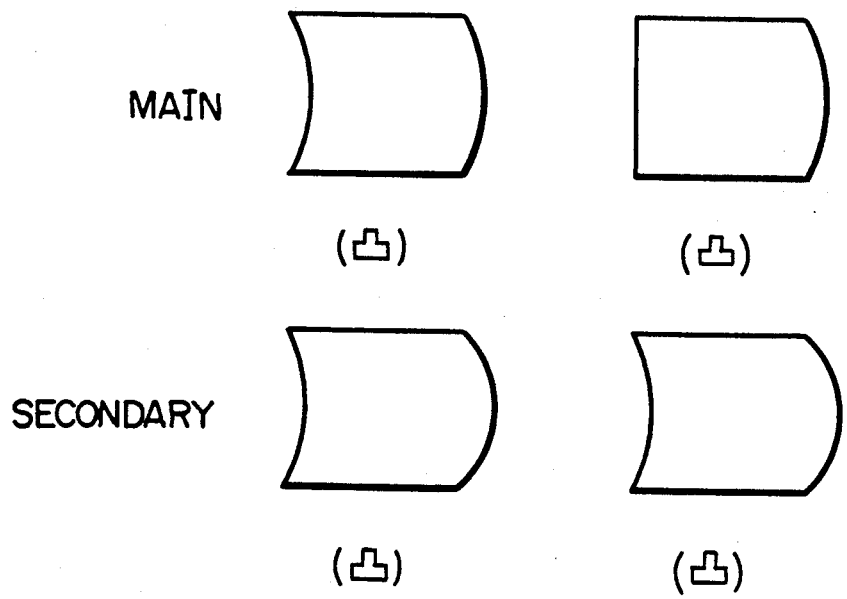

In each of these FIGS. 32a and 32b, the left-hand side is the side of the rotary polygon mirror and the right-hand side is the side of the scanned face. Accordingly, with respect to the lenses, the first lens is located on the left-hand side and the second lens is located on the right-hand side. The first to fourth lens faces are sequentially represented from the left toward the right.

The upper views of the respective FIGS. 32a and 32b show lens shapes of the $f\theta$ lens system on the deflecting plane and the lower views thereof show lens shapes on the deflecting perpendicular plane including the optical axis.

In these FIGS. 32a and 32b, the meanings of "main", "secondary", "convex" and "concave" are similar to those in the above-mentioned embodiments of the present invention.

As shown in the respective upper views of FIGS. 32a and 32b, the first to fourth lens face shapes on the deflecting plane are sequentially constructed by an arc, an arc, a straight line, and an arc. The refracting power on the plane parallel to the deflecting plane is negative or positive with respect to the first lens and is positive with respect to the second lens.

The above-mentioned conditions (III) and (IV) will next be described in detail.

It is possible to preferably correct the field curvature in the main and secondary scanning directions by the construction of the above-mentioned lens faces in the $f\theta$ lens system.

However, it is necessary to further satisfy the above conditions (III) and (IV) so as to correct the field curvature in the secondary scanning direction.

Namely, in the case in which the reflecting face inclination is corrected by the above-mentioned lens face construction, when an absolute value in the condition (III) exceeds a lower limit, the image forming position in the secondary scanning direction is excessively shifted from the scanned face in the direction opposite to the rotary polygon. When this absolute value exceeds an upper limit, the image forming position in the secondary scanning direction is excessively shifted from the scanned face toward the rotary polygon. Further, when an absolute value in the condition (IV) exceeds an upper limit, the image forming position in the secondary scanning direction is excessively shifted from the scanned face in the direction opposite to the rotary polygon. When this absolute value exceeds a lower limit, the image forming position in the secondary scanning direction is excessively shifted from the scanned face toward the rotary polygon. Accordingly, in the case in which these conditions are not satisfied, a performance for forming the image is reduced and the diameter of a light spot in the secondary scanning direction is greatly varied so that it is difficult to preferably realize an optically scanning operation. In contrast to this, in the case in which the above conditions (III) and (IV) are satisfied, the function for correcting the field curvature in the secondary scanning direction is preferably fulfilled on the convex barrel type toric face of the second lens face.

As mentioned above, it is possible to use the barrel type toric face TT in FIG. 22 as a convex lens face and a concave lens face. In this embodiment, the convex barrel type toric face is used as the second lens face.

On the convex toric face of the fourth lens face, the arc is located on the deflecting perpendicular plane including the optical axis. The rotary axis is parallel to the secondary scanning direction on this plane and is located on the side opposite to the arc with respect to the center of curvature of the arc. Accordingly, this toric face has a large curvature on the deflecting perpendicular plane including the optical axis.

In this embodiment, on the convex barrel type toric face of the second lens face, the direction of the $X_1$—$Y_1$ axis is constructed to be parallel to the main scanning direction on the deflecting plane.

The concrete embodiments 19 to 21 of the present invention will next be described in detail in the following description.

In the respective embodiments, reference numeral $f_M$ shows a combined focal distance with respect to the main scanning direction of the $f\theta$ lens system, i.e., the combined focal distance on a plane parallel to the deflecting plane. This value $f_M$ is normalized to 100. Reference numeral $f_S$ shows a combined focal distance on the deflecting perpendicular plane, i.e., the combined focal distance with respect to the secondary scanning direction. Reference numerals $2\theta$, $\alpha$ and $\beta$ respectively designate a deflection angle (unit: degree), the above-mentioned intrinsic incident angle (unit: degree) and a lateral magnification on the deflecting perpendicular plane.

Reference numeral $r_{iX}$ designates a radius of curvature of an i-th lens face on the deflecting plane counted from the side of the rotary polygon mirror, i.e., the radius of curvature of lens face shapes represented in the respective upper views shown as "main" in FIGS. 32a and 32b. Reference numeral $r_{iY}$ designates a radius of curvature of the i-th lens face on the deflecting perpendicular plane, i.e., the radius of curvature of lens face shapes represented in the respective lower views shown as "secondary" in FIGS. 32a and 32b. In particular, in the conditions (III) and (IV), $r_{2Y}$ and $r_{4Y}$ are respectively explained as $r'_2$ and $r'_4$. Accordingly, with respect to the second lens face, an $r_{2X}$ designates a distance between points V and $C_1$ in FIG. 9, and the $r_2Y$ designates a distance between the points V and $C_2$.

Reference numeral $d_i$ designates a distance between the i-th lens faces. Reference numeral $d_0$ designates a distance from the reflecting face of the rotary polygon mirror to the first lens face. Reference numeral $n_j$ designates a refractive index of a j-th lens.

Further, reference numeral $K_1$ represents a value $|r'_2/r'_4|$ in the above condition (III) and reference numeral $K_2$ represents a value $|r'_2/f_S|$ in the above condition (IV).

EMBODIMENT 19

| $f_M = 100$, $f_s = 17.991$, $\beta = -6.127$, $\alpha = 54$, $2\theta = 63.1$ $K_1 = 0.752$, $K_2 = 0.421$, $d_o = 7.816$ ||||||
|---|---|---|---|---|---|
| i | $r_iX$ | $r_iY$ | $d_i$ | j | $n_j$ |
| 1 | −16.358 | −16.358 | 3.968 | 1 | 1.71221 |
| 2 | −18.398 | −7.582 | 14.67 | | |
| 3 | ∞ | −14.069 | 4.329 | 2 | 1.67500 |
| 4 | −69.023 | −10.087 | | | |

FIGS. 33a, 33b and 33c respectively show an aberration diagram, a diagram showing an image face curve and an fθ characteristic graph with respect to the embodiment 19. The field curvature is shown in relation to the rotation of the rotary polygon mirror and a broken line shows the field curvature in the main scanning direction and a solid line shows the field curvature in the secondary scanning direction.

The fθ characteristics are defined by $(h-f_M\theta)100/(f_M\theta)$ when the height of an ideal image is $f_M\theta$ and the height of the real image is h.

EMBODIMENT 20

| $f_M = 100$, $f_s = 151.4$, $\beta = -4.846$, $\alpha = 54$, $2\theta = 63.7$ $K_1 = 0.339$, $K_2 = 0.0349$, $d_o = 3.607$ ||||||
|---|---|---|---|---|---|
| i | $r_iX$ | $r_iY$ | $d_i$ | j | $n_j$ |
| 1 | −30.303 | −30.303 | 3.487 | 1 | 1.71221 |
| 2 | −29.341 | −5.291 | 38.961 | | |
| 3 | ∞ | −33.61 | 6.012 | 2 | 1.67500 |
| 4 | −80.794 | −15.619 | | | |

Figure 34A:
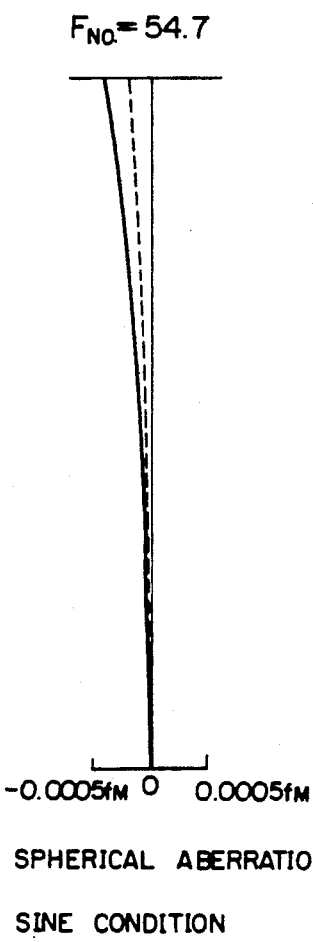
Figure 34B:
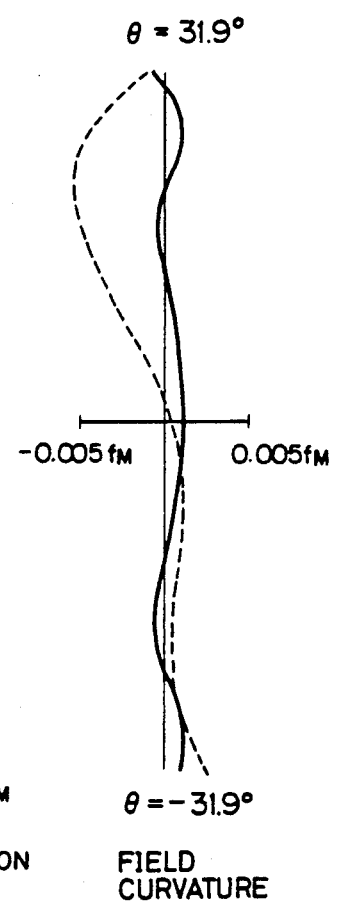
Figure 34C:
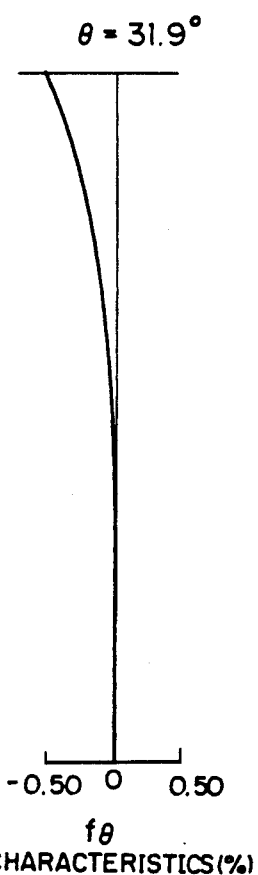

FIGS. 34a, 34b and 34c respectively show an aberration diagram, a diagram of a field curvature and an fθ characteristic graph with respect to the embodiment 20.

EMBODIMENT 21

| $f_M = 100$, $f_s = 21.774$, $\beta = -4.478$, $\alpha = 54$, $2\theta = 63.1$ $K_1 = 0.98$, $K_2 = 0.53$, $d_o = 12.025$ ||||||
|---|---|---|---|---|---|
| i | $r_iX$ | $r_iY$ | $d_i$ | j | $n_j$ |
| 1 | −25.373 | −25.373 | 6.133 | 1 | 1.71221 |
| 2 | −27.778 | −11.424 | 11.905 | | |
| 3 | ∞ | −15.067 | 6.012 | 2 | 1.67500 |
| 4 | −75.242 | −11.671 | | | |

Figure 35A:
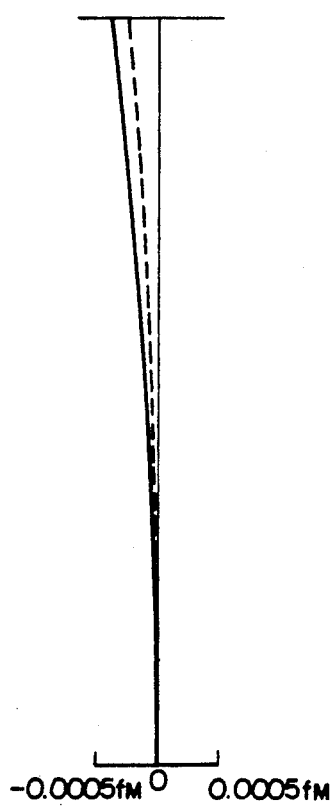
Figure 35B:
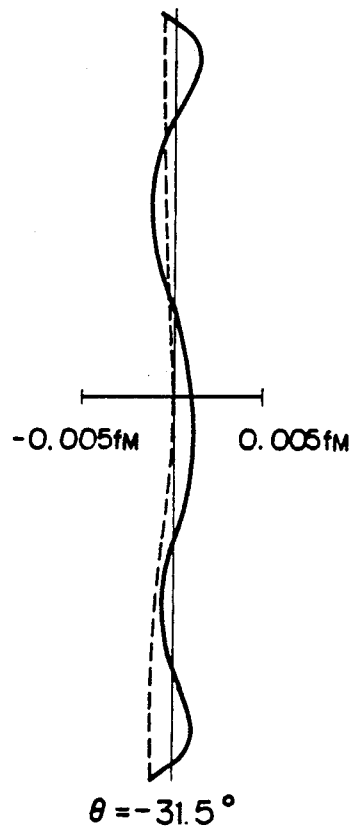
Figure 35C:
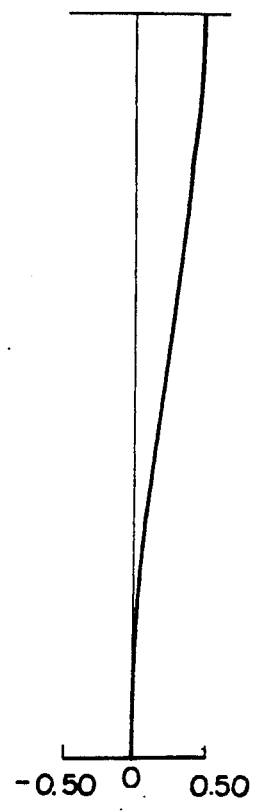
Figure 36A:
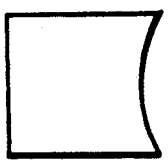
FIG. 36 is a view for explaining lens shapes of the $f\theta$ lens system in another embodiment of the present invention.
Figure 36B:
Figure 36C:
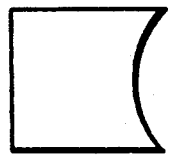
Figure 36D:
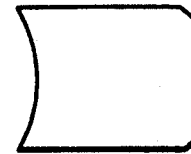
Figure 40A:
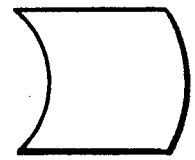
FIG. 40 is a view for explaining lens shapes of the $f\theta$ lens system in another embodiment of the present invention.
Figure 40B:
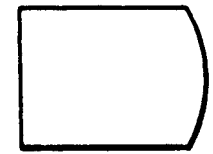
Figure 40C:
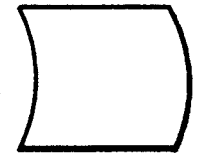
Figure 40D:
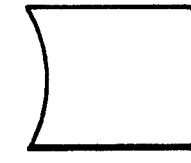
Figure 51A:
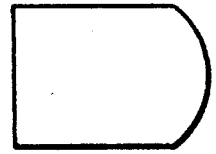
FIG. 51 is a view for explaining lens shapes of the $f\theta$ lens system in another embodiment of the present invention.
Figure 51B:
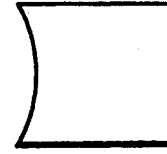
Figure 51C:
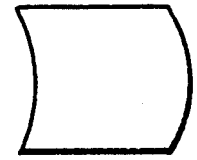
Figure 51D:
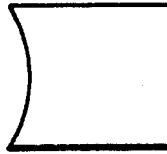

FIGS. 35a, 35b and 35c respectively show an aberration diagram, a diagram of a field curvature and an fθ characteristic graph with respect to the embodiment 21.

In the respective embodiments 19 to 21 of the present invention, the aberration is preferably provided and the curve of an image face is particularly corrected very preferably in the main and secondary scanning directions. Further, the fθ characteristics are also preferable in these embodiments.

As mentioned above, effects similar to those in the embodiments 1 to 9 can be obtained in the embodiments 19 to 21.

Another embodiment of the present invention will next be described.

An fθ lens system in this embodiment is constructed by two groups of first and second lenses sequentially arranged from the side of the rotary polygon mirror toward the scanned face side. Further, in this fθ lens system, when the respective lens faces are set from first to fourth faces arranged from the side of the rotary polygon mirror, these lens faces on a deflecting plane sequentially have the shapes of a straight line, an arc, a straight line and an arc from the first face toward the fourth face. The first and second lenses respectively have negative and positive refracting powers on a plane parallel to the deflecting plane.

The first lens face is constructed by a planar face. The second lens face is constructed by a concave barrel type toric face having a radius of curvature on the deflecting perpendicular plane reduced as this face is separated from the optical axis. The third lens face is constructed by a concave cylindrical face having a refracting power on only the deflecting perpendicular plane. The fourth lens face is constructed by a convex toric face having a large curvature on the deflecting perpendicular plane.

When a combined focal distance on the deflecting perpendicular plane is set to $f_S$, a lateral magnification is set to $\beta$, and the radii of curvature of the above third and fourth faces on the deflecting perpendicular plane including the optical axis are respectively set to $r'_3$ and $r'_4$, the following condition with respect to these values is satisfied.

$$0.4 < |\{(1/r'_3)-(1/r'_4)\} \cdot f_S \beta| < 2.0 \qquad \text{(V)}$$

The respective lens faces of the fθ lens system of the present invention will next be described with reference to FIG. 36. In this embodiment, "the deflecting plane" is a plane formed by moving a main light beam ideally deflected by the rotary polygon mirror. "The deflecting perpendicular plane" is a plane parallel to an optical axis of the fθ lens system and perpendicular to the above deflecting plane.

In FIG. 36, the left-hand side is the side of the rotary polygon mirror and the right-hand side is the side of the scanned face. Accordingly, with respect to the lenses, the first lens is located on the left-hand side and the second lens is located on the right-hand side. The first to fourth lens faces are sequentially represented from the left toward the right.

The upper views of FIG. 36 show lens shapes of the fθ lens system on the deflecting plane and the lower views thereof show lens shapes on the deflecting perpendicular plane including the optical axis.

In FIG. 36, the meanings of "main", "secondary", "convex" and "concave" are similar to those in the above-mentioned embodiments of the present invention.

As shown in the respective upper views of FIG. 36, the first to fourth lens face shapes on the deflecting plane are sequentially constructed by a straight line, an arc, a straight line and an arc. The refracting power on the plane parallel to the deflecting plane is negative with respect to the first lens and is positive with respect to the second lens.

The above-mentioned condition (V) will next be described in detail.

It is possible to preferably correct the field curvature in the main and secondary scanning directions by the construction of the above-mentioned lens faces in the fθ lens system.

However, it is necessary to further satisfy the above condition (V) so as to correct the image face curve in the secondary scanning direction.

Namely, in the case in which the reflecting face inclination is corrected by the above-mentioned lens face construction, when an absolute value in the condition (V) exceeds a lower limit, the image forming position in the secondary scanning direction is excessively shifted from the scanned face in the direction opposite to the rotary polygon. When this absolute value exceeds an upper limit, the image forming position in the secondary scanning direction is excessively shifted from the scanned face toward the rotary polygon. Accordingly, in the case in which this condition is not satisfied, a performance for forming the image is reduced and the diameter of a light spot in the secondary scanning direction is greatly varied so that it is difficult to preferably realize an optically scanning operation. In contrast to this, in the case in which the above condition (V) is satisfied, the function for correcting the field curvature in the secondary scanning direction is preferably fulfilled on the concave barrel type toric face of the second lens face.

As mentioned above, it is possible to use the barrel type toric face TT in FIG. 22 as a convex lens face and a concave lens face. In this embodiment, the concave barrel type toric face is used as the second lens face.

On the convex toric face of the fourth lens face, the arc is located on the deflecting perpendicular plane including the optical axis. The rotary axis is parallel to the secondary scanning direction on this plane and is located on the side opposite to the arc with respect to the center of curvature of the arc. Accordingly, this toric face has a large curvature on the deflecting perpendicular plane including the optical axis.

In this embodiment, on the concave barrel type toric face of the second lens face, the direction of the $X_1$—$Y_1$ axis is constructed to be parallel to the main scanning direction on the deflecting plane.

The concrete embodiments 22 to 24 of the present invention will next be described in detail in the following description.

In the respective embodiments, reference numeral $f_M$ shows a combined focal distance with respect to the main scanning direction of the fθ lens system, i.e., the combined focal distance on a plane parallel to the deflecting plane. This value $f_M$ is normalized to 100. Reference numeral $f_S$ shows a combined focal distance on the deflecting perpendicular plane, i.e., the combined focal distance with respect to the secondary scanning direction. Reference numerals 2θ, α and β respectively designate a deflection angle (unit: degree), the above-mentioned intrinsic incident angle (unit: degree) and a lateral magnification on the deflecting perpendicular plane.

Reference numeral $r_{iX}$ designates a radius of curvature of an i-th lens face on the deflecting plane counted from the side of the rotary polygon mirror, i.e., the radius of curvature of lens face shapes represented in the respective upper views shown as "main" in FIG. 36. Reference numeral $r_{iY}$ designates a radius of curvature of the i-th lens face on the deflecting perpendicular plane, i.e., the radius of curvature of lens face shapes represented in the respective lower views shown as "secondary" in FIG. 36. In particular, in the condition (V), $r_{3Y}$ and $r_{4Y}$ are respectively explained as $r'_3$ and $r'_4$. With respect to the second lens face, an $r_{2X}$ designates a distance between points V and $C_1$ in FIG. 9, and an $r_{2Y}$ designates a distance between the points V and $C_2$.

Reference numeral $d_i$ designates a distance between the i-th lens faces. Reference numeral $d_0$ designates a distance from the reflecting face of the rotary polygon mirror to the first lens face. Reference numeral $n_j$ designates a refractive index of a j-th lens.

Further, reference numeral K represents a value $|\{(1/r'_3)-(1/r'_4)\}\cdot f_S\cdot\beta|$ in the above condition (V).

EMBODIMENT 22

| $f_M = 100, f_s = 17.459, \beta = -1.354, \alpha = 54, 2\theta = 60.6$ $K = 1.51, d_0 = 7.816$ | | | | |
|---|---|---|---|---|
| i | $r_{iX}$ | $r_{iY}$ | $d_i$ | j | $n_j$ |
| 1 | ∞ | ∞ | 2.645 | 1 | 1.71221 |
| 2 | 190.636 | 6.012 | 20.563 | | |
| 3 | ∞ | −61.327 | 4.329 | 2 | 1.67500 |
| 4 | −53.391 | −12.45 | | | |

FIGS. 37a, 37b and 37c respectively show an aberration diagram, a diagram showing an field curvature and an fθ characteristic graph with respect to the embodiment 22. The field curvature is shown in relation to the rotation of the rotary polygon mirror and a broken line shows the field curvature in the main scanning direction and a solid line shows the field curvature in the secondary scanning direction.

The fθ characteristics are defined by $(h - f_M\theta)100/(f_M\theta)$ when the height of an ideal image is $f_M\theta$ and the height of the real image is h.

EMBODIMENT 23

| $f_M = 100, f_s = 17.851, \beta = -1.936, \alpha = 54, 2\theta = 60.6$ $K = 1.94, d_0 = 3.607$ | | | | |
|---|---|---|---|---|
| i | $r_{iX}$ | $r_{iY}$ | $d_i$ | j | $n_j$ |
| 1 | ∞ | ∞ | 6.012 | 1 | 1.71221 |
| 2 | 180.374 | 6.012 | 19.48 | | |
| 3 | ∞ | −48.1 | 9.62 | 2 | 1.67500 |
| 4 | −53.212 | −13.001 | | | |

Figure 38A:
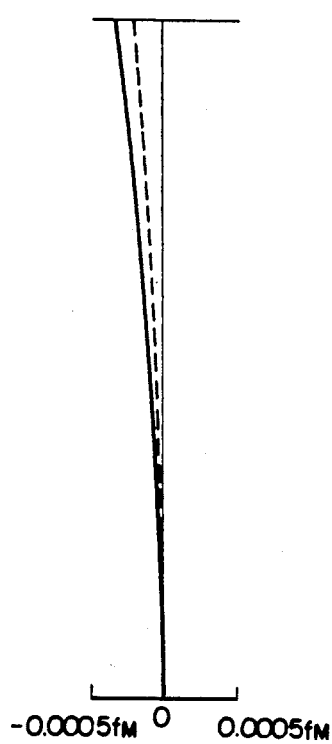
Figure 38B:
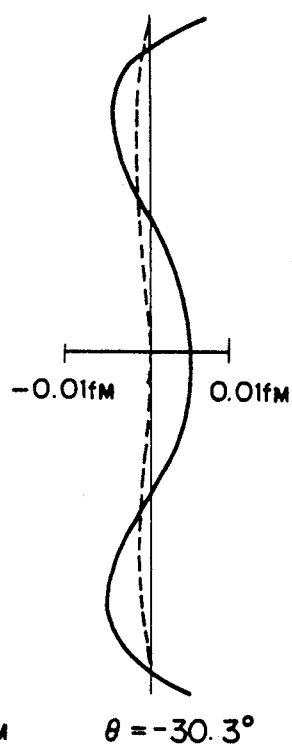
Figure 38C:
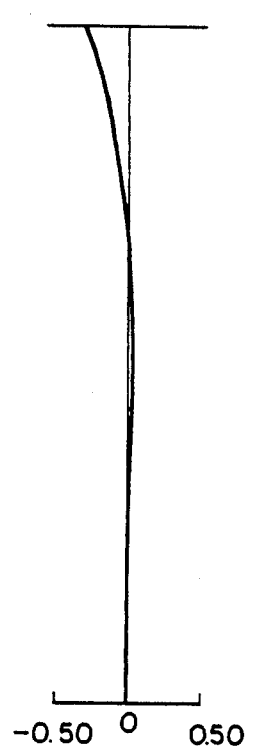

FIGS. 38a, 38b and 38c respectively show an aberration diagram, a diagram of a field curvature and an fθ characteristic graph with respect to the embodiment 23.

EMBODIMENT 24

| $f_M = 100, f_s = 10.085, \beta = -0.603, \alpha = 54, 2\theta = 63.4$ $K = 0.41, d_0 = 12.025$ | | | | |
|---|---|---|---|---|
| i | $r_{iX}$ | $r_{iY}$ | $d_i$ | j | $n_j$ |
| 1 | ∞ | ∞ | 6.012 | 1 | 1.74405 |
| 2 | 195.345 | 1.864 | 16.691 | | |
| 3 | ∞ | −127.464 | 9.62 | 2 | 1.70217 |
| 4 | −55.176 | −13.194 | | | |

FIGS. 39a, 39b and 39c respectively show an aberration diagram, a diagram of a field curvature and an fθ characteristic graph with respect to the embodiment 24.

In the respective embodiment 22 to 24 of the present invention, the aberration is preferably provided and the curve of an image face is particularly corrected very preferably in the main and secondary scanning directions. Further, the fθ characteristics are also preferable in these embodiments.

As mentioned above, effects similar to those in the embodiments 1 to 9 can be obtained in the embodiments 22 to 24.

Another embodiment of the present invention will next be described.

An fθ lens system in this embodiment is constructed by two groups of first and second lenses sequentially arranged from the side of the rotary polygon mirror toward the scanned face side. Further, in this fθ lens system, when the respective lens faces are set from first to fourth faces arranged from the side of the rotary polygon mirror, these lens faces on a deflecting plane sequentially have the shapes of an arc, an arc, a straight line and an arc from the first face toward the fourth face. The first and second lenses respectively have negative and positive refracting powers on a plane parallel to the deflecting plane.

The first lens face is constructed by a concave barrel type toric face having a radius of curvature on the deflecting perpendicular plane reduced as this face is separated from the optical axis. The second lens face is constructed by a convex spherical face. The third lens face is constructed by a concave cylindrical face having a refracting power on only the deflecting perpendicular plane. The fourth lens face is constructed by a convex toric face having a large curvature on the deflecting perpendicular plane.

When a combined focal distance on the deflecting perpendicular plane is set to $f_S$, a lateral magnification is set to $\beta$, and the radii of curvature of the above third and fourth faces on the deflecting perpendicular plane including the optical axis are respectively set to $r'_3$ and $r'_4$, the following condition with respect to these values is satisfied.

$$0.1 < |\{(1/r'_3) - (1/r'_4)\} \cdot f_S \cdot \beta| < 5.4 \quad \text{(VI)}$$

The respective lens faces of the fθ lens system of the present invention will next be described with reference to FIG. 40. In this embodiment, "the deflecting plane" is a plane formed by moving a main light beam ideally deflected by the rotary polygon mirror. "The deflecting perpendicular plane" is a plane parallel to an optical axis of the fθ lens system and perpendicular to the above deflecting plane.

In FIG. 40, the left-hand side is the side of the rotary polygon mirror and the right-hand side is the side of the scanned face. Accordingly, with respect to the lenses, the first lens is located on the left-hand side and the second lens is located on the right-hand side. The first to fourth lens faces are sequentially represented from the left toward the right.

The upper views of FIG. 40 show lens shapes of the fθ lens system on the deflecting plane and the lower views thereof show lens shapes on the deflecting perpendicular plane including the optical axis.

In FIG. 40, the meanings of "main", "secondary", "convex" and "concave" are similar to those in the above-mentioned embodiments of the present invention.

As shown in the respective upper views of FIG. 40, the first to fourth lens face shapes on the deflecting plane are sequentially constructed by an arc, an arc, a straight line and an arc. The refracting power on the plane parallel to the deflecting plane is negative with respect to the first lens and is positive with respect to the second lens.

The above-mentioned condition (VI) will next be described in detail.

It is possible to preferably correct the field curvature in the main and secondary scanning directions by the construction of the above-mentioned lens faces in the fθ lens system.

However, in a state in which the field curvature in the main scanning direction is preferably corrected, it is necessary to further satisfy the above condition (VI) so as to effectively correct the image face curve in the secondary scanning direction.

Namely, in the case in which the reflecting face inclination is corrected by the above-mentioned lens face construction, when an absolute value in the condition (VI) exceeds a lower limit, the image forming position in the secondary scanning direction is shifted from the scanned face in the direction opposite to the rotary polygon. When this absolute value exceeds an upper limit, the image forming position in the secondary scanning direction is shifted from the scanned face toward the rotary polygon. Accordingly, in the case in which this condition (VI) is not satisfied, a performance for forming the image is reduced and the diameter of a light spot in the secondary scanning direction is greatly varied so that it is difficult to preferably realize an optically scanning operation. In contrast to this, in the case in which the above condition (VI) is satisfied, the function for correcting the field curvature in the secondary scanning direction is preferably fulfilled on the concave barrel type toric face of the first lens face.

As mentioned above, it is possible to use the barrel type toric face TT in FIG. 22 as a convex lens face and a concave lens face. In this embodiment, the concave barrel type toric face is used as the first lens face.

On the convex toric face of the fourth lens face, the arc is located on the deflecting perpendicular plane including the optical axis. The rotary axis is parallel to the secondary scanning direction on this plane and is located on the side opposite to the arc with respect to the center of curvature of the arc. Accordingly, this toric face has a large curvature on the deflecting perpendicular plane including the optical axis.

In this embodiment, on the concave barrel type toric face of the first lens face, the direction of the $X_1-Y_1$ axis is constructed to be parallel to the main scanning direction on the deflecting plane.

The concrete embodiments 25 to 34 of the present invention will next be described in detail in the following description.

In the respective embodiments, reference numeral $f_M$ shows a combined focal distance with respect to the main scanning direction of the fθ lens system, i.e., the combined focal distance on a plane parallel to the deflecting plane. This value $f_M$ is normalized to 100. Reference numeral $f_S$ shows a combined focal distance on the deflecting perpendicular plane, i.e., the combined focal distance with respect to the secondary scanning direction. Reference numerals $2\theta$, $\alpha$ and $\beta$ respectively designate a deflection angle (unit: degree), the above-mentioned intrinsic incident angle (unit: degree) and a lateral magnification on the deflecting perpendicular plane.

Reference numeral $r_{iX}$ designates a radius of curvature of an i-th lens face on the deflecting plane counted from the side of the rotary polygon mirror, i.e., the radius of curvature of lens face shapes represented in the respective upper views shown as "main" in FIG. 40. Reference numeral $r_{iY}$ designates the radius of curvature of the i-th lens face on the deflecting perpendicular plane, i.e., the radius of curvature of lens face shapes represented in the respective lower views shown as "secondary" in FIG. 40. In particular, in the condition (VI), $r_3Y$ and $r_4Y$ are respectively explained as $r'_3$ and $r'_4$. With respect to the first lens face, an $r_1X$ designates a distance between points V and $C_1$ in FIG. 9, and an $r_1Y$ designates a distance between the points V and $C_2$.

Reference numeral $d_i$ designates a distance between the i-th lens faces. Reference numeral $d_0$ designates a distance from the reflecting face of the rotary polygon mirror to the first lens face. Reference numeral $n_j$ designates a refractive index of a j-th lens.

Further, reference numeral K represents a value $|\{(1/r_4')\}\cdot f_s\cdot\beta|$ in the above condition (VI).

EMBODIMENT 25

$f_M = 100$, $f_s = 14.385$, $\beta = -1.542$, $\alpha = 54$, $2\theta = 63.7$
$K = 0.96$, $d_0 = 3.607$

| i | $r_iX$ | $r_iY$ | $d_i$ | j | $n_j$ |
|---|--------|--------|-------|---|-------|
| 1 | −30.303 | −6.012 | 3.487 | 1 | 1.71221 |
| 2 | −29.341 | −29.341 | 38.961 | | |
| 3 | ∞ | −57.72 | 6.012 | 2 | 1.675 |
| 4 | −80.794 | −16.497 | | | |

FIGS. 41a, 41b and 41c respectively show an aberration diagram, a diagram showing a field curvature and an f θ characteristic graph with respect to the embodiment 25. The field curvature is shown in relation to the rotation of the rotary polygon mirror and a broken line shows the field curvature in the main scanning direction and a solid line shows the field curvature in the secondary scanning direction.

The f θ characteristics are defined by $(h-f_M\theta)100/(f_M\theta)$ when the height of an ideal image is $f_M\theta$ and the height of the real image is h.

EMBODIMENT 26

$f_M = 100$, $f_s = 3.616$, $\beta = -0.701$, $\alpha = 54$, $2\theta = 63.7$
$K = 0.11$, $d_0 = 3.607$

| i | $r_iX$ | $r_iY$ | $d_i$ | j | $n_j$ |
|---|--------|--------|-------|---|-------|
| 1 | −30.303 | −1.202 | 3.487 | 1 | 1.71221 |
| 2 | −29.341 | −29.341 | 38.961 | | |
| 3 | ∞ | −57.72 | 6.012 | 2 | 1.675 |
| 4 | −80.794 | −16.216 | | | |

FIGS. 42a, 42b and 42c respectively show an aberration diagram, a diagram of a field curvature and an f θ characteristic graph with respect to the embodiment 26.

EMBODIMENT 27

$f_M = 100$, $f_s = 29.686$, $\beta = -1.988$, $\alpha = 54$, $2\theta = 63.7$
$K = 2.72$, $d_0 = 3.607$

| i | $r_iX$ | $r_iY$ | $d_i$ | j | $n_j$ |
|---|--------|--------|-------|---|-------|
| 1 | −30.303 | −24.05 | 3.487 | 1 | 1.71221 |
| 2 | −29.341 | −29.341 | 38.961 | | |
| 3 | ∞ | −57.118 | 6.012 | 2 | 1.675 |
| 4 | −80.794 | −16.611 | | | |

FIGS. 43a, 43b and 43c respectively show an aberration diagram, a diagram of a field curvature and an f θ characteristic graph with respect to the embodiment 27.

EMBODIMENT 28

$f_M = 100$, $f_s = 9.014$, $\beta = -0.702$, $\alpha = 54$, $2\theta = 63.1$
$K = 0.48$, $d_0 = 12.025$

| i | $r_iX$ | $r_iY$ | $d_i$ | j | $n_j$ |
|---|--------|--------|-------|---|-------|
| 1 | −25.373 | −1.202 | 6.133 | 1 | 1.71221 |
| 2 | −27.778 | −27.778 | 11.905 | | |
| 3 | ∞ | −44.372 | 6.012 | 2 | 1.675 |
| 4 | −75.242 | −10.222 | | | |

FIGS. 44a, 44b and 44c respectively show an aberration diagram, a diagram of a field curvature and an f θ characteristic graph with respect to the embodiment 28.

EMBODIMENT 29

$f_M = 100$, $f_s = 24.389$, $\beta = -2.771$, $\alpha = 54$, $2\theta = 63.1$
$K = 3.68$, $d_0 = 12.025$

| i | $r_iX$ | $r_iY$ | $d_i$ | j | $n_j$ |
|---|--------|--------|-------|---|-------|
| 1 | −25.373 | −12.025 | 6.133 | 1 | 1.71221 |
| 2 | −27.778 | −27.778 | 11.905 | | |
| 3 | ∞ | −32.948 | 6.012 | 2 | 1.675 |
| 4 | −75.242 | −11.794 | | | |

Figure 45A:
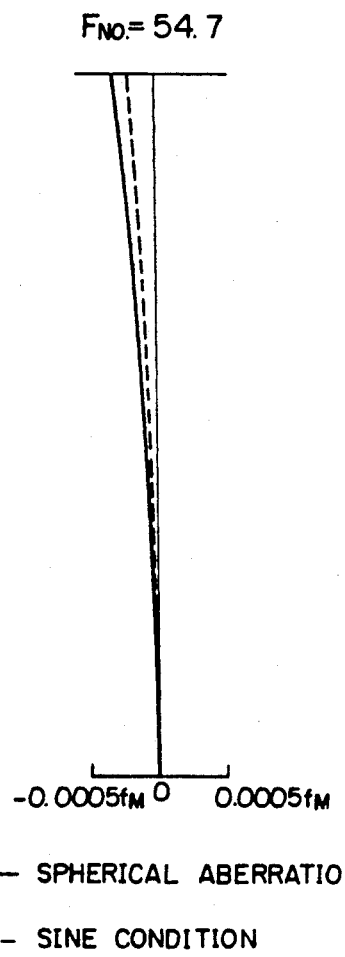
Figure 45B:
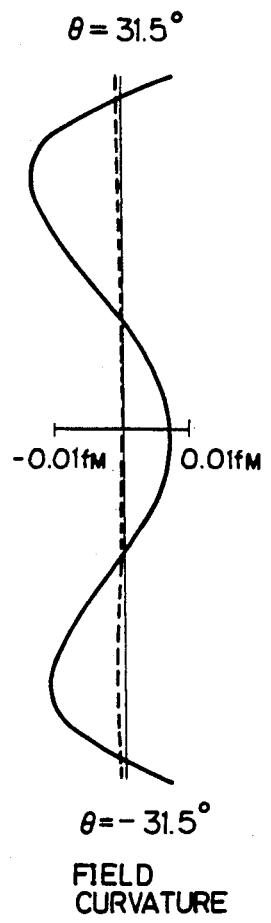
Figure 45C:
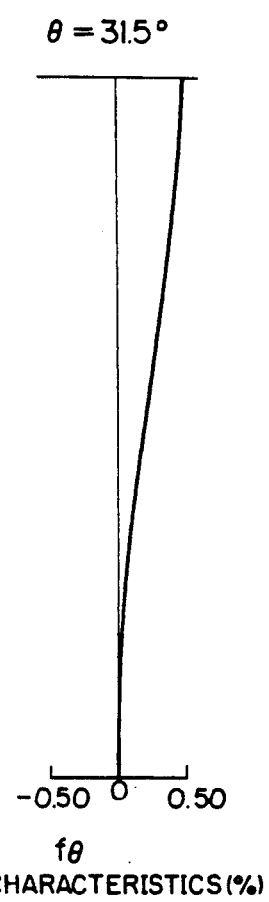

FIGS. 45a, 45b and 45c respectively show an aberration diagram, a diagram of a field curvature and an f θ characteristic graph with respect to the embodiment 29.

EMBODIMENT 30

$f_M = 100$, $f_s = 23.789$, $\beta = -3.768$, $\alpha = 54$, $2\theta = 63.1$
$K = 4.06$, $d_0 = 12.025$

| i | $r_iX$ | $r_iY$ | $d_i$ | j | $n_j$ |
|---|--------|--------|-------|---|-------|
| 1 | −25.373 | −60.125 | 6.133 | 1 | 1.71221 |
| 2 | −27.778 | −27.778 | 11.905 | | |
| 3 | ∞ | −31.265 | 6.012 | 2 | 1.675 |
| 4 | −75.242 | −12.943 | | | |

Figure 46A:
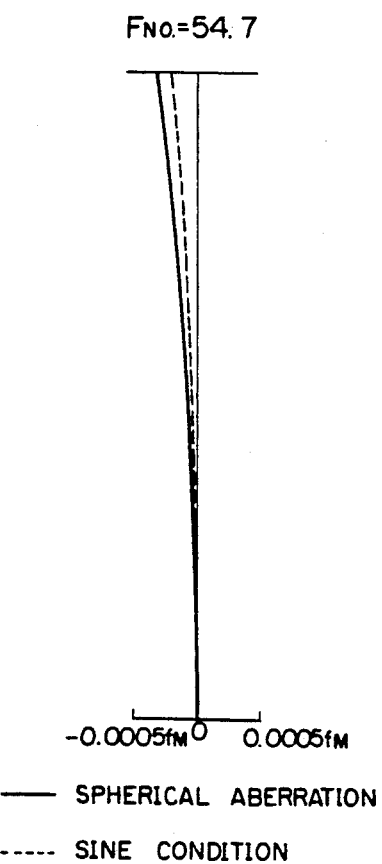
Figure 46B:
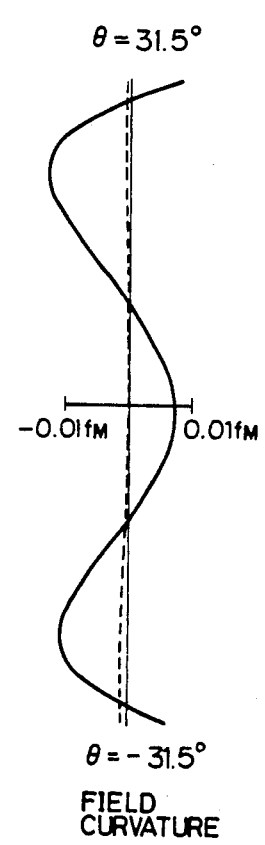
Figure 46C:
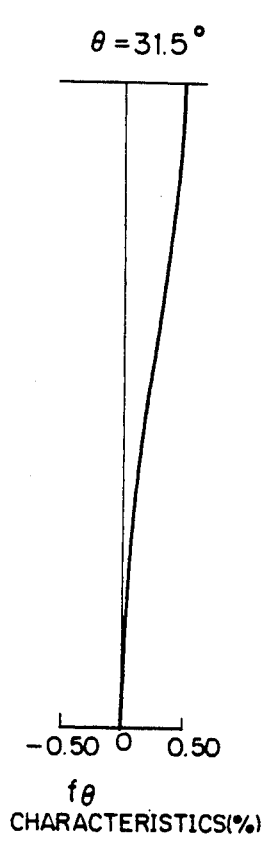

FIGS. 46a, 46b and 46c respectively show an aberration diagram, a diagram of a field curvature and an f θ characteristic graph with respect to the embodiment 30.

EMBODIMENT 31

$f_M = 100$, $f_s = 23.381$, $\beta = -3.979$, $\alpha = 54$, $2\theta = 63.1$
$K = 4.04$, $d_0 = 12.025$

| i | $r_iX$ | $r_iY$ | $d_i$ | j | $n_j$ |
|---|--------|--------|-------|---|-------|
| 1 | −25.373 | −144.299 | 6.133 | 1 | 1.71221 |
| 2 | −27.778 | −27.778 | 11.905 | | |
| 3 | ∞ | −31.265 | 6.012 | 2 | 1.675 |
| 4 | −75.242 | −12.943 | | | |

FIGS. 47a, 47b and 47c respectively show an aberration diagram, a diagram of a field curvature and an f θ characteristic graph with respect to the embodiment 31.

EMBODIMENT 32

$f_M = 100$, $f_s = 21.59$, $\beta = -4.295$, $\alpha = 54$, $2\theta = 63.1$
$K = 5.05$, $d_0 = 7.816$

| i | $r_iX$ | $r_iY$ | $d_i$ | j | $n_j$ |
|---|--------|--------|-------|---|-------|
| 1 | −16.358 | −24.05 | 3.968 | 1 | 1.71221 |
| 2 | −18.398 | −18.398 | 14.67 | | |
| 3 | ∞ | −27.537 | 4.329 | 2 | 1.675 |
| 4 | −69.023 | −11.016 | | | |

Figure 48A:
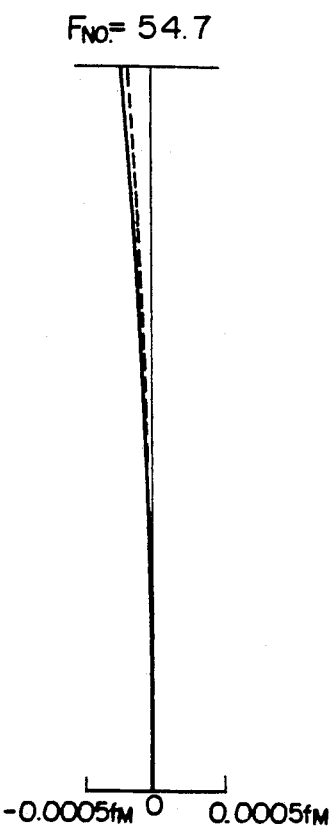
Figure 48B:
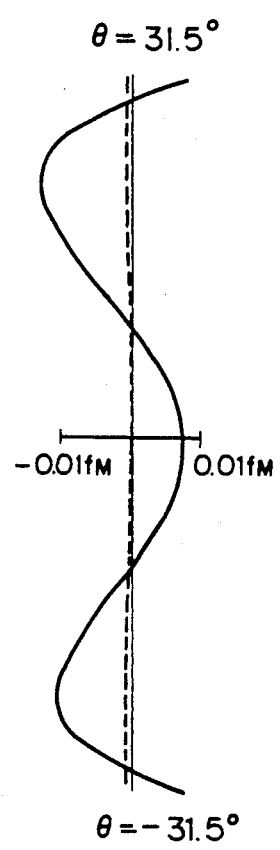
Figure 48C:
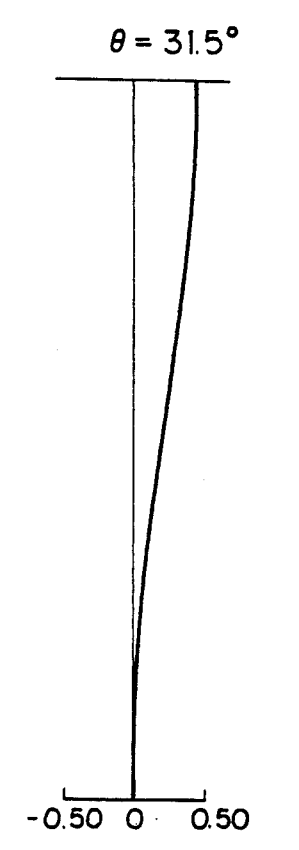

FIGS. 48a, 48b and 48c respectively show an aberration diagram, a diagram of a field curvature and an f θ characteristic graph with respect to the embodiment 32.

EMBODIMENT 33

| $f_M = 100, f_s = 20.608, \beta = -2.861, \alpha = 54, 2\theta = 63.1$ | | | | |
|---|---|---|---|---|
| $K = 3.67, d_o = 7.816$ | | | | |
| i | $r_iX$ | $r_iY$ | $d_i$ | j | $n_j$ |
| 1 | −16.358 | − 6.012 | 3.968 | 1 | 1.71221 |
| 2 | −18.398 | −18.398 | 14.67 | | |
| 3 | ∞ | −27.778 | 4.329 | 2 | 1.675 |
| 4 | −69.023 | −37.95 | | | |

Figure 49A:
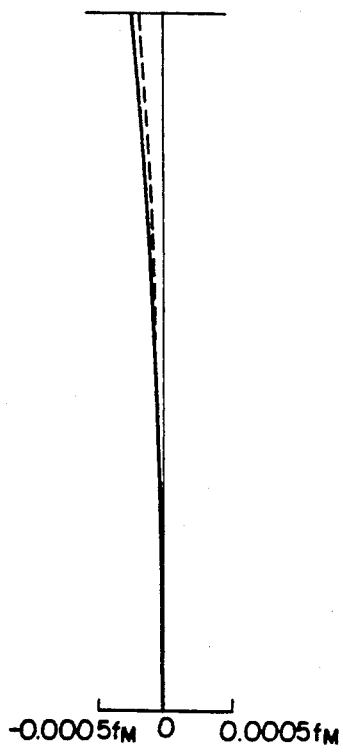
Figure 49B:
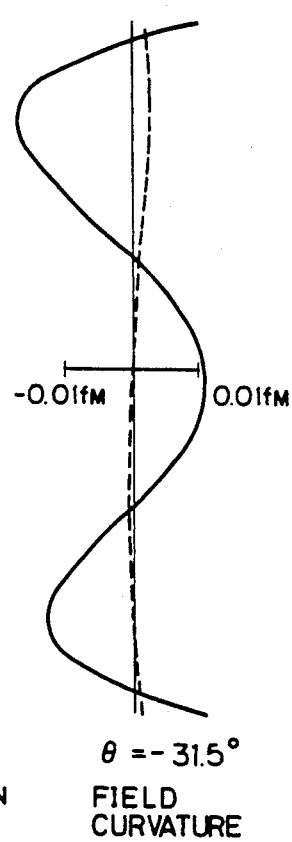
Figure 49C:
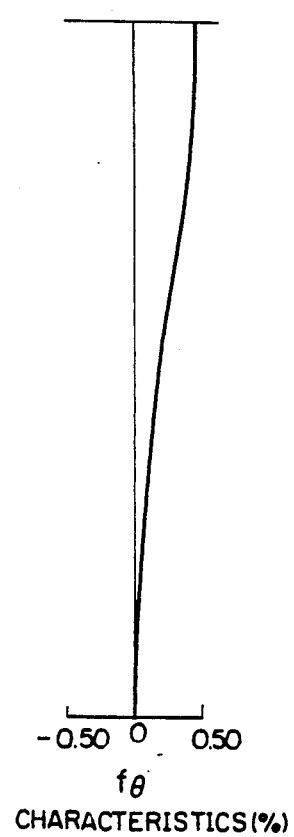

FIGS. 49a, 49b and 49c respectively show an aberration diagram, a diagram of a field curvature and an f θ characteristic graph with respect to the embodiment 33.

EMBODIMENT 34

| $f_M = 100, f_s = 20.676, \beta = -5.001, \alpha = 54, 2\theta = 63.1$ | | | | |
|---|---|---|---|---|
| $K = 5.25, d_o = 7.816$ | | | | |
| i | $r_iX$ | $r_iY$ | $d_i$ | j | $n_j$ |
| 1 | −16.358 | −144.299 | 3.968 | 1 | 1.71221 |
| 2 | −18.398 | −18.398 | 14.67 | | |
| 3 | ∞ | −27.778 | 4.329 | 2 | 1.675 |
| 4 | −69.023 | −11.528 | | | |

FIGS. 50a, 50b and 50c respectively show an aberration diagram, a diagram of a field curvature and an f θ characteristic graph with respect to the embodiment 34.

In the respective embodiments 25 to 34 of the present invention, the aberration is preferably provided and the curvature of a field is particularly corrected very preferably in the main and secondary scanning directions. Further, the f θ characteristics are also preferable in these embodiments.

As mentioned above, effects similar to those in the embodiments 1 to 9 can be obtained in the embodiments 25 to 34.

Another embodiment of the present invention will next be described.

An f θ lens system in this embodiment is constructed by two groups of first and second lenses sequentially arranged from the side of the rotary polygon mirror toward the scanned face side. Further, in this f θ lens system, when the respective lens faces are set from first to fourth faces arranged from the side of the rotary polygon mirror, these lens faces on a deflecting plane sequentially have the shapes of a straight line, an arc, an arc and an arc from the first face toward the fourth face. The first and second lenses respectively have a positive refracting power on a plane parallel to the deflecting plane.

The first lens face is constructed by a concave cylindrical face having a refracting power on only the deflecting perpendicular plane. The second lens face is constructed by a convex barrel type toric face having a radius of curvature on the deflecting perpendicular plane reduced as this face is separated from the optical axis. The third lens face is constructed by a concave spherical face. The fourth lens face is constructed by a convex toric face having a large curvature on the deflecting perpendicular plane.

When a combined focal distance on the deflecting perpendicular plane is set to $f_S$ and the radii of curvature of the above first and second faces on the deflecting perpendicular plane including the optical axis are respectively set to $r'_1$ and $r'_2$, the following condition with respect to these values is satisfied.

$$0.5 < |\{(1/r'_1) - (1/r'_2)\} \cdot f_s| < 3.8 \qquad \text{(VII)}$$

The respective lens faces of the f θ lens system in the present invention will next be described with reference to FIG. 51. In this embodiment, "the deflecting plane" is a plane formed by moving a main light beam ideally deflected by the rotary polygon mirror. "The deflecting perpendicular plane" is a plane parallel to an optical axis of the f θ lens system and perpendicular to the above deflecting plane.

In FIG. 51, the left-hand side is the side of the rotary polygon mirror and the right-hand side is the side of the scanned face. Accordingly, with respect to the lenses, the first lens is located on the left-hand side and the second lens is located on the right-hand side. The first to fourth lens faces are sequentially represented from the left toward the right.

The upper views of FIG. 51 show lens shapes of the f θ lens system on the deflecting plane and the lower views thereof show lens shapes on the deflecting perpendicular plane including the optical axis.

In FIG. 51, the meanings of "main", "secondary", "convex" and "concave" are similar to those in the above-mentioned embodiments of the present invention.

As shown in the respective upper views of FIG. 51, the first to fourth lens face shapes on the deflecting plane are sequentially constructed by a straight line, an arc, an arc and an arc. The refracting power on the plane parallel to the deflecting plane is positive with respect to both the first and second lenses.

The above-mentioned condition (VII) will next be described in detail.

It is possible to preferably correct the field curvature in the main and secondary scanning directions by the construction of the above-mentioned lens faces in the f θ lens system.

However, in a state in which the image face curve in the main scanning direction is preferably corrected, it is necessary to further satisfy the above condition (VII) so as to effectively correct the field curvature in the secondary scanning direction. Namely, in the case in which the reflecting face inclination is corrected by the above-mentioned lens face construction, when an absolute value in the condition (VII) exceeds a lower limit, the image forming position in the secondary scanning direction is shifted from the scanned face toward the rotary polygon. When this absolute value exceeds an upper limit, the image forming position in the secondary scanning direction is shifted from the scanned face in the direction opposite to the rotary polygon. Accordingly, in the case in which this condition (VII) is not satisfied, a performance for forming the image is reduced and the diameter of a light spot in the secondary scanning direction is greatly varied so that it is difficult to preferably realize an optically scanning operation. In contrast to this, in the case in which the above condition (VII) is satisfied, the function for correcting the field curvature in the secondary scanning direction is preferably fulfilled on the convex barrel type toric face of the second lens face.

As mentioned above, it is possible to use the barrel type toric face in FIG. 10 as a convex lens face and a concave lens face. In this embodiment, the convex barrel type toric face is used as the second lens face.

On the convex toric face of the fourth lens face, the arc is located on the deflecting perpendicular plane including the optical axis. The rotary axis is parallel to the secondary scanning direction on this plane and is located on the side opposite to the arc with respect to the center of curvature of the arc. Accordingly, this toric face has a large curvature on the deflecting perpendicular plane including the optical axis.

In this embodiment, on the convex barrel type toric face of the second lens face, the direction of the $X_1-Y_1$ axis is constructed to be parallel to the main scanning direction on the deflecting plane.

The concrete embodiments 35 to 38 of the present invention will next be described in detail in the following description.

In the respective embodiments, reference numeral $f_M$ shows a combined focal distance with respect to the main scanning direction of the f $\theta$ lens system, i.e., the combined focal distance on a plane parallel to the deflecting plane. This value $f_M$ is normalized to 100. Reference numeral $f_S$ shows a combined focal distance on the deflecting perpendicular plane, i.e., the combined focal distance with respect to the secondary scanning direction. Reference numerals 2 $\theta$, $\alpha$ and $\beta$ respectively designate a deflection angle (unit: degree), an intrinsic incident angle (unit: degree) and a lateral magnification on the deflecting perpendicular plane.

Reference numeral $r_{iX}$ designates a radius of curvature of an i-th lens face on the deflecting plane counted from the side of the rotary polygon mirror, i.e., the radius of curvature of lens face shapes represented in the respective upper views shown as "main" in FIG. 51. Reference numeral $r_{iY}$ designates a radius of curvature of the i-th lens face on the deflecting perpendicular plane, i.e., the radius of curvature of lens face shapes represented in the respective lower views shown as "secondary" in FIG. 51. In particular, in the condition (VII), $r_{1Y}$ and $r_{2Y}$ are respectively explained as $r'_1$ and $r'_2$. With respect to the second lens face, and $r_{2X}$ designates a distance between points V and $C_1$ in FIG. 9, and the $r_{2Y}$ designates a distance between the points V and $C_2$.

Reference numeral $d_i$ designates a distance between the i-th lens faces. Reference numeral $d_0$ designates a distance from the reflecting face of the rotary polygon mirror to the first lens face. Reference numeral $n_j$ designates a refractive index of a j-th lens.

Further, reference numeral K represents a value $|\{(1/r'_1)-(1/r'_2)\}\cdot f_S|$ in the above condition (VII).

EMBODIMENT 35

| | | | | | |
|---|---|---|---|---|---|
| $f_M = 100$, $f_s = 15.34$, $\beta = -3.834$, $\alpha = 54$, $2\theta = 60$ | | | | | |
| $K = 3.76$, $d_0 = 5.411$ | | | | | |
| i | $r_{iX}$ | $r_{iY}$ | $d_i$ | j | $n_j$ |
| 1 | $\infty$ | −3.607 | 1.509 | 1 | 1.71221 |
| 2 | −954.892 | −31.264 | 7.245 | | |
| 3 | −36.527 | −36.527 | 4.637 | 2 | 1.675 |
| 4 | −25.487 | −7.237 | | | |

Figure 52A:
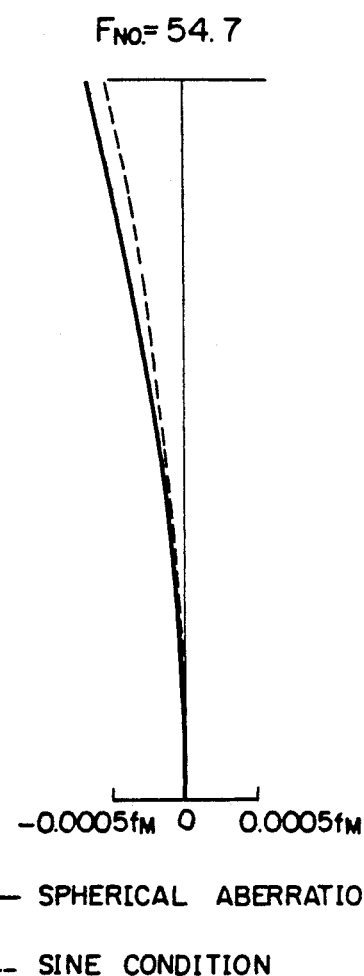
Figure 52B:
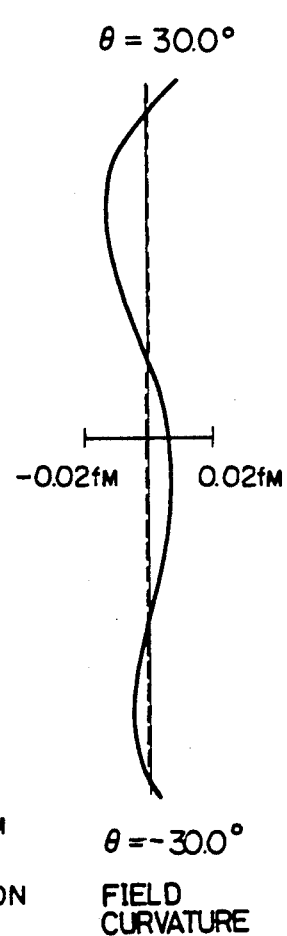
Figure 52C:
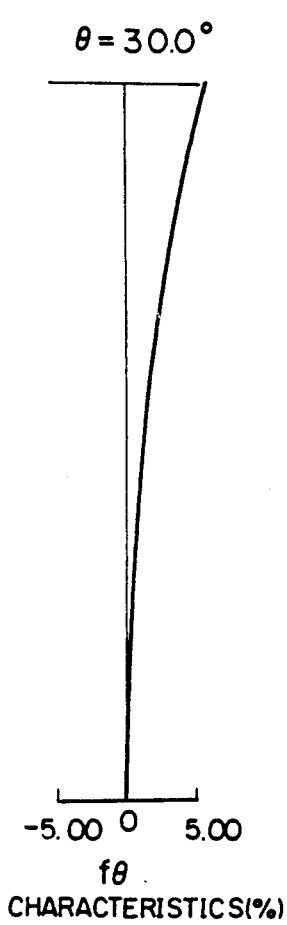

FIGS. 52a, 52b and 52c respectively show an aberration diagram, a diagram showing an image face curve and an f $\theta$ characteristic graph with respect to the embodiment 35. The image face curve is shown in relation to the rotation of the rotary polygon mirror and a broken line shows the field curvature in the main scanning direction and a solid line shows the image face curve in the secondary scanning direction.

The f $\theta$ characteristics are defined by $(h-f_M\theta)100/(f_M\theta)$ when the height of an ideal image is $f_M\theta$ and the height of the real image is h.

EMBODIMENT 36

| | | | | | |
|---|---|---|---|---|---|
| $f_M = 100$, $f_s = 17.016$, $\beta = -4.58$, $\alpha = 54$, $2\theta = 60.4$ | | | | | |
| $K = 1.95$, $d_0 = 9.018$ | | | | | |
| i | $r_{iX}$ | $r_{iY}$ | $d_i$ | j | $n_j$ |
| 1 | $\infty$ | −5.05 | 3.716 | 1 | 1.71221 |
| 2 | −478.035 | −12.024 | 0.602 | | |
| 3 | −40.653 | −40.653 | 8.779 | 2 | 1.675 |
| 4 | −28.998 | −8.37 | | | |

FIGS. 53a, 53b and 53c respectively show an aberration diagram, a diagram of a field curvature and an f $\theta$ characteristic graph with respect to the embodiment 36.

EMBODIMENT 37

| | | | | | |
|---|---|---|---|---|---|
| $f_M = 100$, $f_s = 14.92$, $\beta = -5.528$, $\alpha = 54$, $2\theta = 60.4$ | | | | | |
| $K = 1.59$, $d_0 = 7.816$ | | | | | |
| i | $r_{iX}$ | $r_{iY}$ | $d_i$ | j | $n_j$ |
| 1 | $\infty$ | −6.012 | 3.367 | 1 | 1.71221 |
| 2 | −623.55 | −16.654 | 1.202 | | |
| 3 | −36.795 | −36.795 | 6.012 | 2 | 1.675 |
| 4 | −26.335 | −7.034 | | | |

Figure 54A:
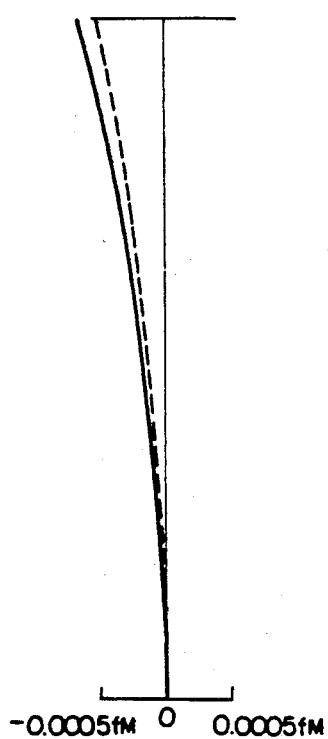
Figure 54B:
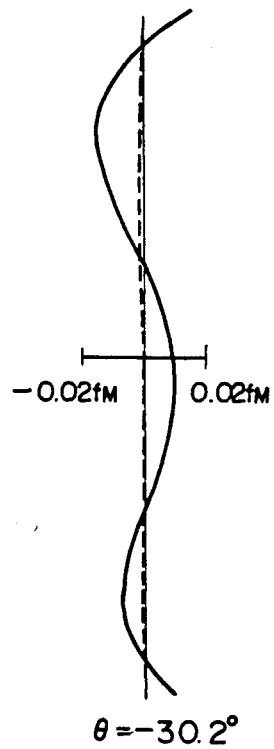
Figure 54C:
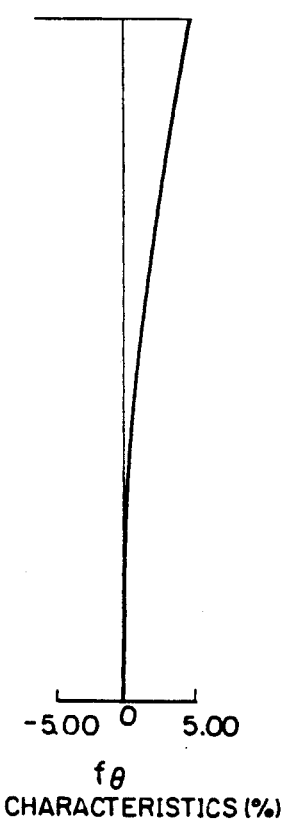

FIGS. 54a, 54b and 54c respectively show an aberration diagram, a diagram of a field curvature and an f $\theta$ characteristic graph with respect to the embodiment 37.

EMBODIMENT 38

| | | | | | |
|---|---|---|---|---|---|
| $f_M = 100$, $f_s = 16.104$, $\beta = -5.425$, $\alpha = 54$, $2\theta = 60.4$ | | | | | |
| $K = 0.57$, $d_0 = 9.018$ | | | | | |
| i | $r_{iX}$ | $r_{iY}$ | $d_i$ | j | $n_j$ |
| 1 | $\infty$ | −26.694 | 3.716 | 1 | 1.71221 |
| 2 | −478.035 | −601.224 | 0.602 | | |
| 3 | −40.653 | −40.653 | 8.779 | 2 | 1.675 |
| 4 | −28.998 | −8.329 | | | |

Figure 55A:
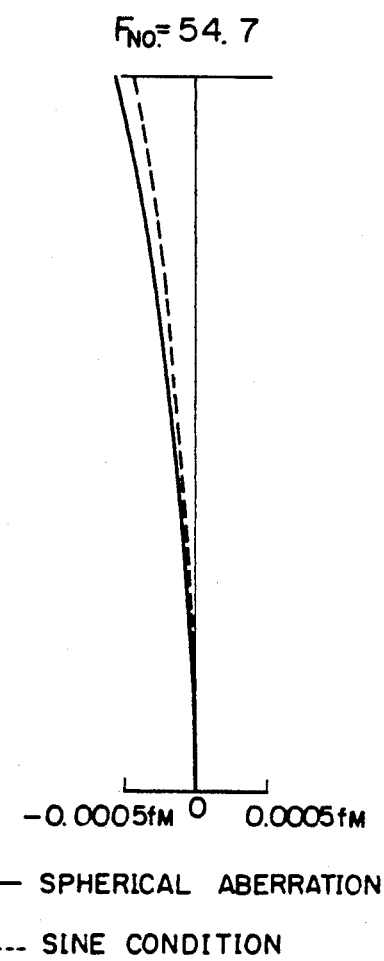
Figure 55B:
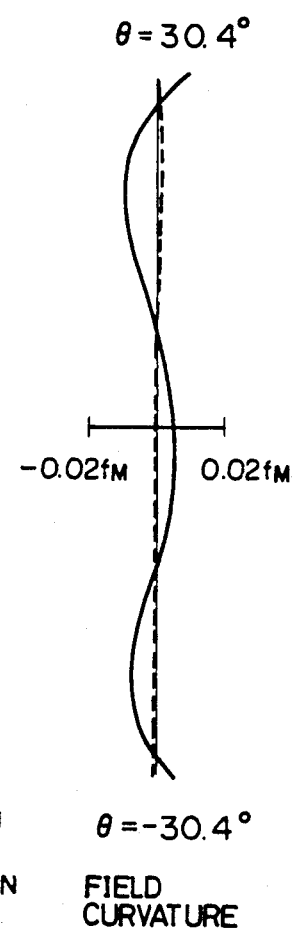
Figure 55C:
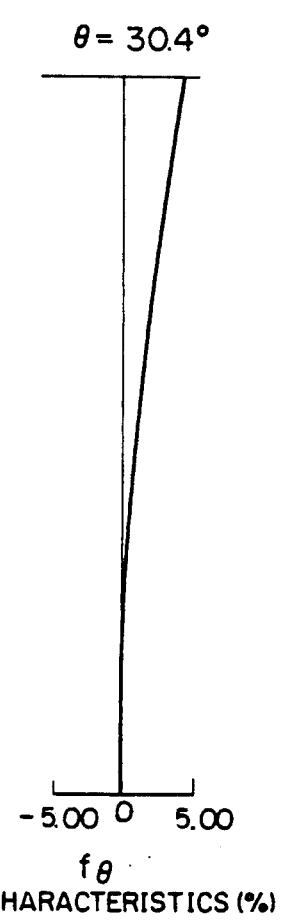

FIGS. 55a, 55b and 55c respectively show an aberration diagram, a diagram of a field curvature and an f $\theta$ characteristic graph with respect to the embodiment 38.

In the respective embodiments 35 to 38 of the present invention, the aberration is preferably provided and the curve of an image face is particularly corrected very preferably in the main and secondary scanning directions. Further, the f $\theta$ characteristics are also preferable in these embodiments.

As mentioned above, effects similar to those in the embodiments 1 to 9 can be obtained in the embodiments 35 to 38.

Many widely different embodiments of the present invention may be constructed without departing from the spirit and scope of the present invention. It should be understood that the present invention is not limited to the specific embodiments described in the specification, except as defined in the appended claims.

What is claimed is:

1. An f$\theta$ lens system in an optical scanner in which a light beam from a light source is formed as a line image extending in a main scanning corresponding direction and is deflected at an equiangular velocity by a rotary polygon mirror having a reflecting face in the vicinity of an image forming position of the line image and is then formed by an image forming lens system in the shape of a spot on a scanned face to optically scan the scanned face, said fθ lens system focusing and forming the light beam deflected by the rotary polygon mirror as an image on the scanned face, said fθ lens system having a function for connecting a reflecting position of the rotary polygon mirror and the scanned face in an approximately conjugate relation in geometrical optics with respect to a secondary scanning direction, and having an fθ function with respect to a main scanning direction, said fθ lens system comprising two groups of first and second lenses sequentially arranged from the side of the rotary polygon mirror toward the scanned face side, said lenses having first to fourth lens faces provided from the side of said rotary polygon mirror and having shapes on a deflecting plane sequentially composed of an arc, a straight line, a straight line and an arc from the first to fourth lens faces, said first lens having negative refracting power on a plane parallel to the deflecting plane, and second lens having positive retracting power on the plane parallel to the deflecting plane, said first to fourth lens faces being respectively constructed by a concave barrel type toric face having a radius of curvature on a deflecting perpendicular plane reduced as this face is separated from an optical axis, a convex cylindrical or planar face having a refracting power on only the deflecting perpendicular plane, a concave cylindrical face having a refracting power on only the deflecting perpendicular plane, and a convex toric face having a large curvature on the deflecting perpendicular plane, a center of curvature on a generatrix of said barrel type toric face being situated on an opposite side to said generatrix with respect to a rotation axis of said barrel type toric face, a combined focal distance $f_S$ on the deflecting perpendicular plane and a radius $r'_3$ of curvature of the third lens face on the deflecting perpendicular plane satisfying the following condition, $$1.6 \leq |r'_3/f_S| \leq 3.1.$$

2. An fθ lens system in an optical scanner in which a light beam from a light source is formed as a line image extending in a main scanning corresponding direction and is deflected at an equiangular velocity by a rotary polygon mirror having a reflecting face in the vicinity of an image forming position of the line image and is then formed by an image forming lens system in the shape of a spot on a scanned face to optically scan the scanned face, said fθ lens system focusing and forming the light beam deflected by the rotary polygon mirror as an image on the scanned face, said fθ lens system having a function for connecting a reflecting position of the rotary polygon mirror and the scanned face in an approximately conjugate relation in geometrical optics with respect to a secondary scanning direction, and having an fθ function with respect to a main scanning direction, said fθ lens system comprising two groups of first and second lenses sequentially arranged from the side of the rotary polygon mirror toward the scanned face side, said lenses having first to fourth lens faces provided from the side of said rotary polygon mirror and having shapes on a deflecting plane sequentially composed of an arc, a straight line, a straight line and an arc from the first to fourth lens faces, said first lens having negative refracting power on a plane parallel to the deflecting plane, and second lens having positive refracting power on the plane parallel to the deflecting plane, said first to fourth lens faces being respectively constructed by a concave barrel type toric face having an absolute value of a radius of curvature on a deflecting perpendicular plane reduced as this face is separated from an optical axis, a concave cylindrical face having a refracting power on only the deflecting perpendicular plane, a concave cylindrical face having a refracting power on only the deflecting perpendicular plane, and a convex toric face having a large curvature on the deflecting perpendicular plane, a center of curvature on a generatrix of said barrel type toric face being situated on an opposite side to said generatrix with respect to a rotation axis of said barrel type toric face, a combined focal distance $f_S$ on the deflecting perpendicular plane and respective radii $r'_1$, $r'_2$, $r'_3$ and $r'_4$ of curvature of the first, second, third and fourth lens faces on the deflecting perpendicular plane satisfying the following condition, $$2.0 < [\{(1/r'_1) - (1/r'_2)\} - \{(1/r'_3) - (1/r'_4)\}] \cdot f_S < 9.8.$$

3. An fθ lens system in an optical scanner in which an approximately parallel light beam from a light source is formed as a line image extending in a main scanning corresponding direction and is deflected at an equiangular velocity by a rotary polygon mirror having a reflecting face in the vicinity of an image forming position of the line image and is then formed by an image forming lens system in the shape of a spot on a scanned face to optically scan the scanned face at an approximately equal speed, said fθ lens system focusing and forming the light bean deflected by the rotary polygon mirror as an image on the scanned face, said fθ lens system having a function for connecting a reflecting position of the rotary polygon mirror and the scanned face in an approximately conjugate relation in geometrical optics with respect to a secondary scanning direction, and having an fθ function with respect to a main scanning direction, said fθ lens system comprising two groups of first and second lenses sequentially arranged from the side of the rotary polygon mirror toward the scanned face side, said lenses having first to fourth lens faces provided from the side of said rotary polygon mirror and having shapes on a deflecting plane sequentially composed of an arc, an arc, a straight line and an arc from the first to fourth lens faces, said first lens having negative or positive refracting power on a plane parallel to the deflecting plane, said second lens having positive refracting power on the plane parallel to the deflecting plane, said first to fourth lens faces being respectively constructed by a spherical face, a convex barrel type toric face having an absolute value of a radius of curvature on a deflecting perpendicular plane reduced as this face is separated from an optical axis, a concave cylindrical face having a refracting power on only the deflecting perpendicular plane, and a convex toric face having a large curvature on the deflecting perpendicular plane, a center of curvature on a generatrix of said barrel type toric face being situated on an opposite side to said generatrix with respect to a rotation axis of said barrel type toric face, a combined focal distance $f_S$ on the deflecting perpendicular plane and respective radii $r'_2$ and $r'_4$ of curvature of the second and fourth lens faces on the deflecting perpendicular plane including the optical axis satisfying the following conditions, $$0.3 < |r'_2/r'_4| < 1.0$$

$$0.03 < |r'_2/f_S| < 0.54.$$

4. An fθ lens system in an optical scanner in which an approximately parallel light beam from a light source is formed as a line image extending in a main scanning corresponding direction and is deflected at an equiangular velocity by a rotary polygon mirror having a reflecting face in the vicinity of an image forming position of the line image and is then formed by an image forming lens system in the shape of a spot on a scanned face to optically scan the scanned face at an approximately equal speed, said fθ lens system focusing and forming the light beam deflected by the rotary polygon mirror as an image on the scanned face, said fθ lens system having a function for connecting a reflecting position of the rotary polygon mirror and the scanned face in an approximately conjugate relation in geometrical optics with respect to a secondary scanning direction, and having an fθ function with respect to a main scanning direction, said fθ lens system comprising two groups of first and second lenses sequentially arranged from the side of the rotary polygon mirror toward the scanned face side, said lenses having first to fourth lens faces provided from the side of said rotary polygon mirror and having shapes on a deflecting plane sequentially composed of an arc, an arc, a straight line and an arc from the first to fourth lens faces, said first lens having negative refracting power on a plane parallel to the deflecting plane, and said second lens having positive refracting power on the plane parallel to the deflecting plane, said first to fourth lens faces being respectively constructed by a concave barrel type toric face having a radius of curvature on a deflecting perpendicular plane reduced as this face is separated from an optical axis, a convex spherical face, a concave cylindrical face having a refracting power on only the deflecting perpendicular plane, and a convex toric face having a large curvature on the deflecting perpendicular plane, a center of curvature on a generatrix of said barrel type toric face being situated on an opposite side to said generatrix with respect to a rotation axis of said barrel type toric face, a combined focal distance $f_S$ on the deflecting perpendicular plane, a lateral magnification $\beta$ and respective radii $r'_3$ and $r'_4$ of curvature of the third and fourth lens faces on the deflecting perpendicular plane including the optical axis satisfying the following condition, $$0.1 < |\{(1/r'_3) - (1/r'_4)\} \cdot f_S \cdot \beta| < 5.4.$$

5. An fθ lens system in an optical scanner in which an approximately parallel light beam from a light source is formed as a line image extending in a main scanning corresponding direction and is deflected at an equiangular velocity by a rotary polygon mirror having a reflecting face in the vicinity of an image forming position of the line image and is then formed by an image forming lens system in the shape of a spot on a scanned face to optically scan the scanned face at an approximately equal speed, said fθ lens system focusing and forming the light beam deflected by the rotary polygon mirror as an image on the scanned face, said fθ lens system having a function for connecting a reflecting position of the rotary polygon mirror and the scanned face in an approximately conjugate relation in geometrical optics with respect to a secondary scanning direction, and having an fθ function with respect to a main scanning direction, said fθ lens system comprising two groups of first and second lenses sequentially arranged from the side of the rotary polygon mirror toward the scanned face side, said lenses having first to fourth lens faces provided from the side of said rotary polygon mirror and having shapes on a deflecting plane sequentially composed of a straight line, an arc, a straight line and an arc from the first to fourth lens faces, said first lens having negative refracting power on a plane parallel to the deflecting plane, and second lens having positive refracting power on the plane parallel to the deflecting plane, said first to fourth lens faces being respectively constructed by a planar face, a concave barrel type toric face having a radius of curvature on a deflecting perpendicular plane reduced as this face is separated from and optical axis, a concave cylindrical face having a refracting power on only the deflecting perpendicular plane, and a convex toric face having a large curvature on the deflecting perpendicular plane, a center of curvature on a generatrix of said barrel type toric face being situated on an opposite side to said generatrix with respect to a rotation axis of said barrel type toric face, a combined focal distance $f_S$ on the deflecting perpendicular plane, a lateral magnification $\beta$ and respective radii $r'_3$ and $r'_4$ of curvature of the third and fourth lens faces on the deflecting perpendicular plane including the optical axis satisfying the following condition, $$0.4 < |\{(1/r'_3) - (1/r'_4)\} \cdot f_S \cdot \beta| < 2.0.$$

6. An fθ lens system in an optical scanner in which an approximately parallel light beam from a light source is formed as a line image extending in a main scanning corresponding direction and is deflected at an equiangular velocity by a rotary polygon mirror having a reflecting face in the vicinity of an image forming position of the line image and is then formed by an image forming lens system in the shape of a spot on a scanned face to optically scan the scanned face at an approximately equal speed, said fθ lens system focusing and forming the light beam deflected by the rotary polygon mirror as an image on the scanned face, said fθ lens system having a function for connecting a reflecting position of the rotary polygon mirror and the scanned face in an approximately conjugate relation in geometrical optics with respect to a secondary scanning direction, and having an $f\theta$ function with respect to a main scanning direction, said $f\theta$ lens system comprising two groups of first and second lenses sequentially arranged from the side of the rotary polygon mirror toward the scanned face side, said lenses having first to fourth lens faces provided from the side of said rotary polygon mirror and having shapes on a deflecting plane sequentially composed of a straight line, an arc, an arc and an arc from the first to fourth lens faces, said first and second lenses respectively having a positive refracting power on a plane parallel to the deflecting plane, said first to fourth lens faces being respectively constructed by a concave cylindrical face having a refracting power on only a deflecting perpendicular plane, a convex barrel type toric face having a radius of curvature on the deflecting perpendicular plane reduced as this face is separated from an optical axis, a concave spherical face, and a convex toric face having a large curvature on the deflecting perpendicular plane, a center of curvature on a generatrix of said barrel type toric face being situated on an opposite side to said generatrix with respect to a rotation axis of said barrel type toric face, a combined focal distance $f_S$ on the deflecting perpendicular plane and respective radii $r'_1$ and $r'_2$ of curvature of the first and second lens faces on the deflecting perpendicular plane including the optical axis satisfying the following condition, $$0.5 < |\{(1/r'_1) - (1/r'_2)\} \cdot f_S| < 3.8.$$

* * * * *